(12) United States Patent
Kouda

(10) Patent No.: US 12,463,473 B2
(45) Date of Patent: Nov. 4, 2025

(54) ELECTRIC WORK MACHINE

(71) Applicant: MAKITA CORPORATION, Anjo (JP)

(72) Inventor: Kei Kouda, Anjo (JP)

(73) Assignee: MAKITA CORPORATION, Anjo (JP)

(*) Notice: Subject to any disclaimer, the term of this patent is extended or adjusted under 35 U.S.C. 154(b) by 264 days.

(21) Appl. No.: 18/037,188

(22) PCT Filed: Oct. 21, 2021

(86) PCT No.: PCT/JP2021/038999
§ 371 (c)(1),
(2) Date: May 16, 2023

(87) PCT Pub. No.: WO2022/123926
PCT Pub. Date: Jun. 16, 2022

(65) Prior Publication Data
US 2024/0006933 A1 Jan. 4, 2024

(30) Foreign Application Priority Data
Dec. 9, 2020 (JP) .................................. 2020-203883

(51) Int. Cl.
*H02K 1/14* (2006.01)
*H02K 1/2786* (2022.01)
(Continued)

(52) U.S. Cl.
CPC ........... *H02K 1/146* (2013.01); *H02K 1/2786* (2013.01); *H02K 3/325* (2013.01); *H02K 9/227* (2021.01); *A01D 2101/00* (2013.01)

(58) Field of Classification Search
CPC .... A01D 2101/00; H02K 1/146; H02K 1/187; H02K 1/2786; H02K 11/215; H02K 21/222; H02K 3/325; H02K 3/522; H02K 5/18; H02K 7/085; H02K 9/06; H02K 9/227
See application file for complete search history.

(56) References Cited

U.S. PATENT DOCUMENTS

| 5,484,013 A | 1/1996 | Morikawa et al. |
| 2010/0213784 A1 | 8/2010 | Iizuka et al. |
(Continued)

FOREIGN PATENT DOCUMENTS

| CN | 112713690 B | * | 4/2022 | ............... H02K 1/12 |
| DE | 102014104069 A1 | * | 10/2014 | ............... H02K 5/18 |
(Continued)

OTHER PUBLICATIONS

JP-09037516-A, all pages (Year: 1997).*
(Continued)

*Primary Examiner* — Naishadh N Desai
(74) *Attorney, Agent, or Firm* — Oliff PLC

(57) ABSTRACT

An electric work machine includes a stator including a stator core, an insulator fixed to the stator core, and a coil mounted on the insulator, a rotor at least a part of which is disposed on an outer circumferential side of the stator, the rotor including a magnet, a stator base including a first heat dissipation fin and supporting the stator core, and an output unit driven by the rotor.

20 Claims, 43 Drawing Sheets

(51) Int. Cl.
  *H02K 3/32* (2006.01)
  *H02K 9/22* (2006.01)
  *A01D 101/00* (2006.01)

(56) References Cited

U.S. PATENT DOCUMENTS

| | | | |
|---|---|---|---|
| 2012/0299407 A1 | 11/2012 | Miyama et al. | |
| 2014/0292163 A1* | 10/2014 | Lau | H02K 9/14 310/60 R |
| 2016/0141932 A1* | 5/2016 | Aoyama | H02K 3/18 310/208 |

FOREIGN PATENT DOCUMENTS

| | | | | | |
|---|---|---|---|---|---|
| JP | H06-339244 | A | | 12/1994 | |
| JP | 09037516 | A | * | 2/1997 | |
| JP | H09-037516 | A | | 2/1997 | |
| JP | 2008-283730 | A | | 11/2008 | |
| JP | 2009-130958 | A | | 6/2009 | |
| JP | 2016-093132 | A | | 5/2016 | |
| JP | 2017-050908 | A | | 3/2017 | |
| JP | 2020137264 | A | * | 8/2020 | |
| WO | WO-2011093200 | A1 | * | 8/2011 | ......... H02K 11/0073 |
| WO | WO-2020170824 | A1 | * | 8/2020 | |

OTHER PUBLICATIONS

DE-102014104069-A1, Lau, all pages (Year: 2014).*
JP-2020137264-A, Kanda, all pages (Year: 2020).*
CN-112713690-B, Huo, all pages (Year: 2022).*
WO-2011093200-A1, Hazeyama, all pages (Year: 2011).*
WO-2020170824-A1, Kanda, all pages (Year: 2020).*
Jan. 11, 2022 International Search Report issued in International Patent Application No. PCT/JP2021/038999.
Jan. 11, 2022 Written Opinion of the International Searching Authority issued in International Patent Application No. PCT/JP2021/038999.
Jul. 2, 2024 Office Action issued in Japanese Patent Application No. 2020-203883.

* cited by examiner

ELECTRIC WORK MACHINE

FIELD

The present disclosure relates to an electric work machine.

BACKGROUND

In a technical field related to an electric work machine, there is known an electric work machine including an outer rotor type motor as disclosed in Patent Literature 1.

CITATION LIST

Patent Literature

Patent Literature 1: JP 2016-093132 A

SUMMARY

Technical Problem

A motor includes coils mounted on an insulator. When a drive current is supplied to the coils, the coils generate heat. Therefore, there is a demand for a technique capable of dissipating the heat of the coils.

An object of the present disclosure is to dissipate heat of coils.

Solution to Problem

According to a first disclosure, there is provided an electric work machine that includes: a stator including a stator core, an insulator fixed to the stator core, and coils mounted on the insulator; a rotor at least a part of which is disposed on an outer circumferential side of the stator, the rotor including a magnet; a stator base including a first heat dissipation fin and supported by the stator core; and an output unit driven by the rotor.

According to a second disclosure, there is provided an electric work machine that includes: a stator including a stator core, an insulator fixed to the stator core, and coils mounted on the insulator; a rotor at least a part of which is disposed on an outer circumferential side of the stator, the rotor including a magnet; a stator base configured to support the stator core; a first heat dissipation member made of metal and configured to face an end surface of the stator core; and an output unit driven by the rotor.

Advantageous Effects of Invention

According to the present disclosure, heat of coils is dissipated.

DESCRIPTION OF EMBODIMENTS

Hereinafter, embodiments according to the present disclosure will be described with reference to the drawings, but the present disclosure is not limited to the embodiments. The components of the embodiments described below can be appropriately combined. In addition, some components may not be used.

In the embodiment, the positional relationship of each unit will be described using terms of "left", "right", "front", "rear", "up", and "down". These terms indicate relative positions or directions with respect to the center of an electric work machine.

The electric work machine includes a motor. In the embodiment, a radiation direction of a rotation axis AX of the motor is appropriately referred to as a radial direction. A direction parallel to the rotation axis AX of the motor is appropriately referred to as an axial direction. A direction around the rotation axis AX of the motor is appropriately referred to as a circumferential direction or a rotation direction.

A position that is proximate to or a direction that approaches the rotation axis AX of the motor in the radial direction is appropriately referred to as radially inward, and a position that is far from or a direction that leads away from the rotation axis AX of the motor in the radial direction is appropriately referred to as radially outward. A position on one side or a direction on one side in the axial direction is appropriately referred to as one side in the axial direction, and a position on the other side or a direction on the other side in the axial direction is appropriately referred to as the other side in the axial direction. A position on one side or a direction on one side in the circumferential direction is appropriately referred to as one side in the circumferential direction, and a position on the other side or a direction on the other side in the circumferential direction is appropriately referred to as the other side in the circumferential direction.

First Embodiment

Figure 1:
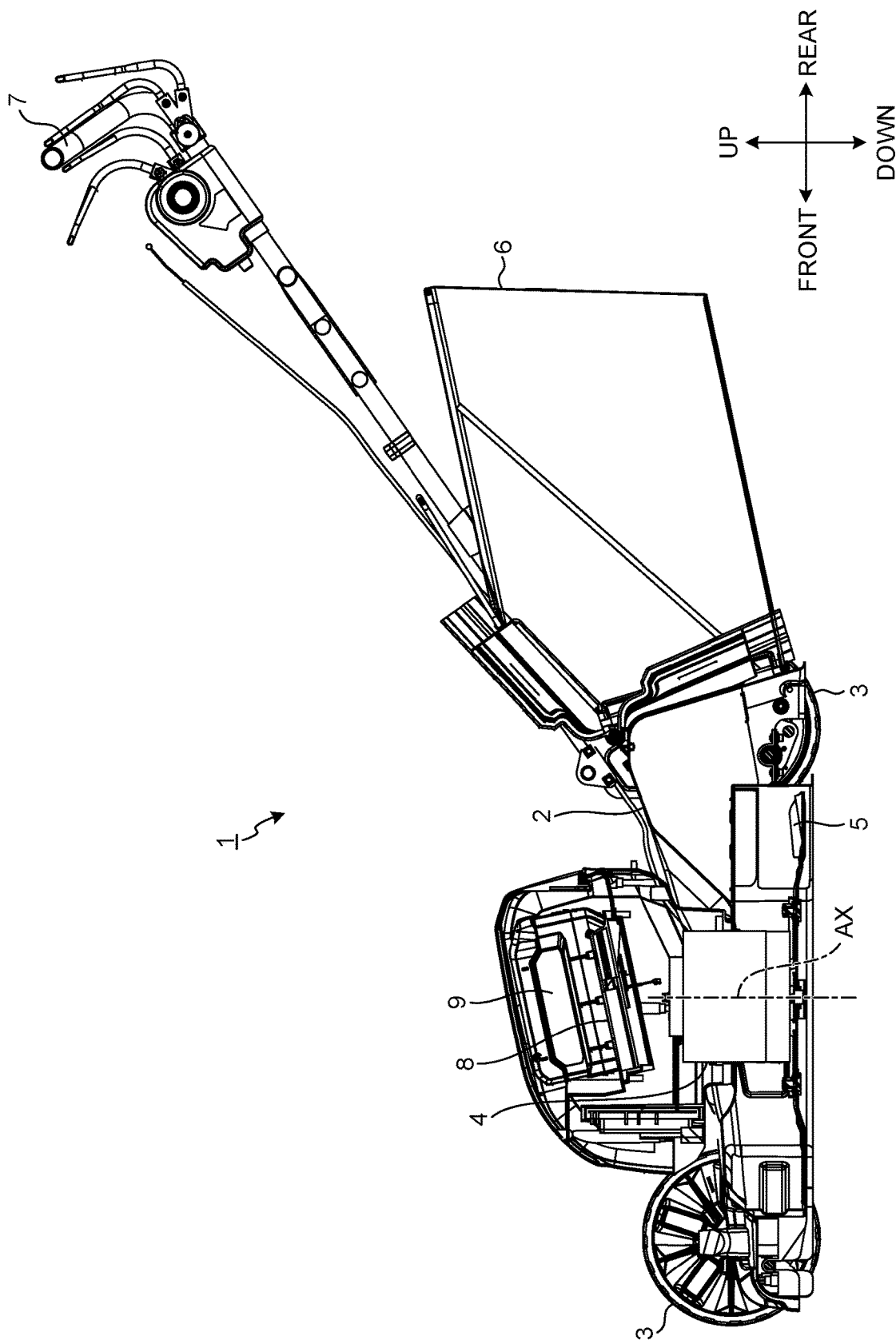
FIG. 1 is a view illustrating an electric work machine according to a first embodiment.

A first embodiment will be described. FIG. 1 is a view illustrating an electric work machine 1 according to the present embodiment. In the present embodiment, the electric work machine 1 is a lawn mower, which is one type of gardening tool (outdoor power equipment).

As illustrated in FIG. 1, the electric work machine 1 includes a housing 2, wheels 3, a motor 4, a cutting blade 5, a cutting box 6, a handle 7, and a battery mounting unit 8.

The housing 2 houses the motor 4 and the cutting blade 5. The wheels 3, the motor 4, and the cutting blade are each supported by the housing 2.

The wheels 3 rotate in a state of being in contact with the ground. When the wheels 3 rotate, the electric work machine 1 can move on the ground. Four wheels 3 are provided.

The motor 4 is a power source of the electric work machine 1. The motor 4 generates a rotational force for rotating the cutting blade 5. The motor 4 is disposed upward of the cutting blade 5.

The cutting blade 5 is connected to the motor 4. The cutting blade 5 is an output unit of the electric work machine 1 driven by the motor 4. The cutting blade 5 rotates around the rotation axis AX of the motor 4 by the rotational force generated by the motor 4. The cutting blade 5 faces the ground. When the cutting blade 5 rotates in a state where the wheels 3 are in contact with the ground, the lawn growing on the ground is cut. The lawn cut by the cutting blades 5 is housed in the cutting box 6.

The handle 7 is held by a hand(s) of a user of the electric work machine 1. The user can move the electric work machine 1 while holding the handle 7 by his or her hand(s).

A battery pack 9 is mounted on the battery mounting unit 8. The battery pack 9 is a power source of the electric work machine 1. The battery pack 9 is detachable from the battery mounting unit 8. The battery pack 9 includes a secondary battery. In the present embodiment, the battery pack 9 includes a rechargeable lithium ion battery. The battery pack 9 can supply electric power to the electric work machine 1 by being mounted on the battery mounting unit 8. The motor 4 is driven based on a drive current supplied from the battery pack 9.

Figure 2:
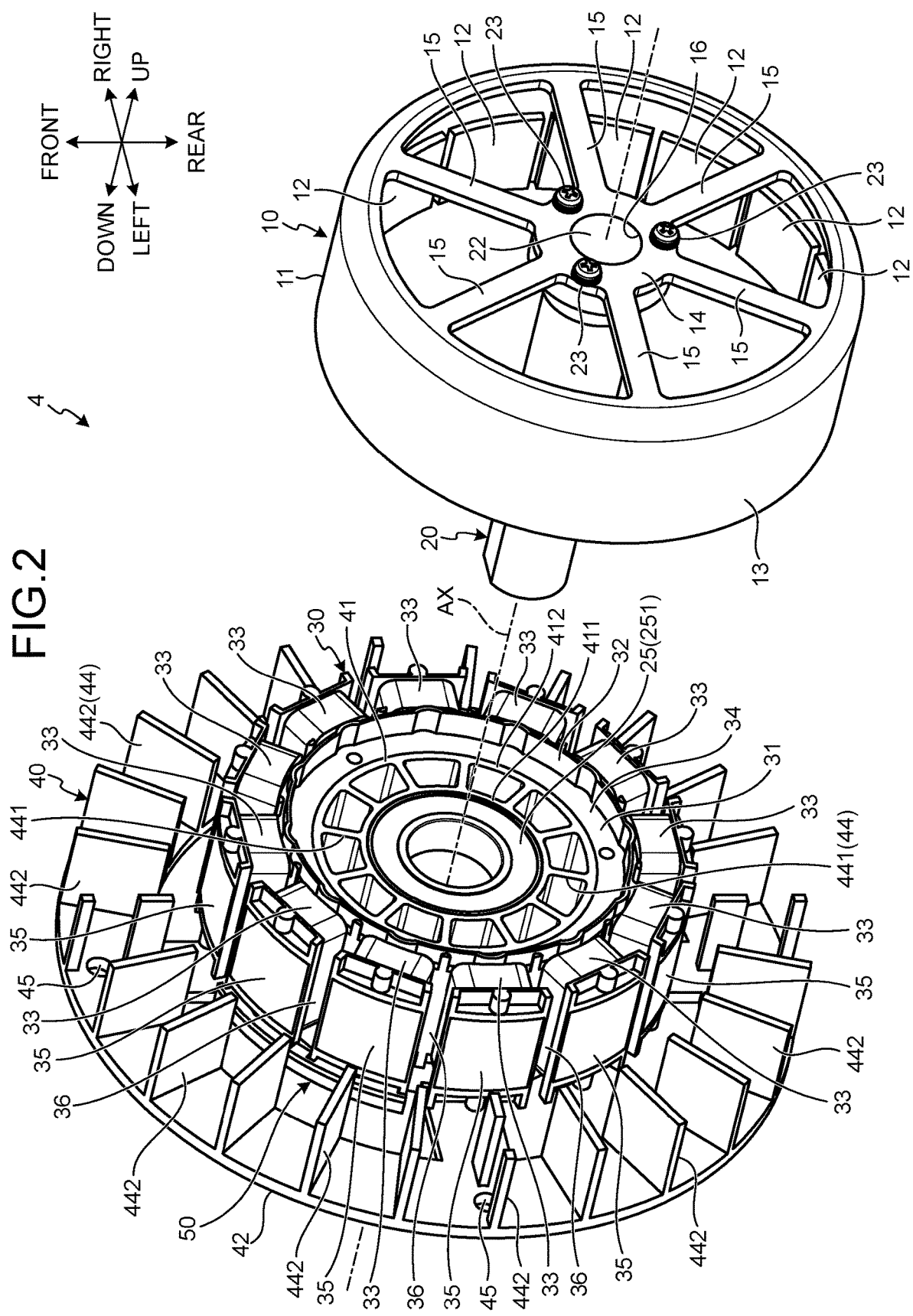
FIG. 2 is an exploded perspective view illustrating a motor according to the first embodiment as viewed from the left side.

FIG. 2 is an exploded perspective view illustrating the motor 4 according to the present embodiment. In the present embodiment, the motor 4 is an outer rotor type brushless motor.

As illustrated in FIG. 2, the motor 4 includes a rotor 10, a rotor shaft 20, a stator 30, a stator base 40, and a sensor substrate 50. The rotor 10 rotates with respect to the stator 30. At least a part of the rotor 10 is disposed on the outer circumferential side of the stator The rotor shaft 20 is fixed to the rotor 10. The rotor 10 and the rotor shaft 20 rotate around the rotation axis AX. The stator base 40 supports the stator 30. The stator base 40 is fixed to a stator core 31. The cutting blade 5 is connected to the rotor shaft 20. The cutting blade 5 is driven by the rotor 10. The sensor substrate 50 supports a magnetic sensor configured to detect the rotation of the rotor 10.

In the present embodiment, the rotation axis AX of the motor 4 extends in the up-downward direction. The axial direction and the up-down direction are parallel. In the following description, one side in the axial direction is appropriately referred to as an upper side, and the other side in the axial direction is appropriately referred to as a lower side.

Figure 3:
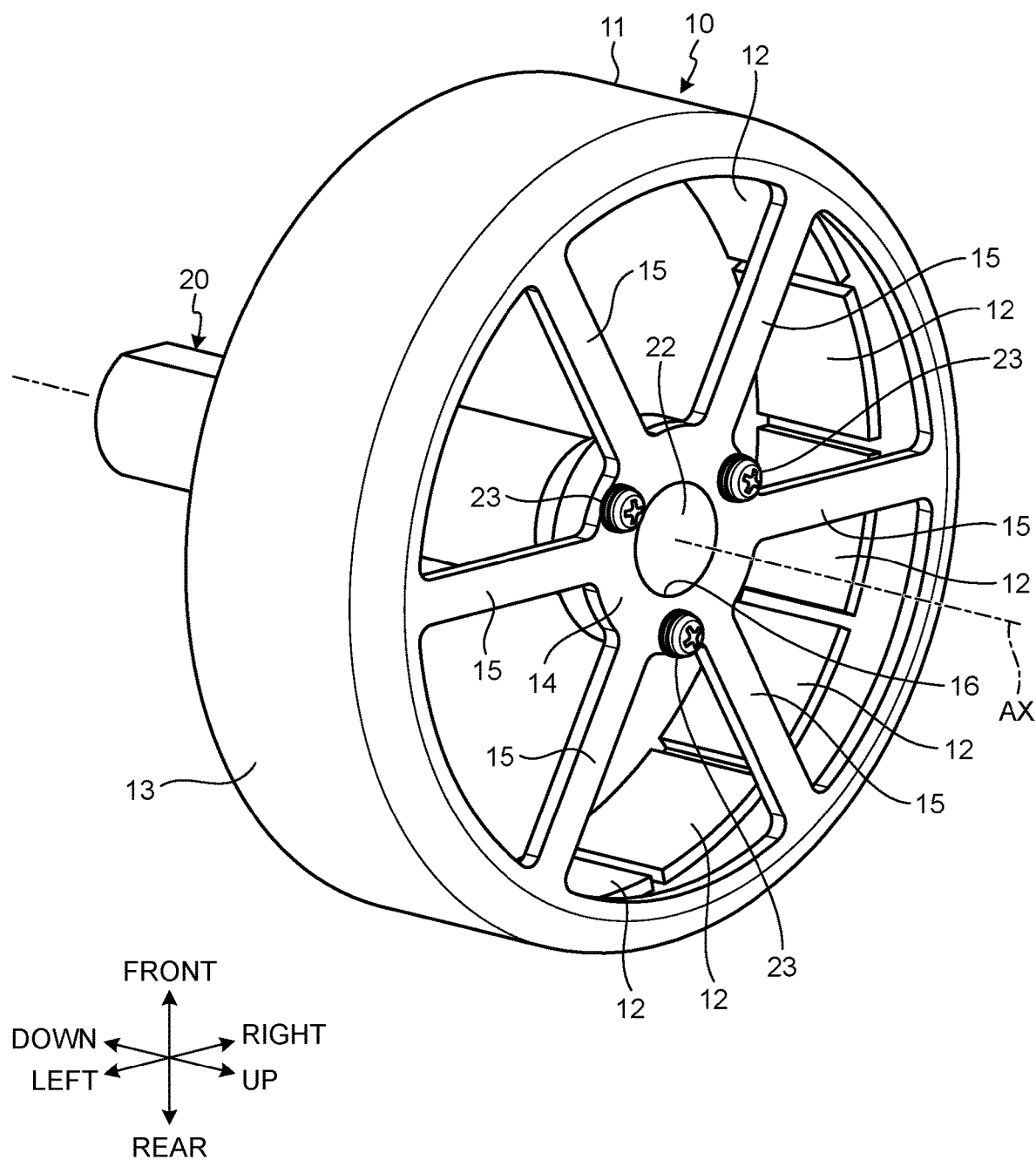
FIG. 3 is a perspective view illustrating a rotor and a rotor shaft according to the first embodiment.

FIG. 3 is a perspective view illustrating the rotor 10 and the rotor shaft 20 according to the present embodiment. FIG.

4 is an exploded perspective view illustrating the rotor 10 and the rotor shaft 20 according to the present embodiment.

Figure 4:
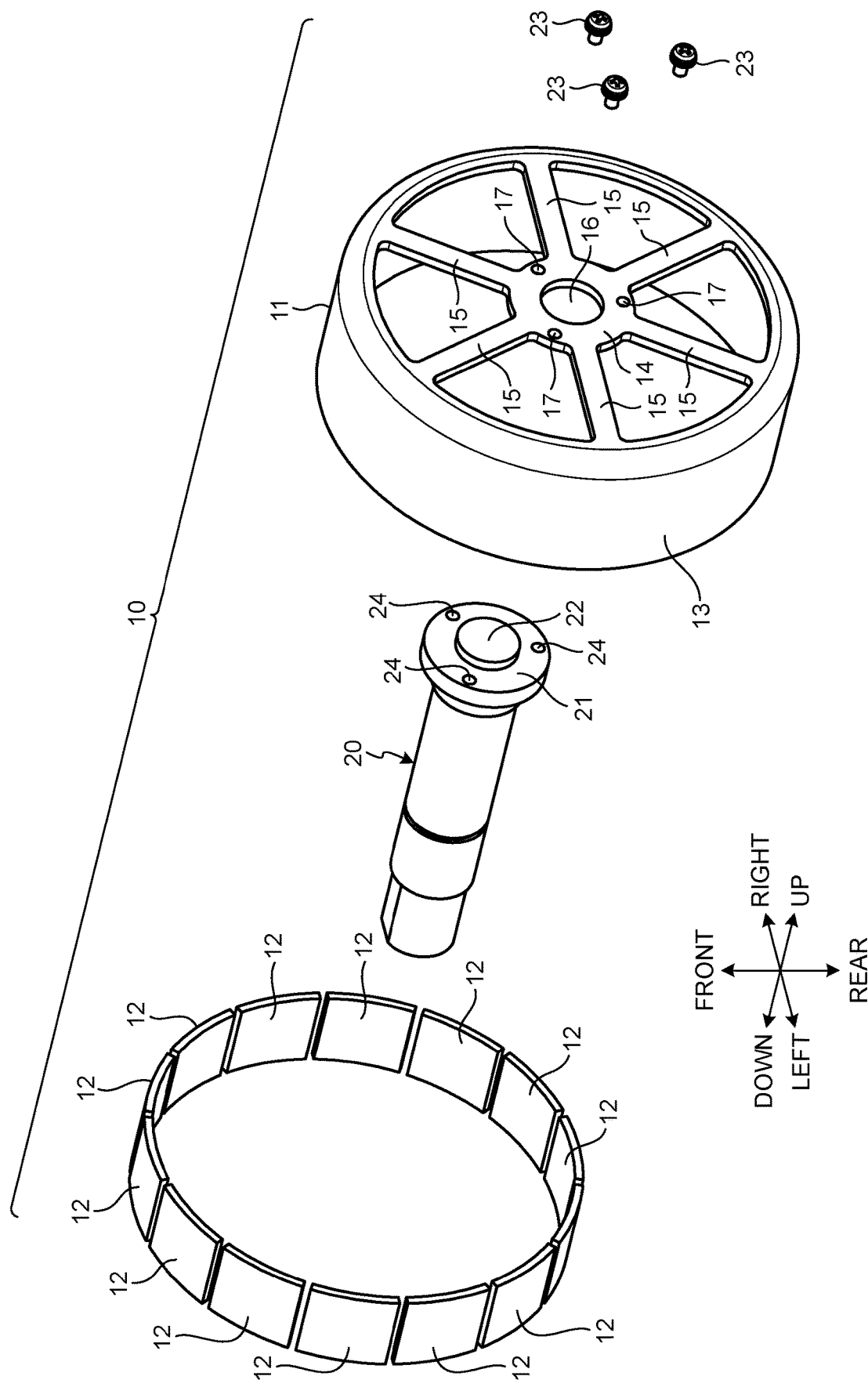
FIG. 4 is an exploded perspective view illustrating the rotor and the rotor shaft according to the first embodiment.

As illustrated in FIGS. 2, 3, and 4, the rotor 10 includes a rotor cup 11 and magnets 12. The rotor cup 11 is made of metal containing iron as a main component. The magnets 12 are permanent magnets.

The rotor cup 11 includes a rotor yoke 13, a rotor plate 14, and a radial rib 15.

The rotor yoke 13 has a cylindrical shape. The rotor yoke 13 is disposed so as to surround the stator 30. The rotor yoke 13 is disposed around the rotation axis AX. The central axis of the rotor yoke 13 and the rotation axis AX coincide with each other. The rotor plate 14 has an annular shape. The rotor plate 14 is disposed around the rotation axis AX. The central axis of the rotor plate 14 and the rotation axis AX coincide with each other. At least a part of the rotor plate 14 faces a shaft end surface 21 of the rotor shaft 20. The shaft end surface 21 faces upward. The radial ribs 15 connect the rotor yoke 13 to the rotor plate 14. The radial ribs 15 extend radially outward from the rotor plate 14. The radial ribs 15 are provided with a gap interposed therebetween in the circumferential direction. The rotor yoke 13, the rotor plate 14, and the radial ribs 15 are formed to be integrated.

The magnets 12 are fixed to the rotor yoke 13. The magnets 12 are disposed in the circumferential direction. In the present embodiment, 14 magnets 12 are provided. M-pole magnets 12 and S-pole magnets 12 are alternately arranged in the circumferential direction. In the present embodiment, the magnets 12 are disposed inside the rotor yoke 13. The magnets 12 are fixed to the inner surface of the rotor yoke 13 by, for example, an adhesive.

The rotor shaft 20 extends in the axial direction. The central axis of the rotor shaft 20 and the rotation axis AX coincide with each other. The rotor shaft 20 is fixed to the rotor 10 so that the central axis of the rotor shaft 20 coincides with the central axis of the rotor yoke 13. The rotor shaft 20 has a shaft protrusion 22 protruding upward from the shaft end surface 21. The rotor plate 14 has a shaft opening 16 in which the shaft protrusion 22 is disposed. By disposing the shaft protrusion 22 in the shaft opening 16, the rotor 10 and the rotor shaft 20 are positioned in the radial direction. The rotor 10 and the rotor shaft 20 are positioned in the axial direction by contact between the shaft end surface 21 around the shaft protrusion 22 and the lower surface of the rotor plate 14.

In the present embodiment, the rotor 10 and the rotor shaft 20 are fixed by rotor screws 23. Screw holes 24 are formed in the shaft end surface 21. Screw openings 17 are formed in the rotor plate 14. The rotor screws 23 are inserted into the screw holes 24 through the screw openings 17 in a state where the shaft protrusion 22 is disposed in the shaft opening 16. By coupling a screw thread provided in each of the rotor screws 23 to a screw groove provided in each of the screw holes 24, the rotor 10 and the rotor shaft 20 are fixed by the rotor screws 23. In the present embodiment, the rotor 10 and the rotor shaft are fixed by three rotor screws 23.

Figure 5:
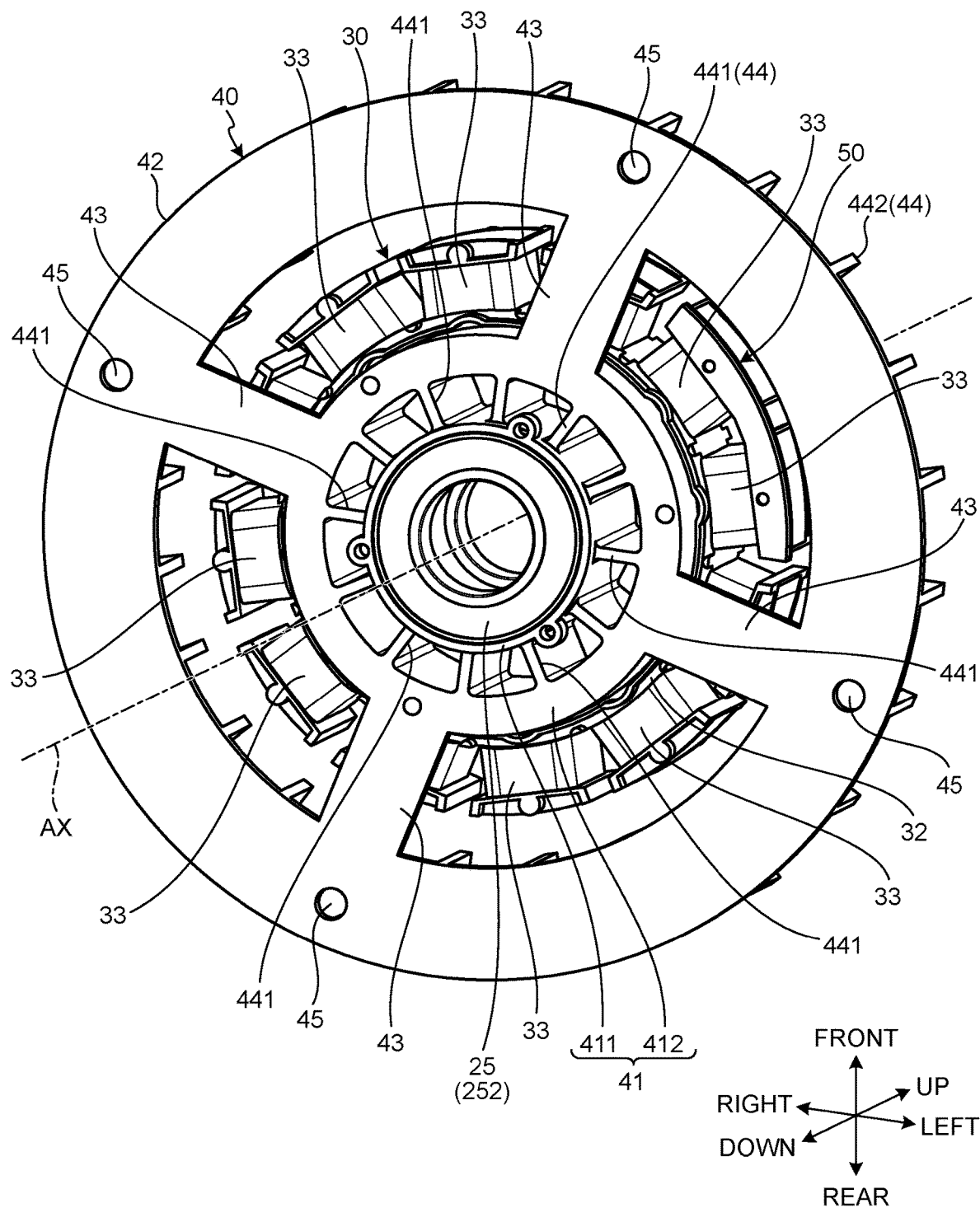
FIG. 5 is a perspective view illustrating a stator and a stator base according to the first embodiment.
Figure 6:
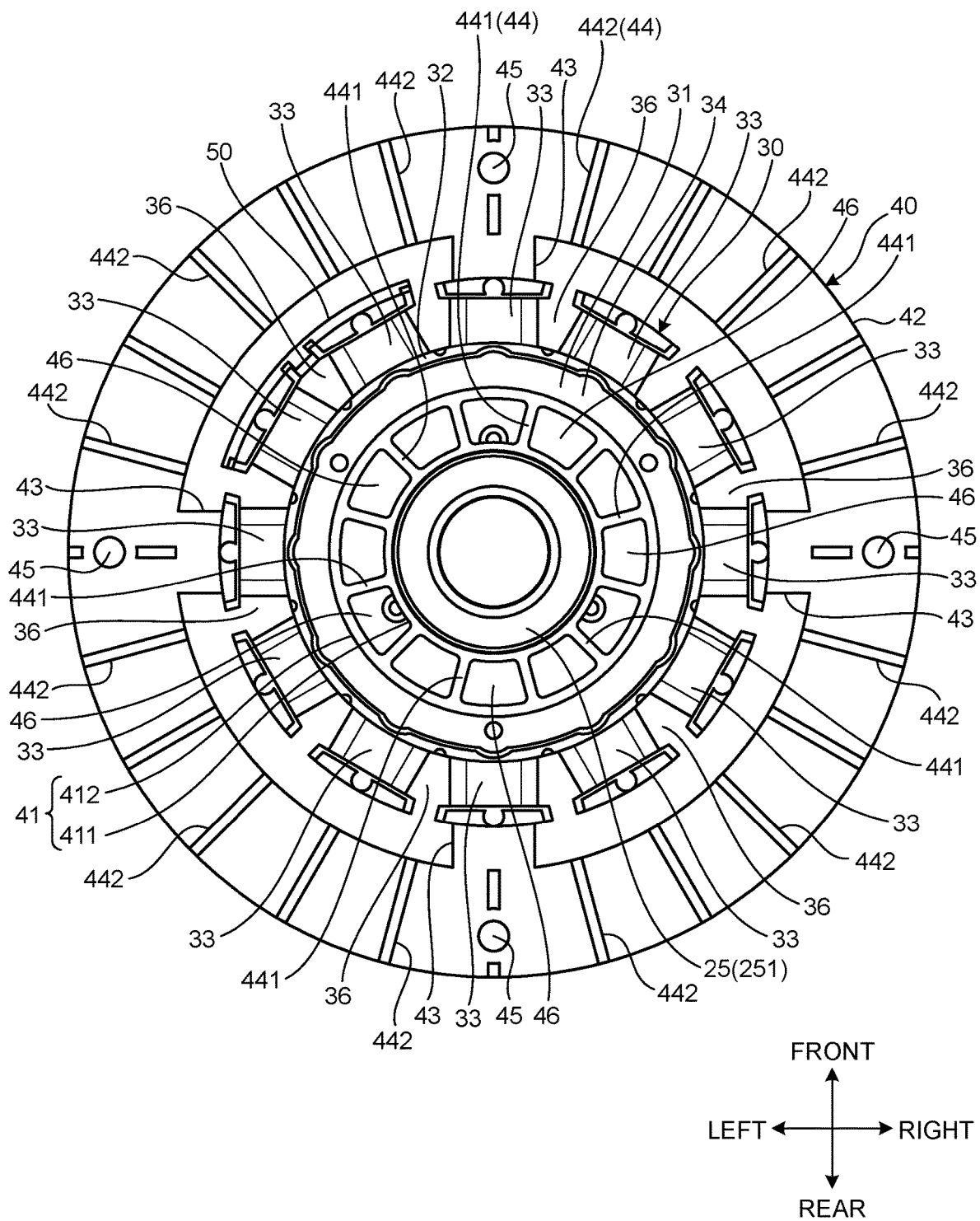
FIG. 6 is a plan view of the stator and the stator base according to the first embodiment as viewed from above.
Figure 7:
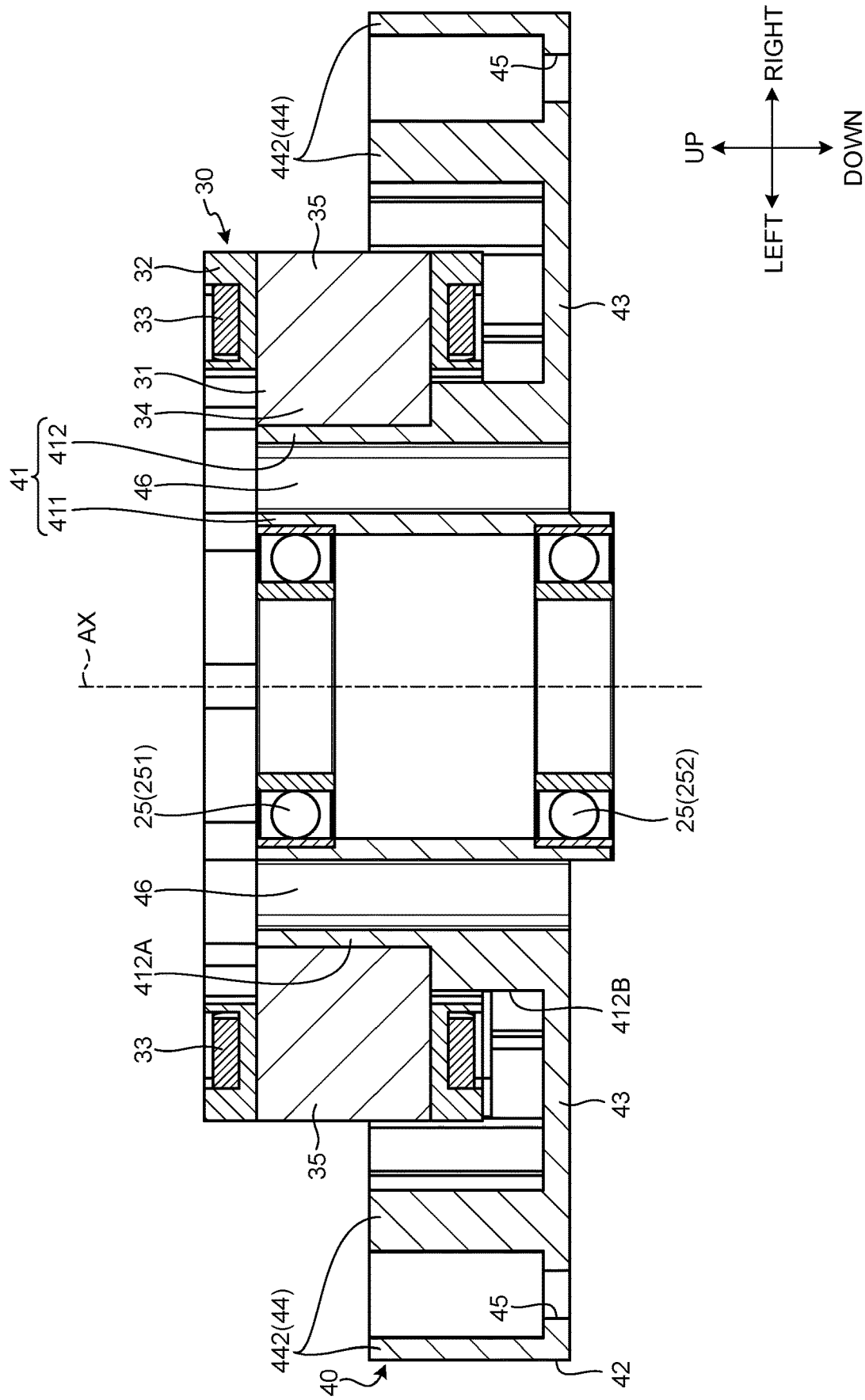
FIG. 7 is a longitudinal sectional view illustrating the stator and the stator base according to the first embodiment.
Figure 8:
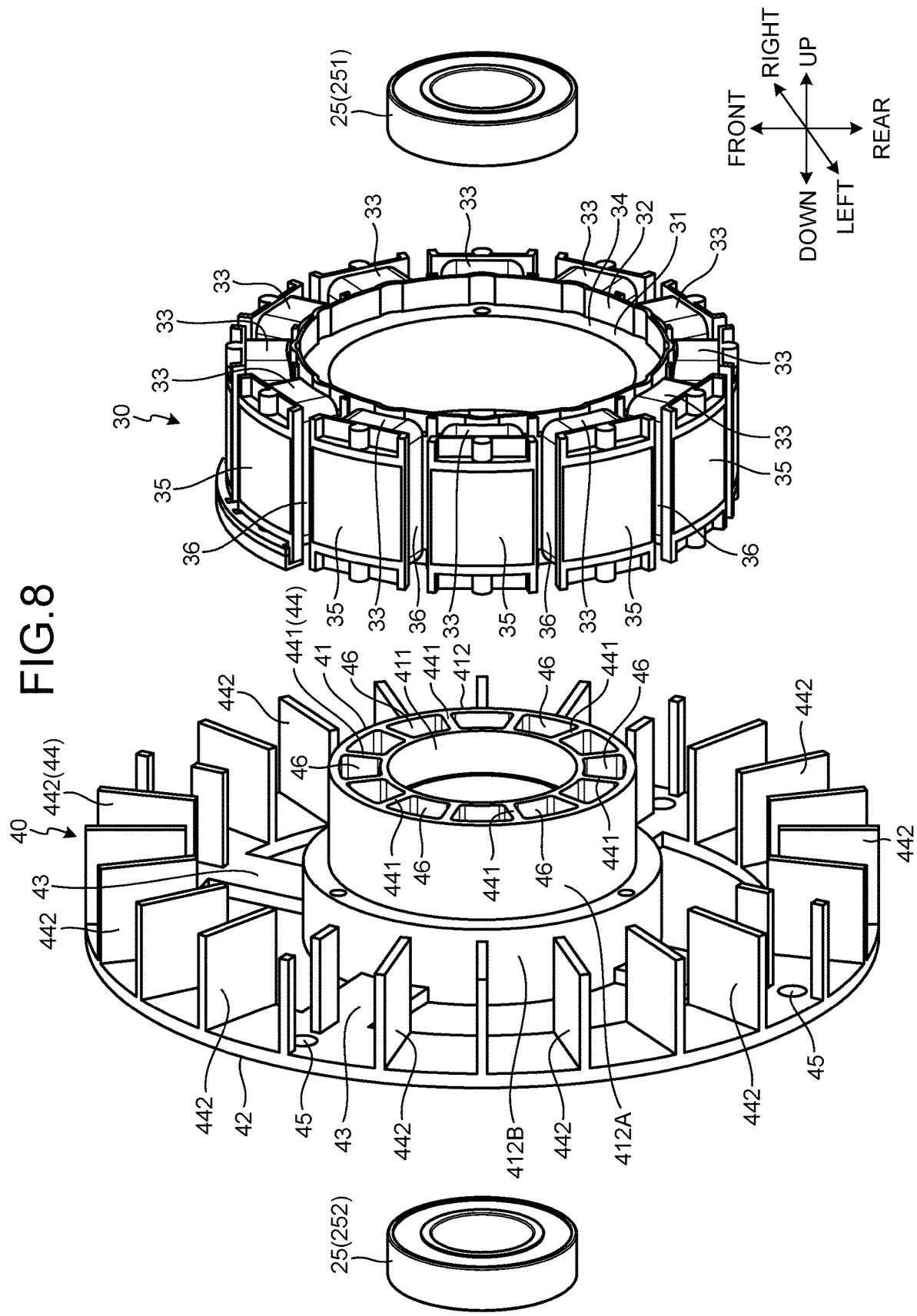
FIG. 8 is an exploded perspective view illustrating the stator and the stator base according to the first embodiment.

FIG. 5 is a perspective view illustrating the stator 30 and the stator base 40 according to the present embodiment. FIG. 6 is a plan view of the stator 30 and the stator base 40 according to the present embodiment as viewed from above. FIG. 7 is a longitudinal sectional view illustrating the stator 30 and the stator base 40 according to the present embodiment. FIG. 8 is an exploded perspective view illustrating the stator 30 and the stator base 40 according to the present embodiment. The longitudinal sectional view is a sectional view including the rotation axis AX and parallel to the rotation axis AX.

The stator 30 includes a stator core 31, an insulator 32, and coils 33.

The stator core 31 is made of metal containing iron as a main component. The stator core 31 includes a stator yoke 34 and teeth 35. The stator yoke 34 has a cylindrical shape. The stator yoke 34 is disposed around the rotation axis AX. The central axis of the stator yoke 34 and the rotation axis AX coincide with each other. The teeth 35 protrude radially outward from the outer surface of the stator yoke 34. The teeth 35 are provided with a gap interposed therebetween in the circumferential direction. In the present embodiment, 12 teeth 35 are provided. Slots 36 are formed between the teeth 35 adjacent to each other.

The insulator 32 is made of synthetic resin. The insulator 32 is fixed to the stator core 31. The insulator 32 is integrally molded with the stator core 31. The insulator 32 is fixed to the stator core by, for example, insert molding.

The insulator 32 covers at least a part of the surface of the stator core 31. The insulator 32 covers at least a part of the end surface of the stator yoke 34 facing the axial direction. The end surface of the stator yoke 34 includes the upper end surface facing upward and the lower end surface facing downward. The insulator 32 covers the outer surface of the stator yoke 34 facing radially outward. The insulator 32 covers at least a part of the surface of each of the teeth 35.

The coils 33 are mounted on the insulator 32. The coils 33 are respectively wound on the teeth 35 via the insulator 32. The surface of each of the teeth 35 on which the corresponding coil 33 is wound is covered with the insulator 32. The outer surface of each of the teeth 35 facing radially outward is not covered with the insulator 32. The stator core 31 and the coils 33 are insulated by the insulator 32. The plurality of coils 33 are provided. In the present embodiment, 12 coils 33 are provided.

The sensor substrate 50 is fixed to the insulator 32. The sensor substrate 50 supports a magnetic sensor configured to detect the rotation of the rotor 10. The sensor substrate 50 is fixed to the insulator 32 so that the magnets 12 and the magnetic sensor face each other. The sensor substrate 50 is disposed radially outside the coil 33.

The stator base 40 supports the stator core 31. The stator base 40 is made of aluminum. The stator base 40 includes a pipe portion 41, a foot portion 42, connection rib portions 43, and heat dissipation fins 44 (first heat dissipation fins).

The pipe portion 41 has a substantially cylindrical shape. The pipe portion 41 is disposed around the rotation axis AX. The central axis of the pipe portion 41 and the rotation axis AX coincide with each other.

At least a part of the pipe portion 41 is disposed inside the stator core 31. The central axis of the pipe portion 41 and the central axis of the stator yoke 34 coincide with each other. In the present embodiment, the pipe portion 41 includes an inner pipe portion 411 and an outer pipe portion 412. The outer pipe portion 412 is disposed on the outer circumferential side of the inner pipe portion 411. The inner pipe portion 411 is disposed inside the outer pipe portion 412. The inner pipe portion 411 has a cylindrical shape. The outer pipe portion 412 includes a small diameter portion 412A and a large diameter portion 412B disposed below the small diameter portion 412A. Each of the small diameter portion 412A and the large diameter portion 412B has a cylindrical shape. The outer diameter of the large diameter portion 412B is larger than the outer diameter of the small diameter portion 412A. The central axis of the inner pipe portion 411 coincides with the rotation axis AX. The central axis of the inner pipe portion 411 coincides with the central axis of the outer pipe portion 412. The stator core 31 is disposed around the small diameter portion 412A. The small diameter portion 412A is disposed inside the stator core 31. The large diameter portion 412B is disposed outside the stator core 31. The stator core 31 is fixed to the outer pipe portion 412. The stator base 40 is fixed to the stator 30 so that the central axis of the inner pipe portion 411 and the central axis of the stator yoke 34 coincide with each other.

The pipe portion 41 supports the rotor shaft 20 via bearings 25. The rotor shaft 20 is disposed inside the inner pipe portion 411. In the present embodiment, the rotor shaft 20 is supported by the inner pipe portion 411 via the bearings 25. The bearings 25 are disposed between the inner surface of the inner pipe portion 411 and the outer surface of the rotor shaft 20. The bearings 25 support the rotor shaft 20 in a rotatable manner. The bearings 25 includes an upper bearing 251 and a lower bearing 252 disposed below the upper bearing 251.

The foot portion 42 is disposed outside the stator core 31. The foot portion 42 has an annular shape. The foot portion 42 has a plate shape. The central axis of the pipe portion 41 and the central axis of the foot portion 42 coincide with each other. The foot portion 42 is fixed to a fixing target. The housing 2 that houses the motor 4 is exemplified as the fixing target. The motor 4 is fixed to the fixing target by fixing the foot portion 42 to the fixing target. The inner diameter of the foot portion 42 is larger than the outer diameter of the outer pipe portion 412. The foot portion 42 is provided with screw openings 45. Screws (not illustrated) are disposed in the respective screw openings 45. The foot portion 42 and the fixing target are fixed by coupling the screws disposed in the screw openings 45 to screw holes provided in the fixing target.

The connection rib portions 43 connect the pipe portion 41 to the foot portion 42. The connection rib portions 43 extend radially outward from the outer surface of the outer pipe portion 412. The connection rib portions 43 are provided with a gap interposed therebetween in the circumferential direction. In the present embodiment, four connection rib portions 43 are provided. In the present embodiment, the connection rib portions 43 connect the large diameter portion 412B of the outer pipe portion 412 to the foot portion 42. The radially inner end portions of the connection rib portions 43 are fixed to the outer surface of the large diameter portion 412B. The radially outer end portions of the connection rib portions 43 are fixed to the inner surface of the foot portion 42. The connection rib portions 43 connect the pipe portion 41 to the foot portion 42 so that the central axis of the pipe portion 41 and the central axis of the foot portion 42 coincide with each other.

The heat dissipation fins 44 includes inner heat dissipation fins 441 provided in the pipe portion 41 and outer heat dissipation fins 442 provided in the foot portion 42.

The inner heat dissipation fins 441 are provided between the inner pipe portion 411 and the outer pipe portion 412. The inner heat dissipation fins 441 extend radially outward from the outer surface of the inner pipe portion 411. The inner heat dissipation fins 441 are provided with a gap interposed therebetween in the circumferential direction. The inner heat dissipation fins 441 connect the inner pipe portion 411 to the outer pipe portion 412. The radially inner end portions of the inner heat dissipation fins 441 are fixed to the outer surface of the inner pipe portion 411. The radially outer end portions of the inner heat dissipation fins 441 are fixed to the inner surface of the outer pipe portion 412. The inner pipe portion 411 and the outer pipe portion 412 are fixed via the inner heat dissipation fins 441. Ventilation passages 46 extending in the axial direction are each formed by the inner heat dissipation fins 441 adjacent to each other, the inner pipe portion 411, and the outer pipe portion 412.

The outer heat dissipation fins 442 are disposed on the upper surface of the foot portion 42. The lower end portions of the outer heat dissipation fins 442 are fixed to the upper surface of the foot portion 42. The outer heat dissipation fins 442 extend upward from the upper surface of the foot portion 42. The outer heat dissipation fins 442 are provided with a gap interposed therebetween in the circumferential direction.

Next, the operation of the motor 4 will be described. In the present embodiment, the motor 4 is a three-phase brushless motor. Each of the 12 coils 33 is assigned to any one of the U (U-V) phase, the V (V-W) phase, and the W (W-U) phase. The drive current supplied from the battery pack 9 to the motor 4 includes a U-phase drive current, a V-phase drive current, and a W-phase drive current. The drive current from the battery pack 9 is supplied to the coils 33 via a bus bar (not illustrated). When the drive current is supplied from the battery pack 9 to the coils 33, a rotating magnetic field is generated in the stator 30. When the rotating magnetic field is generated in the stator 30, the rotor 10 and the rotor shaft 20 rotate around the rotation axis AX.

When the drive current is supplied to the coils 33, the coils 33 generate heat. The heat of the coils 33 is transferred to the stator base 40 via the insulator 32 and the stator core 31. The stator base 40 includes the heat dissipation fins 44. The heat of the coils 33 is efficiently dissipated via the heat dissipation fins 44.

As described above, according to the present embodiment, the stator base 40 fixed to the stator core 31 includes the heat dissipation fins 44. The heat dissipation fins 44 increase the surface area of the stator base 40. As a result, the heat of the coils 33 transferred to the stator base 40 via the insulator 32 and the stator core 31 is efficiently dissipated via the heat dissipation fins 44. Therefore, an excessive rise in the temperature of the coils 33 is suppressed.

The inner heat dissipation fins 441 are provided in the pipe portion 41. As a result, the heat of the coils transferred to the pipe portion 41 via the insulator 32 and the stator core 31 is efficiently dissipated via the inner heat dissipation fins 441.

The pipe portion 41 includes the inner pipe portion 411 and the outer pipe portion 412 disposed on the outer circumferential side of the inner pipe portion 411. The inner heat dissipation fins 441 are provided between the inner pipe portion 411 and the outer pipe portion 412. The heat of the coils 33 transferred to the outer pipe portion 412 via the insulator 32 and the stator core 31 is efficiently dissipated via the inner heat dissipation fins 441. In addition, since the inner heat dissipation fins 441 are provided between the inner pipe portion 411 and the outer pipe portion 412, an increase in size of the stator base 40 is suppressed.

The outer heat dissipation fins 442 are provided in the foot portion 42. The outer diameter of the foot portion 42 is larger than the outer diameter of the pipe portion 41. The area of the upper surface of the foot portion 42 is larger than the area of the outer surface of the small diameter portion 412A. The heat of the coils 33 transferred to the foot portion 42 via the insulator 32, the stator core 31, the pipe portion 41, and the connection rib portions 43 is efficiently dissipated via the foot portion 42 and the outer heat dissipation fins 442.

A fan may be fixed to the rotor shaft 20. When the rotor shaft 20 rotates, the fan rotates. When the fan rotates, air flows around the heat dissipation fins 44. For example, air flows through the ventilation passages 46 and air flows around the inner heat dissipation fins 441, thereby improving cooling efficiency of the coils 33. In addition, air flows around the outer heat dissipation fins 442, thereby improving the cooling efficiency of the coils 33.

In the above-described embodiment, the shaft opening 16 may not be provided in the rotor plate 14. The rotor plate 14 and the rotor shaft 20 may be formed to be integrated. In addition, the radial ribs 15 may be omitted, and a peripheral edge portion of the rotor plate 14 and the rotor yoke 13 may be directly connected. As a result, the rotor cup 11 has no opening, which is advantageous from the viewpoint of waterproofing.

Second Embodiment

A second embodiment will be described. In the following description, the same or equivalent components as those of the above-described embodiment are denoted by the same reference numerals, and the description thereof is simplified or omitted.

Figure 9:
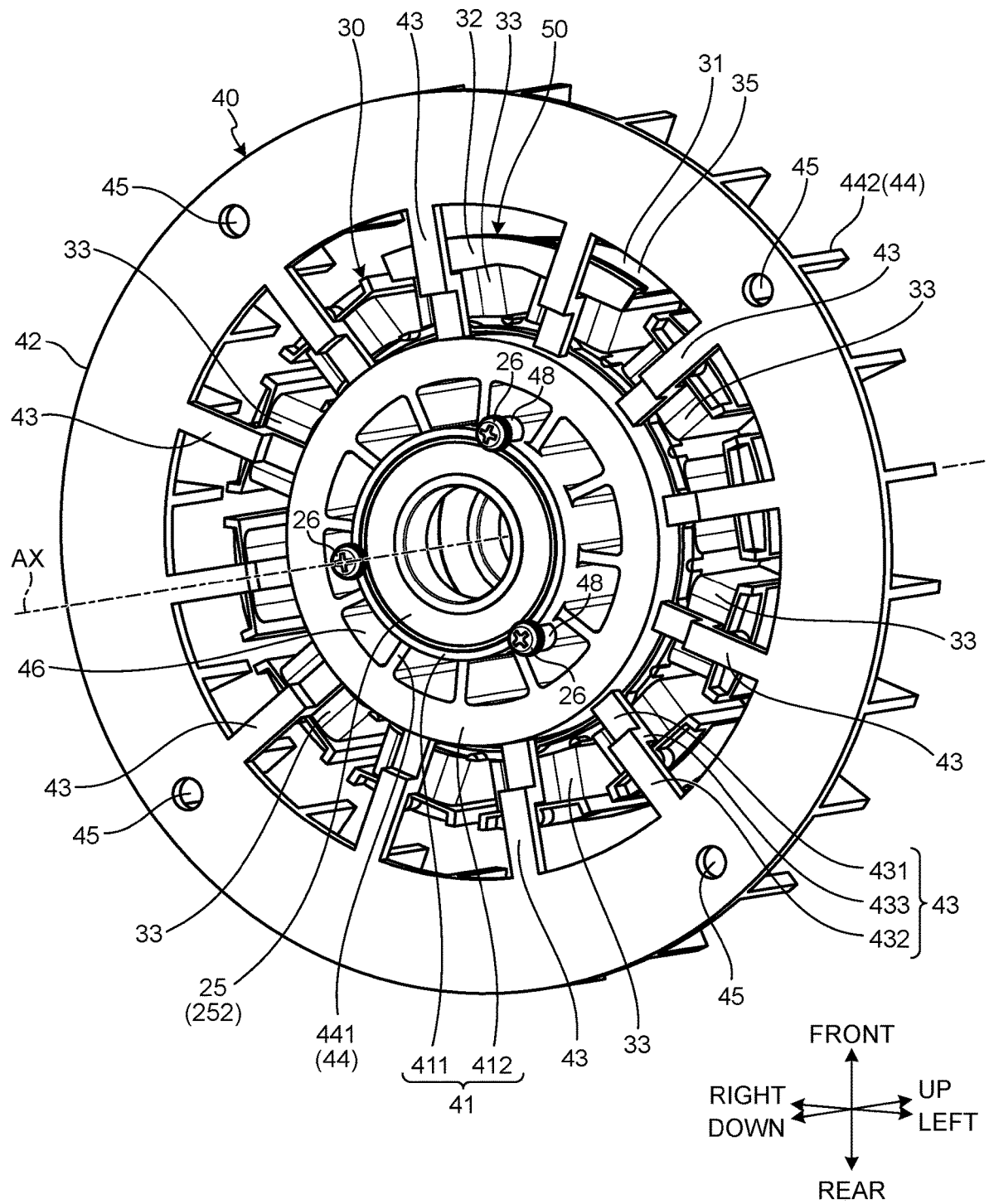
FIG. 9 is a perspective view illustrating a stator and a stator base according to a second embodiment.
Figure 10:
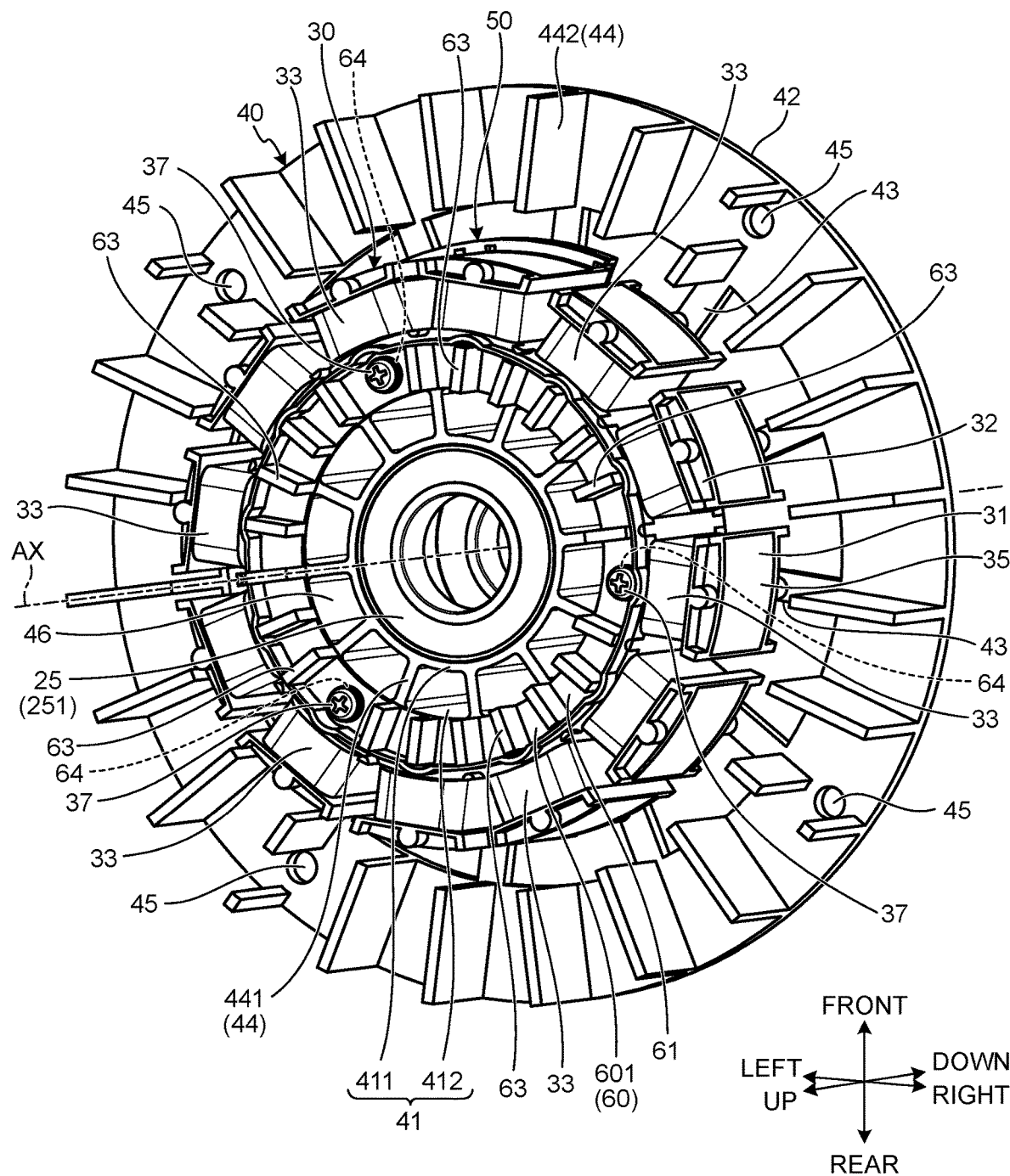
FIG. 10 is a perspective view illustrating the stator and the stator base according to the second embodiment.
Figure 11:
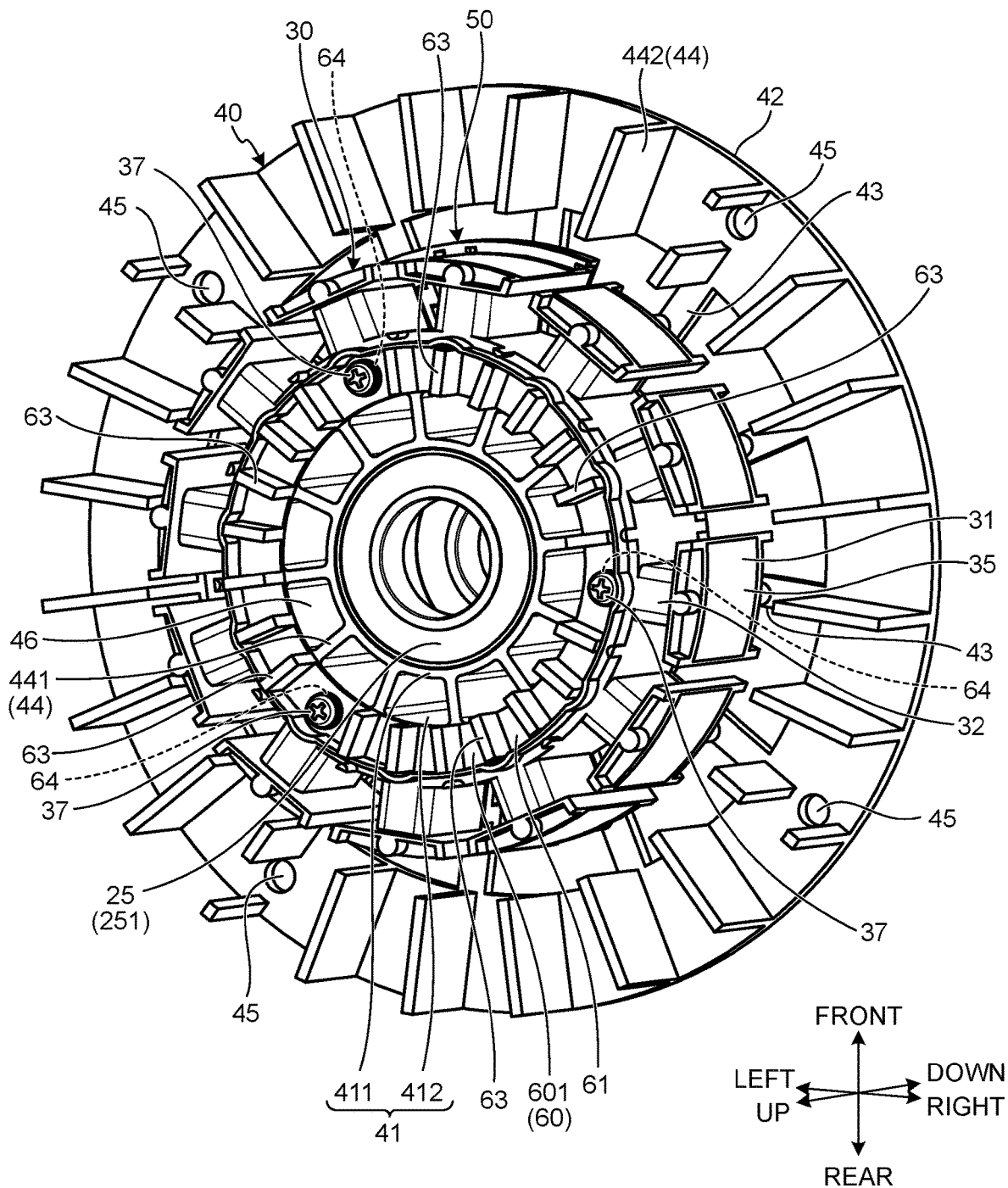
FIG. 11 is a perspective view illustrating a state in which coils are removed from the stator and the stator base according to the second embodiment.
Figure 12:
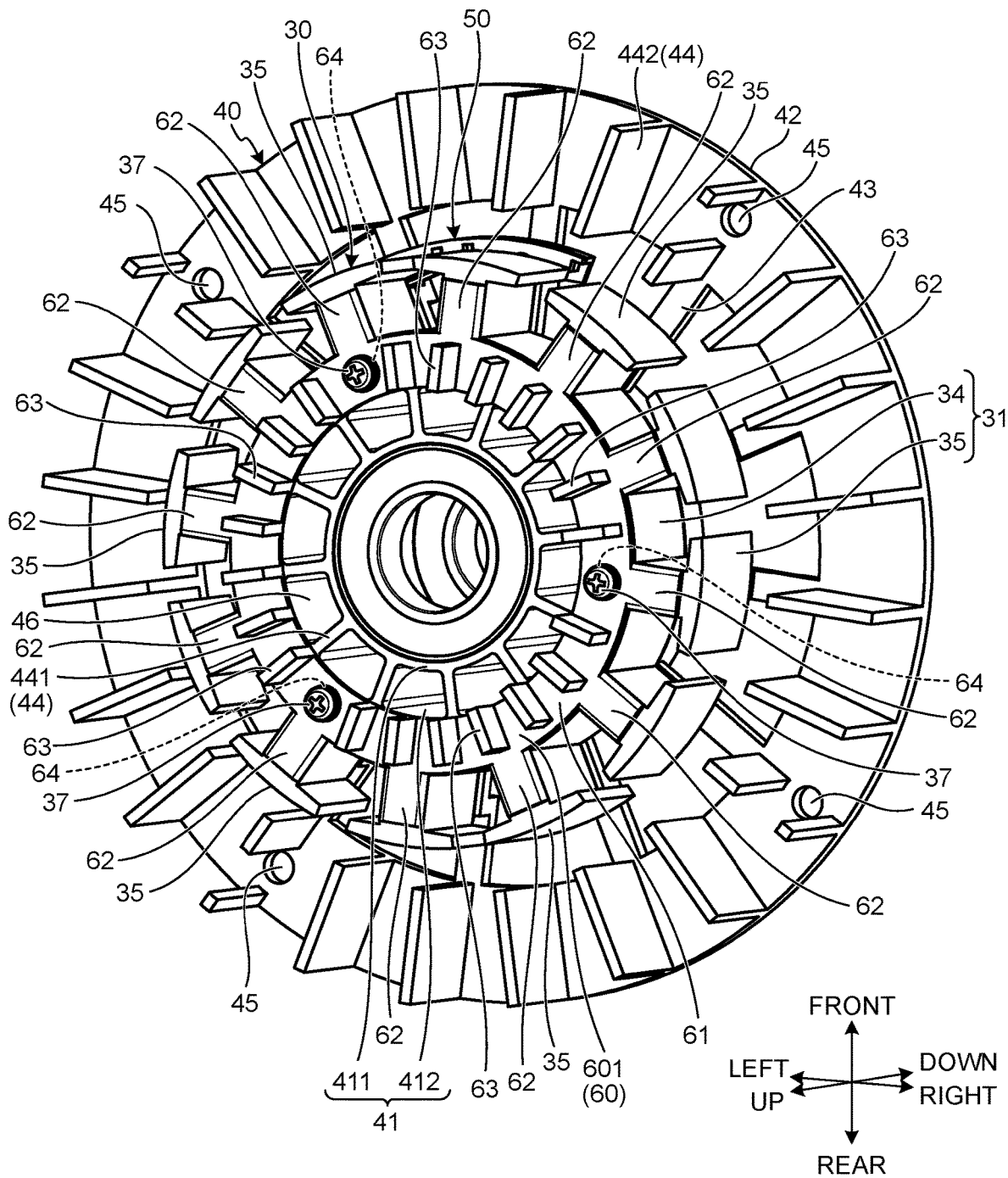
FIG. 12 is a perspective view illustrating a state in which an insulator and the coils are removed from the stator and the stator base according to the second embodiment.
Figure 13:
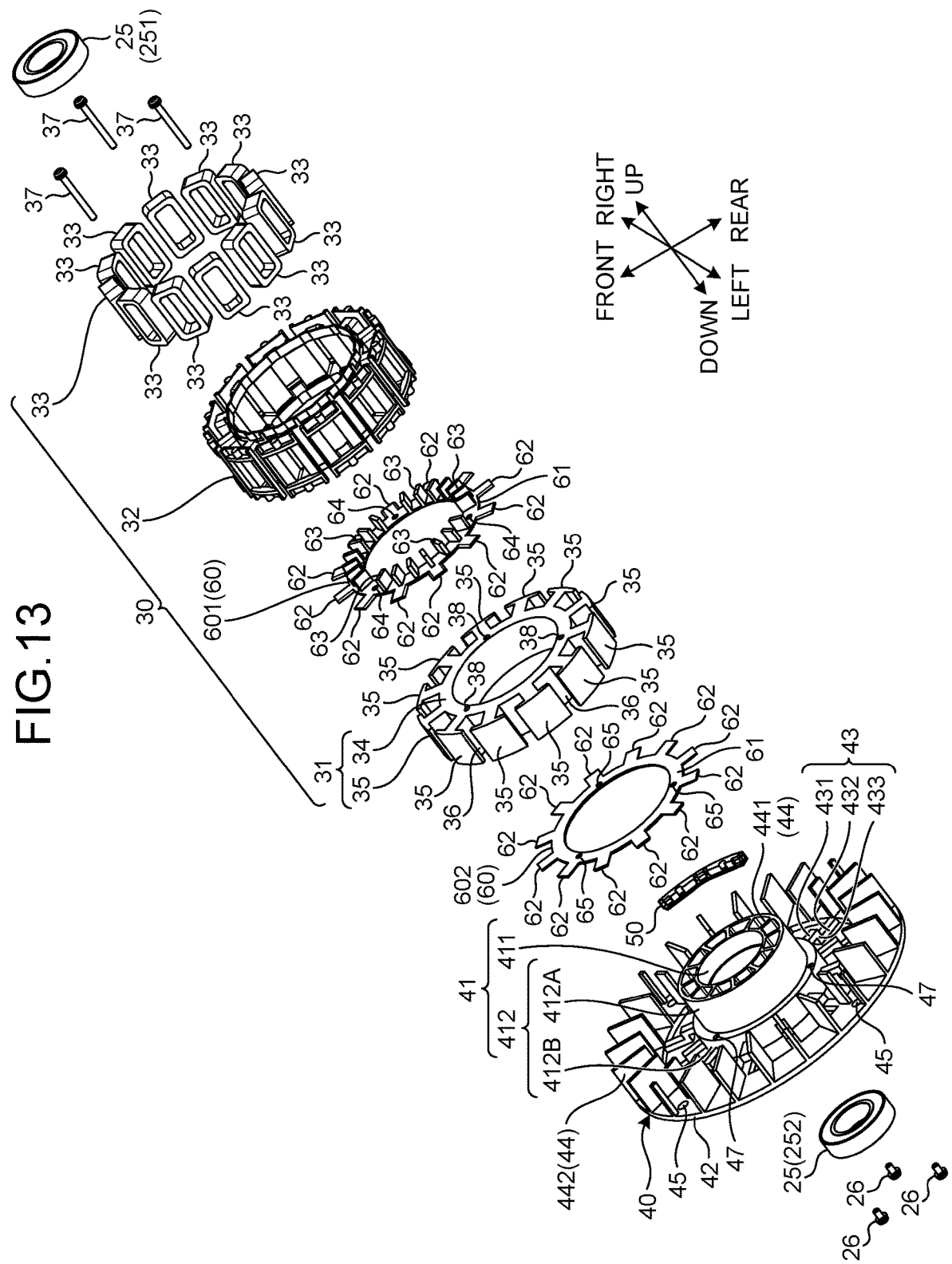
FIG. 13 is an exploded perspective view illustrating the stator and the stator base according to the second embodiment.
Figure 14:
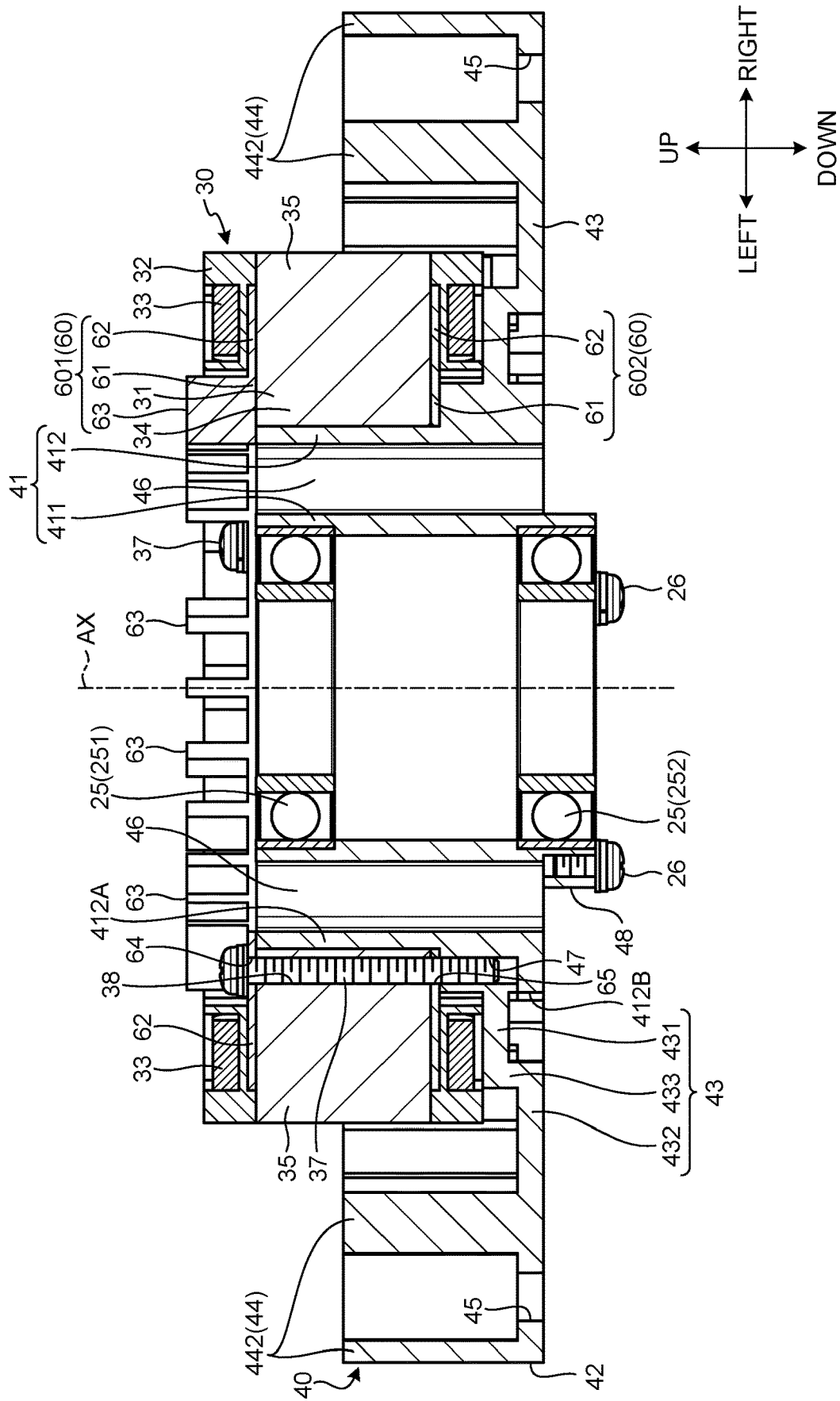
FIG. 14 is a longitudinal sectional view illustrating the stator and the stator base according to the second embodiment.

Each of FIGS. 9 and 10 is a perspective view illustrating a stator 30 and a stator base 40 according to the present embodiment. FIG. 9 is a perspective view of the stator 30 and the stator base 40 as viewed from below, and FIG. 10 is a perspective view of the stator 30 and the stator base 40 as viewed from above. FIG. 11 is a perspective view illustrating a state in which the coils 33 are removed from the stator 30 and the stator base 40 according to the present embodiment. FIG. 12 is a perspective view illustrating a state in which the insulator 32 and the coils 33 are removed from the stator and the stator base 40 according to the present embodiment. FIG. 13 is an exploded perspective view illustrating the stator 30 and the stator base 40 according to the present embodiment. FIG. 14 is a longitudinal sectional view illustrating the stator 30 and the stator base 40 according to the present embodiment.

The stator base 40 includes the pipe portion 41, the foot portion 42, and the connection rib portions 43. In the present embodiment, 12 connection rib portions 43 are provided. The connection rib portions 43 each include an inner rib portion 431, an outer rib portion 432, and a bent portion 433 disposed between the inner rib portion 431 and the outer rib portion 432. The outer rib portion 432 is disposed radially outside the inner rib portion 431. The inner rib portion 431 is disposed on the upper side with respect to the outer rib portion 432. That is, a distance between the inner rib portion 431 and the corresponding coil 33 is shorter than a distance between the outer rib portion 432 and the corresponding coil 33 in the axial direction.

The components of the stator base 40 according to the present embodiment other than the connection rib portions 43 are similar to those of the stator base 40 described in the first embodiment described above.

Similarly to the above-described embodiment, the stator 30 includes the stator core 31, the insulator 32 fixed to the stator core 31, and the coils 33 mounted on the insulator 32. The stator core 31 includes: the cylindrical stator yoke 34; and the teeth 35 which protrude radially outward from the stator yoke 34 and on which the coils 33 are respectively wound via the insulator 32.

In the present embodiment, the stator 30 includes a heat dissipation member 60 (first heat dissipation member) facing the end surface of the stator core 31 facing the axial direction. In the present embodiment, at least a part of the heat dissipation member 60 is in contact with the end surface of the stator core 31.

The heat dissipation member 60 has a plate shape. The heat dissipation member 60 includes a ring portion 61 and radial portions 62 protruding radially outward from the ring portion 61. The ring portion 61 faces the end surface of the stator yoke 34 facing the axial direction. The radial portions 62 respectively face the end surfaces of the teeth 35 facing the axial direction. The ring portion 61 is in contact with the end surface of the stator yoke 34. The ring portion 61 is provided so as to be in contact with the entire region of the end surface of the stator yoke 34. The radial portions 62 are in contact with the end surfaces of the teeth 35. The radial portions 62 are provided so as to be in contact with the end surfaces of the teeth 35, respectively.

In the present embodiment, the heat dissipation member 60 includes: an upper heat dissipation member 601 which is in contact with the upper end surface of the stator core 31; and a lower heat dissipation member 602 which is in contact with the lower end surface of the stator core 31. Each of the upper heat dissipation member 601 and the lower heat dissipation member 602 includes the ring portion 61 and the radial portions 62. The lower surface of the upper heat dissipation member 601 and the upper end surface of the stator core 31 are in contact with each other. The upper surface of the lower heat dissipation member 602 and the lower end surface of the stator core 31 are in contact with each other.

The heat dissipation member 60 is made of metal. The thermal conductivity of the heat dissipation member 60 is higher than the thermal conductivity of the stator core 31. The thermal conductivity of the heat dissipation member 60 is higher than the thermal conductivity of the insulator 32.

In the present embodiment, the heat dissipation member 60 is made of aluminum. As described above, the stator core 31 is made of steel containing iron as a main component. The heat dissipation member 60 has thermal conductivity of about 236 [W/(m·K)]. The heat dissipation member 60 may have thermal conductivity of about 96 [W/(m·K)]. The thermal conductivity of the stator core 31 is about 84 [W/(m·K)].

The upper heat dissipation member 601 includes heat dissipation fins 63 (second heat dissipation fins). The heat dissipation fins 63 are provided on the ring portion 61 of the upper heat dissipation member 601. The heat dissipation fins 63 extend upward from the upper surface of the ring portion 61 of the upper heat dissipation member 601. The heat dissipation fins 63 are provided with a gap interposed therebetween in the circumferential direction.

At least a part of the heat dissipation member 60 is covered with the insulator 32. The insulator 32 is integrally molded with the heat dissipation member 60 and the stator core 31. The insulator 32 is fixed to the heat dissipation member 60 and the stator core 31 by, for example, insert molding.

In the present embodiment, at least a part of each of the radial portions 62 is covered with the insulator 32. The ring portion 61 is not covered with the insulator 32.

The upper heat dissipation member 601 is integrally molded with the stator core 31. When the insulator 32 includes a fitting-type insulator to be fitted into the upper portion of the stator core 31, the upper heat dissipation member 601 may be fixed to the stator core 31 by the fitting-type insulator. The upper heat dissipation member 601 is in contact with the stator base 40.

The lower heat dissipation member 602 is integrally molded with the stator core 31. When the insulator 32 includes a fitting-type insulator to be fitted into the lower portion of the stator core 31, the lower heat dissipation member 602 may be fixed to the stator core 31 by the fitting-type insulator. The lower heat dissipation member 602 is in contact with the stator base 40.

The stator base 40 is integrally molded with the stator core 31. The foot portion 42 of the stator base 40 and the stator core 31 are integrally molded.

The upper heat dissipation member 601, the stator core 31, the lower heat dissipation member 602, and the stator base 40 are fixed by stator screws 37. Screw openings 64 are formed in the ring portion 61 of the upper heat dissipation member 601. Screw openings 38 are formed in the stator core 31. The screw openings 38 of the stator core 31 are formed so as to penetrate the upper end surface and the lower end surface of the stator yoke 34. Screw openings 65 are formed in the ring portion 61 of the lower heat dissipation member 602. Screw holes 47 are formed in the end surface facing the upper side of the large diameter portion 412B of the stator base 40.

The stator screws 37 are inserted into the respective screw openings 64 of the upper heat dissipation member 601 from the upper side of the upper heat dissipation member 601. The stator screws 37 are inserted into the respective screw holes 47 of the stator base 40 via the respective screw openings 64 of the upper heat dissipation member 601, the respective screw openings 38 of the stator core 31, and the respective screw openings 65 of the lower heat dissipation member 602. By coupling a screw thread provided in each of the stator screws 37 to a screw groove provided in each of the screw holes 47, the upper heat dissipation member 601, the stator core 31, the lower heat dissipation member 602, and the stator base 40 are fixed by the stator screws 37. In the present embodiment, the upper heat dissipation member 601, the stator core 31, the lower heat dissipation member 602, and the stator base 40 are fixed by three stator screws 37.

In the present embodiment, the lower bearing 252 is fixed to the inner pipe portion 411 by bearing fixing screws 26. Screw bosses 48 are provided at the lower end portion of the inner pipe portion 411. The bearing fixing screws 26 are inserted into screw holes provided in the screw bosses 48. When the bearing fixing screws 26 are inserted into the screw holes of the screw bosses 48 in a state where the lower bearing 252 is disposed inside the inner pipe portion 411, head portions of the bearing fixing screws 26 come into contact with at least a part of the lower bearing 252. The lower bearing 252 is fixed to the inner pipe portion 411 by contact between the head portions of the bearing fixing screws 26 and the lower bearing 252.

Next, a method of manufacturing the stator 30 according to the present embodiment will be described. The upper heat dissipation member 601, the stator core 31, and the lower heat dissipation member 602 are aligned so that the screw openings 64 of the upper heat dissipation member 601, the screw openings 38 of the stator core 31, and the screw openings 65 of the lower heat dissipation member 602 overlap one another. The dimension of the ring portion 61 is equal to the dimension of the stator yoke 34 in the radial direction. Therefore, by aligning the edge of the ring portion 61 with the edge of the end surface of the stator yoke 34, the upper heat dissipation member 601, the stator core 31, and the lower heat dissipation member 602 are easily aligned in the radial direction so that the screw openings 64, the screw openings 38, and the screw openings 65 overlap one another. In addition, the dimension of each of the radial portions 62 and the dimension of each of the teeth 35 are equal in the circumferential direction. Therefore, by aligning the edge of each of the radial portions 62 with the edge of the end surface of each of the teeth 35, the upper heat dissipation member 601, the stator core 31, and the lower heat dissipation member 602 are easily aligned in the circumferential direction so that the screw openings 64, the screw openings 38, and the screw openings 65 overlap one another.

In a state where the stator core 31 and the heat dissipation member 60 (the upper heat dissipation member 601 and the lower heat dissipation member 602) are aligned with one another and the heat dissipation member 60 is in contact with the end surface of the stator core 31, the stator core 31 and the heat dissipation member 60 are disposed in a mold for insert molding. After the stator core 31 and the heat dissipation member 60 are disposed in the mold, a synthetic resin for forming the insulator 32 is injected into the mold. The synthetic resin injected into the mold covers at least a part of the surface of the stator core 31 and at least a part of the surface of the heat dissipation member 60. The heat dissipation member 60 is fixed to the stator core 31 by the synthetic resin injected into the mold. In addition, the insulator 32 is formed by injecting the synthetic resin into the mold.

The synthetic resin for forming the insulator 32 may be injected into the mold in a state where pins fixed to the inner surface of the mold are disposed in the screw openings 64, the screw openings 38, and the screw openings By disposing the pins in the screw openings 64, the screw openings 38, and the screw openings 65, the mold, the stator core 31, and the heat dissipation member 60 (the upper heat dissipation member 601 and the lower heat dissipation member 602) are aligned with one another.

As described above, according to the present embodiment, the stator 30 includes the heat dissipation member 60 made of metal and facing the end surface of the stator core 31. At least a part of the heat dissipation member 60 is covered with the insulator 32. The coils 33 are mounted on the insulator 32. The heat of the coils 33 is transferred to the heat dissipation member 60 via the insulator 32. The heat of the coils 33 is efficiently dissipated via the heat dissipation member 60.

The thermal conductivity of the heat dissipation member 60 is higher than the thermal conductivity of the stator core 31. Since the heat dissipation member 60 has high thermal conductivity, the heat of the coils 33 is efficiently dissipated via the heat dissipation member 60.

At least a part of the heat dissipation member 60 is in contact with the end surface of the stator core 31. As a result, the heat transferred from the coils 33 to the heat dissipation member 60 is efficiently transferred to the stator core 31. Therefore, the heat of the coils 33 is efficiently dissipated via the heat dissipation member 60 and the stator core 31.

The heat dissipation member 60 has the radial portions 62 which are in contact with the end surfaces of the teeth 35. The coils 33 are respectively wound on the radial portions 62. Therefore, the heat of the coils 33 is efficiently transferred to the heat dissipation member 60.

The radial portions 62 of the heat dissipation member 60 are covered with the insulator 32. The ring portion 61 of the heat dissipation member 60 is not covered with the insulator 32. The ring portion 61 of the heat dissipation member 60 is disposed so as to be exposed to the outside of the insulator 32. Since the radial portions 62 are covered with the insulator 32, the heat of the coils 33 is efficiently transferred to the radial portions 62 via the insulator 32. The heat of the coils 33 transferred to the radial portions 62 is transferred from the radial portions 62 to the ring portion 61. Since the ring portion 61 is not covered with the insulator 32, the heat of the coils 33 is efficiently dissipated from the ring portion 61.

The heat dissipation fins 63 are provided on the ring portion 61. The heat dissipation fins 63 increase the surface area of the ring portion 61. As a result, the heat of the coils 33 transferred to the ring portion 61 is efficiently dissipated via the heat dissipation fins 63.

In the present embodiment, the end surface of the stator core 31 and the heat dissipation member 60 may not be in contact with each other. For example, an adhesive layer for connecting the stator core 31 to the heat dissipation member 60 may be provided between the end surface of the stator core 31 and the heat dissipation member 60.

Third Embodiment

A third embodiment will be described. In the following description, the same or equivalent components as those of the above-described embodiments are denoted by the same reference numerals, and the description thereof is simplified or omitted.

Figure 15:
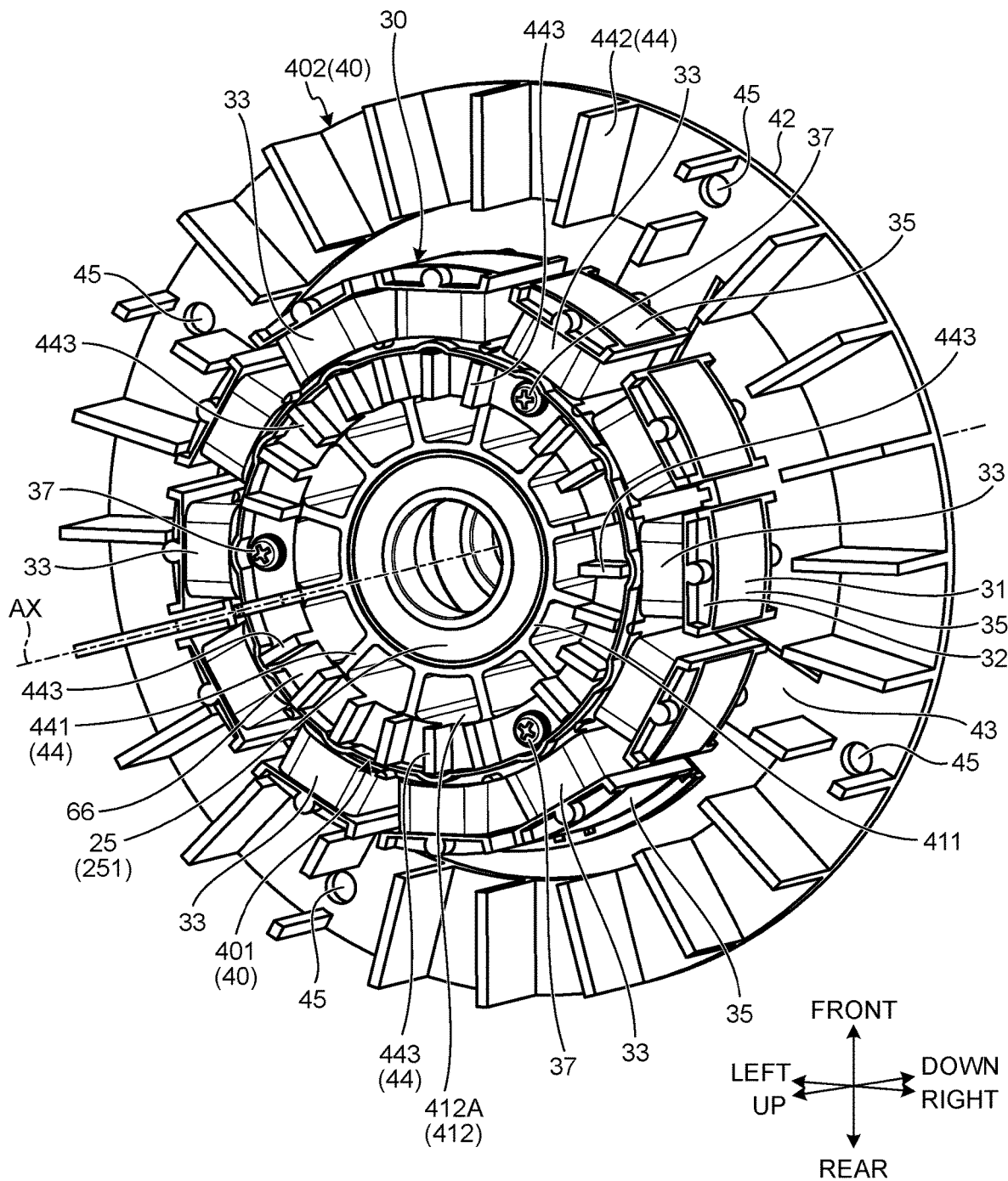
FIG. 15 is a perspective view illustrating a stator and a stator base according to a third embodiment.
Figure 16:
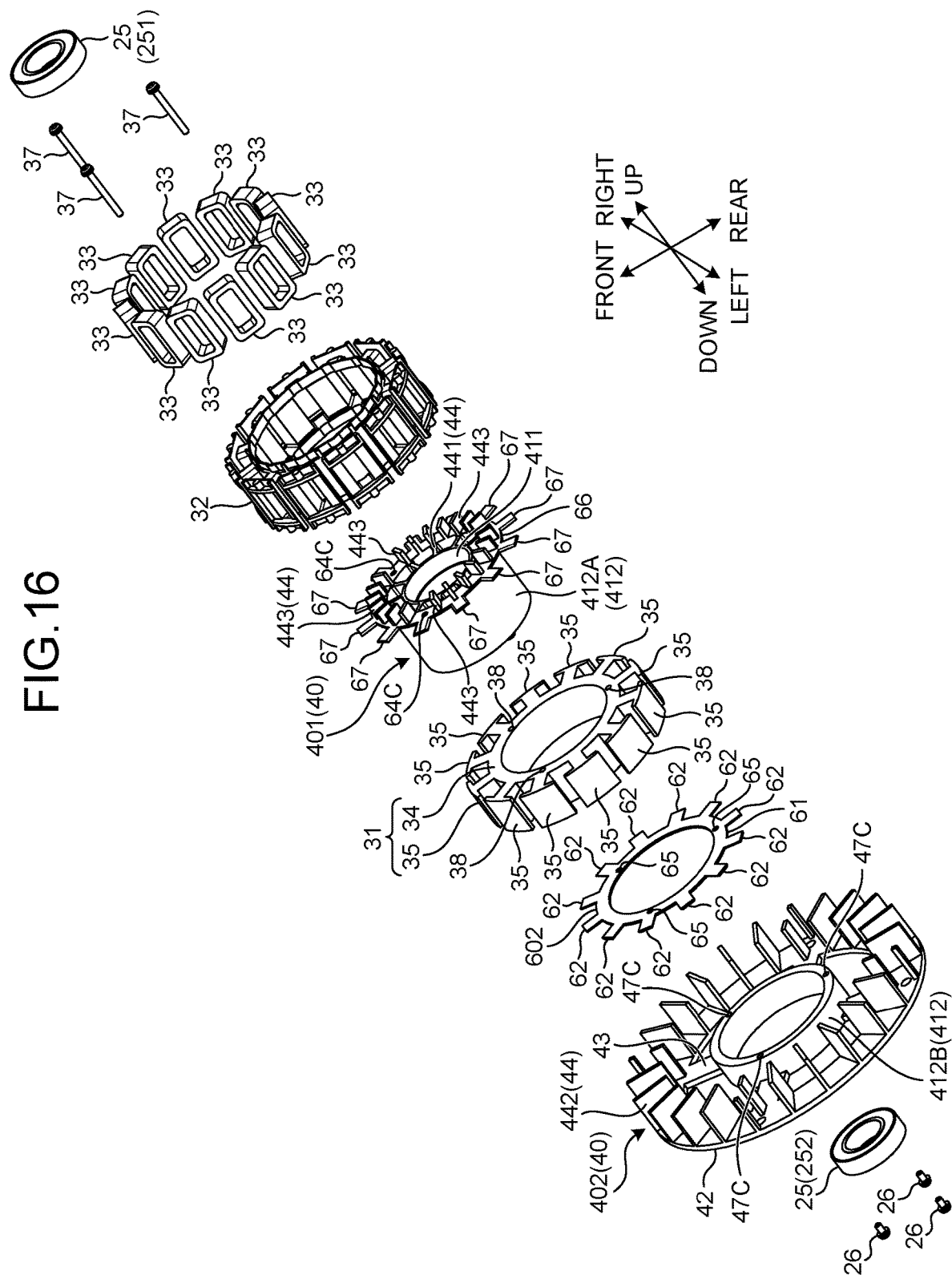
FIG. 16 is an exploded perspective view illustrating the stator and the stator base according to the third embodiment.
Figure 17:
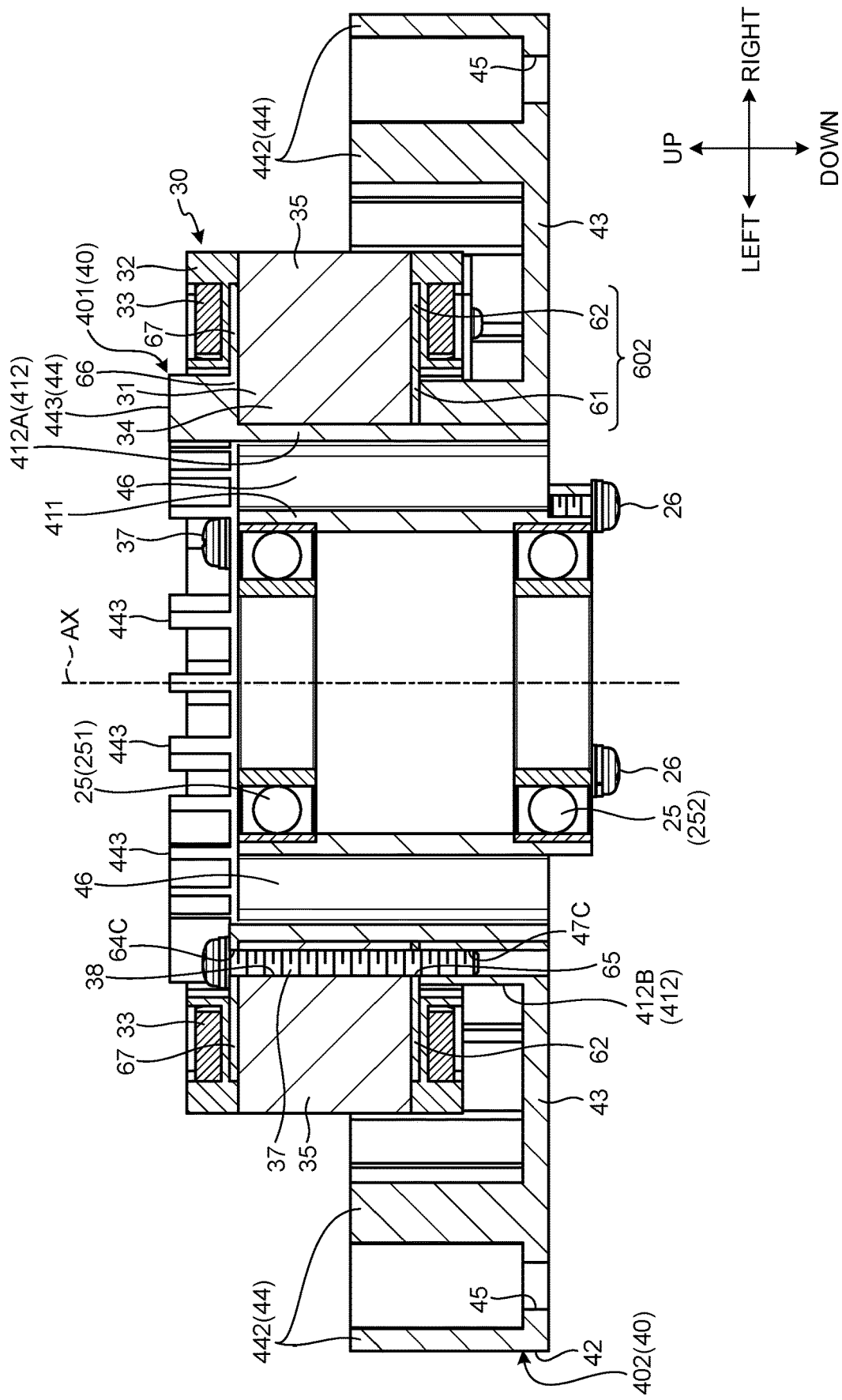
FIG. 17 is a longitudinal sectional view illustrating the stator and the stator base according to the third embodiment.

FIG. 15 is a perspective view illustrating a stator 30 and a stator base 40 according to the present embodiment. FIG. 16 is an exploded perspective view illustrating the stator 30 and the stator base 40 according to the present embodiment. FIG. 17 is a longitudinal sectional view illustrating the stator 30 and the stator base 40 according to the present embodiment.

In the present embodiment, the stator base 40 includes a first stator base 401 and a second stator base 402. The second stator base 402 is fixed to a fixing target. The first stator base and the second stator base are separate bodies. Each of the first stator base 401 and the second stator base 402 is made of aluminum. The first stator base 401 includes: a portion corresponding to the inner pipe portion 411 described in the above-described embodiment; a portion corresponding to the small diameter portion 412A of the outer pipe portion 412 described in the above-described embodiment; and the inner heat dissipation fins 441. The second stator base 402 includes: a portion corresponding to the large diameter portion 412B of the outer pipe portion 412 described in the above-described embodiment; the foot portion 42; the connection rib portions 43; and the outer heat dissipation fins 442. The first stator base 401 is disposed inside the stator core 31. The second stator base 402 is disposed outside the stator core 31.

The lower heat dissipation member 602 is disposed on the lower end surface of the stator core 31. As described in the second embodiment, the lower heat dissipation member 602 includes the ring portion 61 facing the lower end surface of the stator yoke 34 and the radial portions 62 respectively facing the lower end surfaces of the teeth 35.

In the present embodiment, the first stator base 401 includes a ring portion 66 facing the upper end surface of the stator yoke 34, and radial portions 67 protruding in the radial direction from the ring portion 66 and respectively facing the upper end surfaces of the teeth 35. In the present embodiment, the ring portion 66 is in contact with the upper end surface of the stator yoke 34. The radial portions 67 are respectively in contact with the upper end surfaces of the teeth 35.

At least a part of each of the radial portions 62 of the lower heat dissipation member 602 is covered with the insulator 32. At least a part of each of the radial portions 67 of the first stator base 401 is covered with the insulator 32. The insulator 32 is integrally molded with the stator core 31, the lower heat dissipation member 602, and the first stator base 401. The insulator 32 is fixed to the stator core 31, the lower heat dissipation member 602, and the first stator base 401 by, for example, insert molding.

The ring portion 61 of the lower heat dissipation member 602 is not covered with the insulator 32. The ring portion 66 of the first stator base 401 is not covered with the insulator 32.

In the present embodiment, the heat dissipation fins 44 (first heat dissipation fins) include intermediate heat dissipation fins 443 provided on the first stator base 401. The intermediate heat dissipation fins 443 are provided on the upper surface of the ring portion 66 of the first stator base 401. The intermediate heat dissipation fins 443 extend upward from the upper surface of the ring portion 66 of the first stator base 401. The intermediate heat dissipation fins 443 are provided with a gap interposed therebetween in the circumferential direction.

The first stator base 401, the stator core 31, the lower heat dissipation member 602, and the second stator base 402 are fixed by the stator screws 37. Screw openings 64C are formed in the ring portion 66 of the first stator base 401. The screw openings 38 are formed in the stator core 31. The screw openings 65 are formed in the ring portion 61 of the lower heat dissipation member 602. Screw holes 47C are formed in the end surface facing the upper side of the large diameter portion 412B of the second stator base 402.

The stator screws 37 are inserted into the respective screw openings 64C of the first stator base 401 from the upper side of the first stator base 401. The stator screws 37 are respectively inserted into the screw holes 47C of the second stator base 402 via the screw openings 64C of the first stator base 401, the screw openings 38 of the stator core 31, and the screw openings of the lower heat dissipation member 602. By coupling a screw thread provided in each of the stator screws 37 to screw grooves provided in each of the screw holes 47C, the first stator base 401, the stator core 31, the lower heat dissipation member 602, and the second stator base 402 are fixed by the stator screws 37. In the present embodiment, the first stator base 401, the stator core 31, the lower heat dissipation member 602, and the second stator base 402 are fixed by three stator screws 37.

Figure 18:
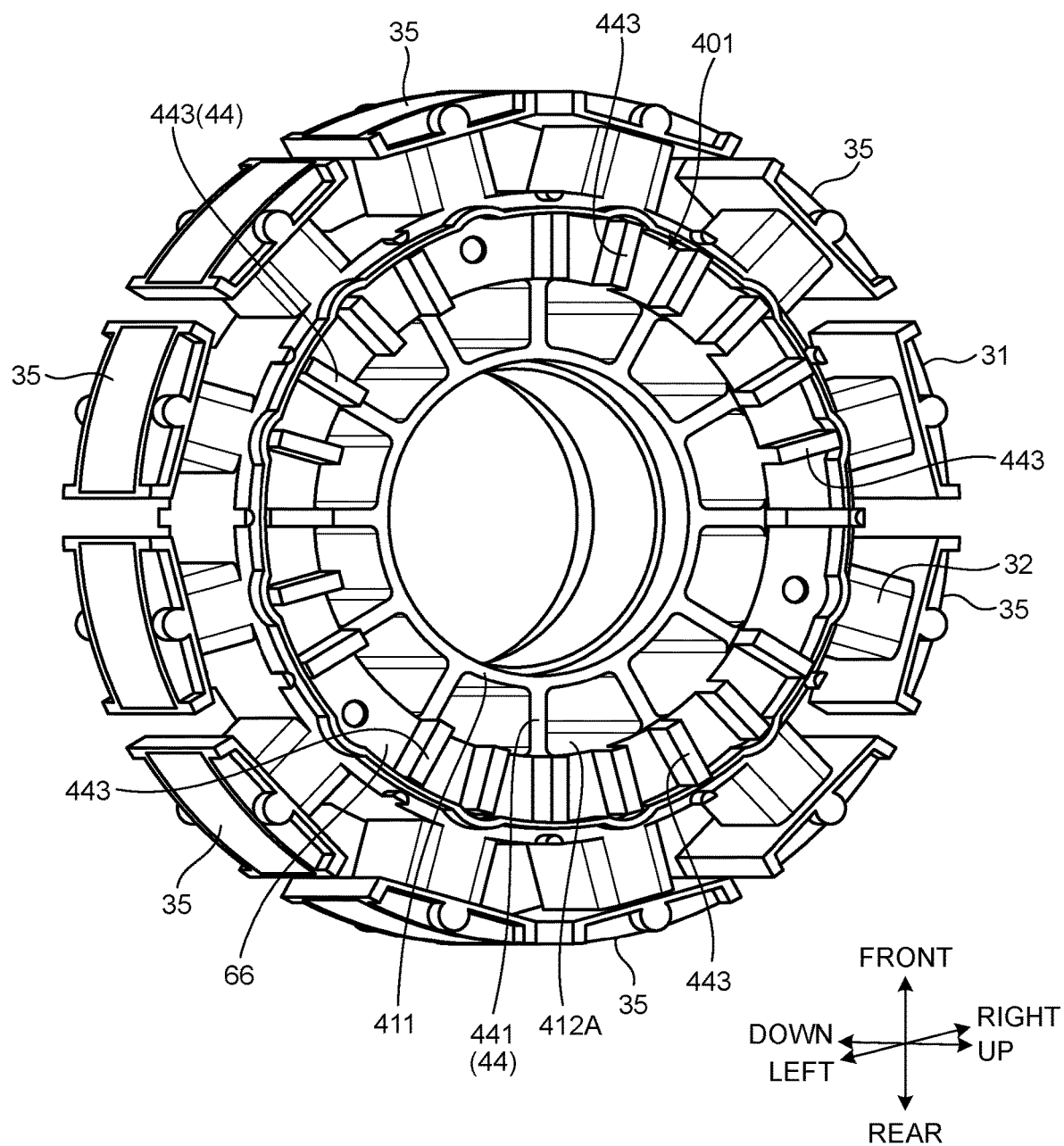
FIG. 18 is a perspective view illustrating a first stator base, a stator core, and an insulator according to the third embodiment.

FIG. 18 is a perspective view illustrating the first stator base 401, the stator core 31, and the insulator 32 according to the present embodiment. As illustrated in FIG. 18, the first stator base 401 is disposed inside the stator core 31. The first stator base 401 is separable from the second stator base 402. Therefore, when the first stator base 401 is inserted into the stator core 31 from the upper side of the stator core 31, the ring portion 66 and the radial portions 67 face the upper end surface of the stator core 31.

The coils 33 are respectively wound on the teeth via the insulator 32 by a coil winding machine (not illustrated). When the second stator base 402 is connected to the first stator base 401, it is difficult for the coil winding machine to smoothly wind the coils 33. By separating the second stator base 402 from the first stator base 401, the coil winding machine can wind the coils 33 around the insulator 32 covering the teeth 35.

As described above, according to the present embodiment, at least a part of the first stator base 401 is covered with the insulator 32. The heat of the coils 33 is transferred to the first stator base 401 via the insulator 32. The heat of the coils 33 is efficiently dissipated through the first stator base 401.

The first stator base 401 is made of aluminum. The thermal conductivity of the first stator base 401 is higher than the thermal conductivity of the stator core 31. Since the first stator base 401 has high thermal conductivity, the heat of the coils 33 is efficiently dissipated via the first stator base 401.

The first stator base 401 includes the ring portion 66 facing the upper end surface of the stator yoke 34, and the radial portions 67 protruding radially outward from the ring portion 66 and respectively facing the upper end surfaces of the teeth 35. The first stator base 401 is separable from the second stator base 402. Therefore, when the first stator base 401 is inserted into the stator core 31 from the upper side of the stator core 31, the ring portion 66 and the radial portions 67 can face the upper end surface of the stator core 31.

At least a part of the first stator base 401 is in contact with the upper end surface of the stator core 31. As a result, the heat transferred from the coils 33 to the first stator base 401 is efficiently transferred to the stator core 31. Therefore, the heat of the coils 33 is dissipated through the first stator base 401 and the stator core 31.

The radial portions 67 of the first stator base 401 are covered with the insulator 32. The ring portion 66 of the first stator base 401 is not covered with the insulator 32. The ring portion 66 of the first stator base 401 is disposed so as to be exposed to the outside of the insulator 32. Since the radial portions 67 are covered with the insulator 32, the heat of the coils 33 is efficiently transferred to the radial portions 67 via the insulator 32. The heat of the coils 33 transferred to the radial portions 67 is transferred from the radial portions 67 to the ring portion 66. Since the ring portion 66 is not covered with the insulator 32, the heat of the coils 33 is efficiently dissipated from the ring portion 66.

The intermediate heat dissipation fins 443 are provided on the ring portion 66 of the first stator base 401. The surface area of the ring portion 66 is increased by the intermediate heat dissipation fins 443. As a result, the heat of the coils 33 transferred to the ring portion 66 is efficiently dissipated via the intermediate heat dissipation fins 443.

In the present embodiment, the ring portion 66 and the radial portions 67 of the first stator base 401 may not be in contact with the upper end surface of the stator core 31. For example, an adhesive layer may be provided between the ring portion 66 and the radial portions 67 of the first stator base 401 and the upper end surface of the stator core 31.

Fourth Embodiment

A fourth embodiment will be described. In the following description, the same or equivalent components as those of the above-described embodiments are denoted by the same reference numerals, and the description thereof is simplified or omitted.

Figure 19:
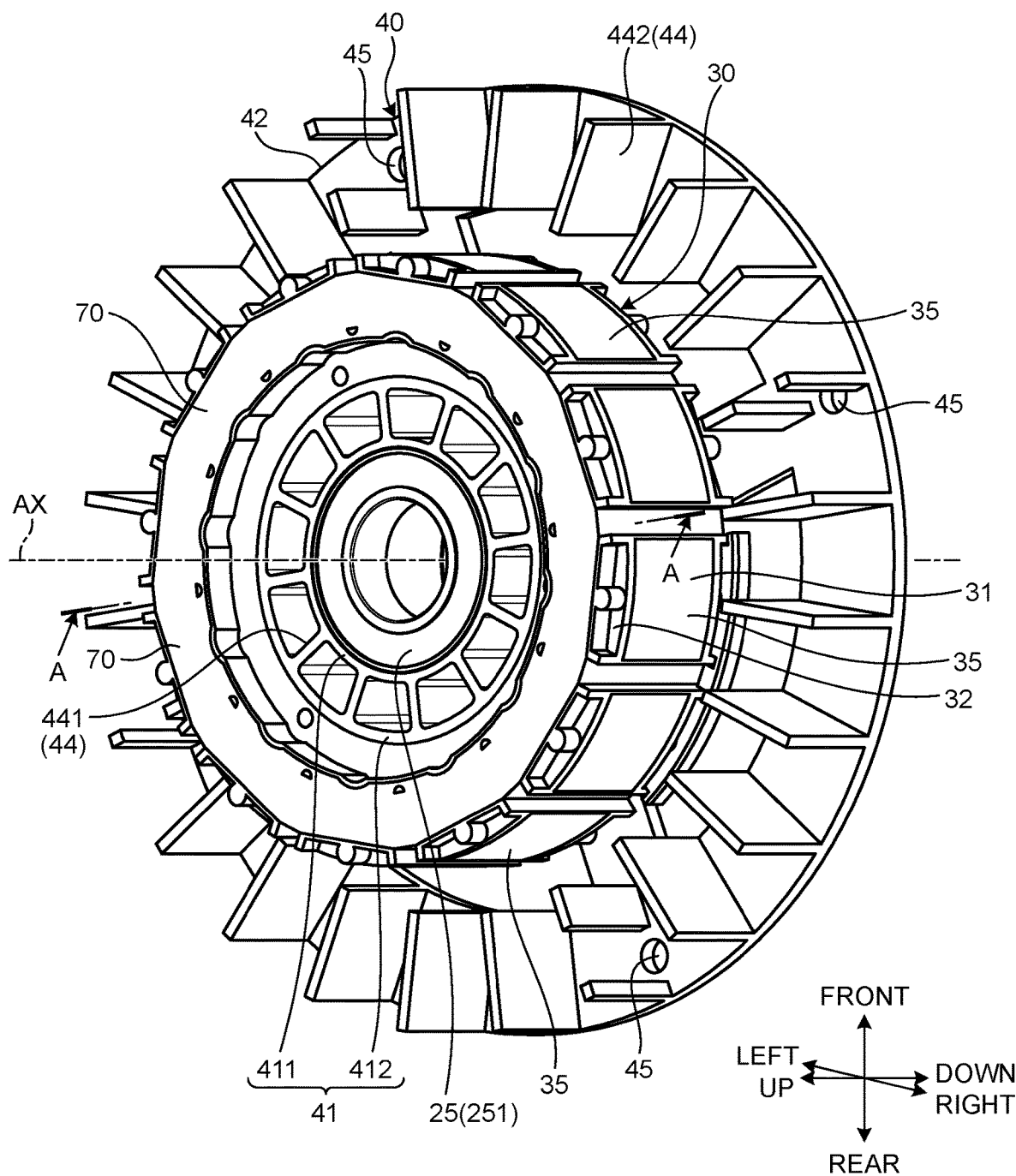
FIG. 19 is a perspective view illustrating a stator and a stator base according to a fourth embodiment.
Figure 20:
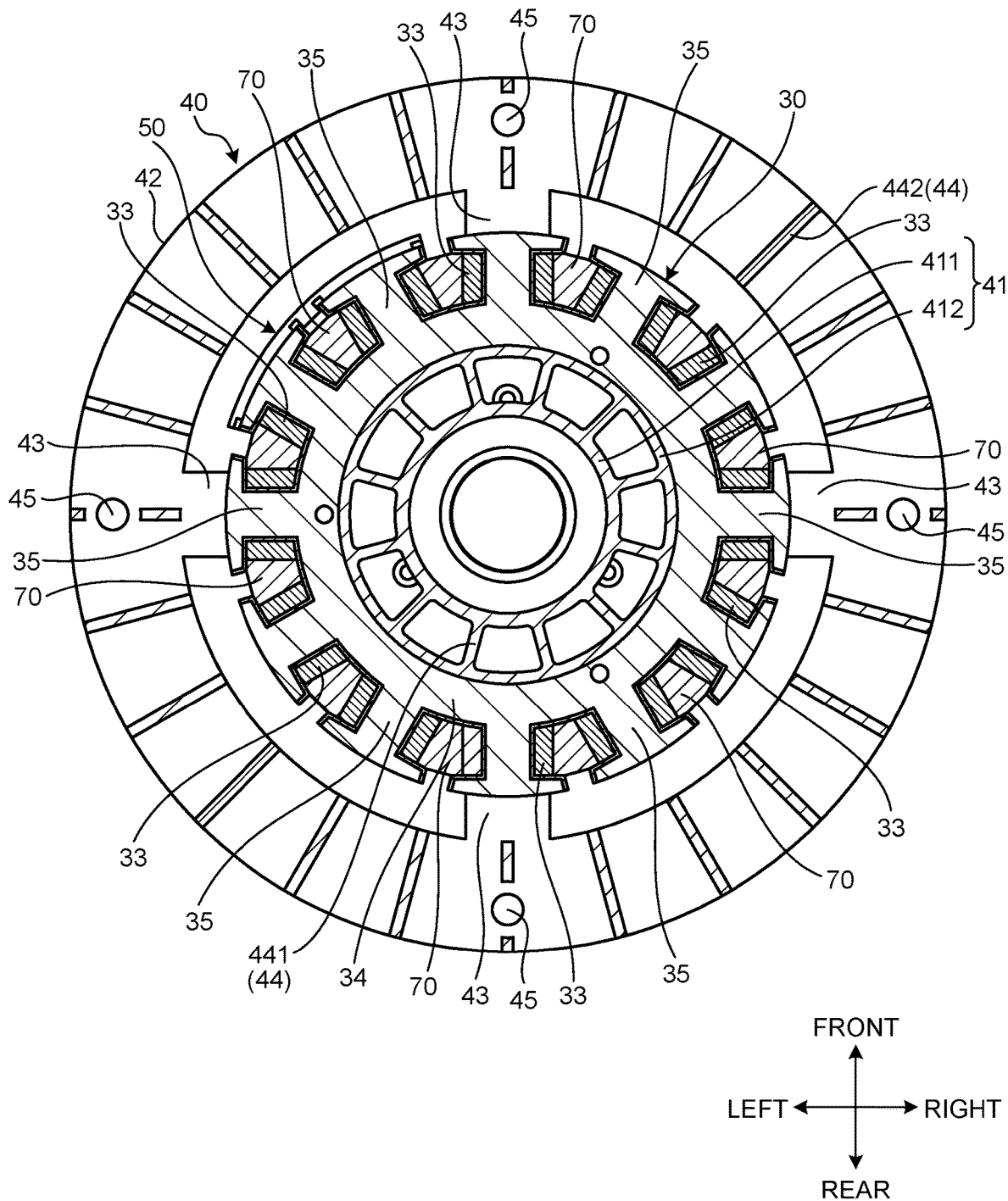
FIG. 20 is a transverse cross-sectional view illustrating the stator and the stator base according to the fourth embodiment.
Figure 21:
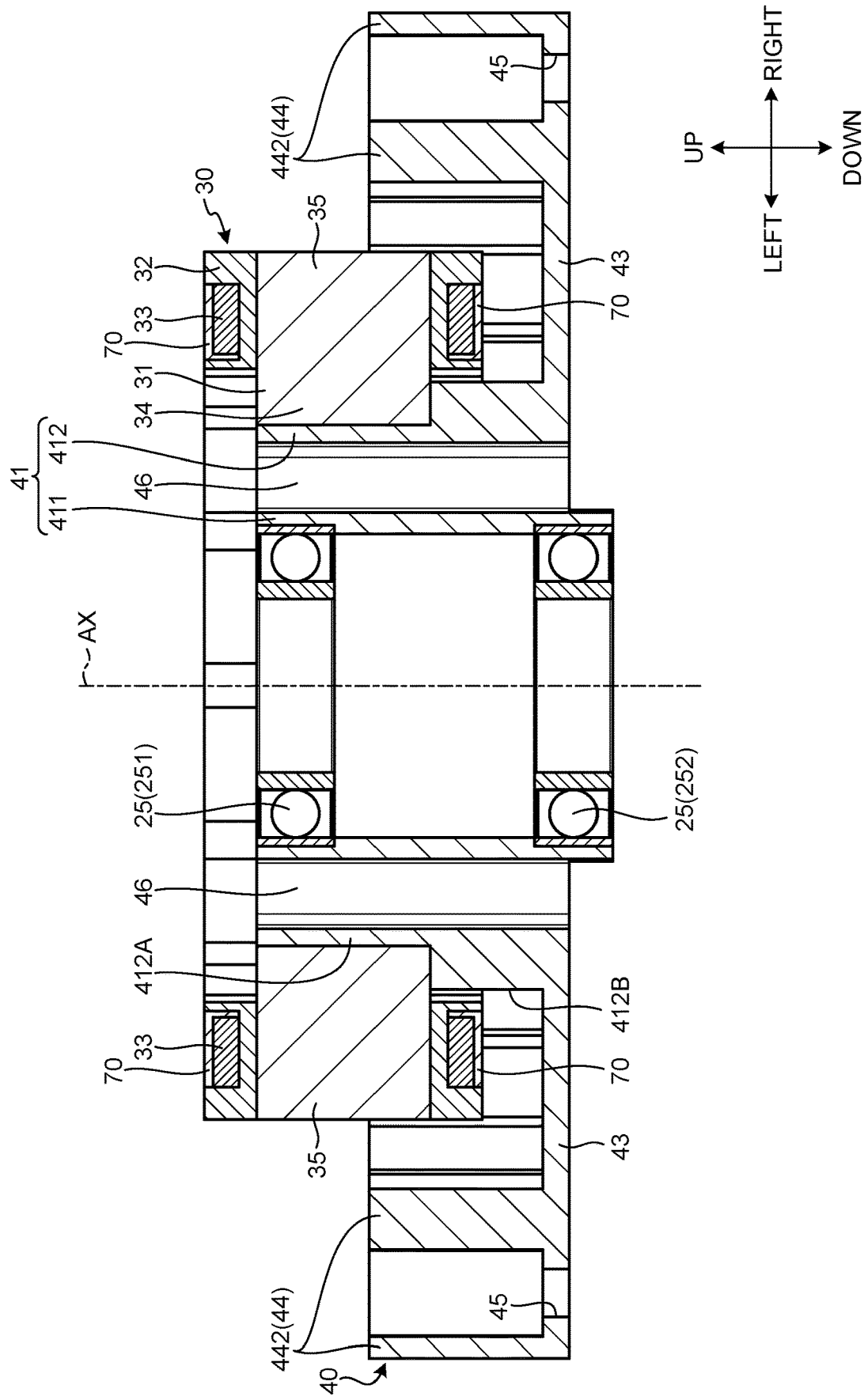
FIG. 21 is a longitudinal sectional view illustrating the stator and the stator base according to the fourth embodiment.

FIG. 19 is a perspective view illustrating a stator 30 and a stator base 40 according to the present embodiment. FIG. 20 is a transverse cross-sectional view illustrating the stator 30 and the stator base 40 according to the present embodiment. FIG. 21 is a cross-sectional view illustrating the stator 30 and the stator base 40 according to the present embodiment. The transverse cross-sectional view is a cross-sectional view orthogonal to the rotation axis AX and corresponds to a cross-sectional arrow view taken along line A-A in FIG. 19.

In the present embodiment, the stator 30 includes a resin portion 70 that covers the coils 33. The resin portion 70 is made of a synthetic resin. The coils 33 are molded with the synthetic resin.

The resin portion 70 has high thermal conductivity and electrical insulation. For example, when the thermal conductivity of nylon resin is 0.2 [W/m·K], the thermal conductivity of the synthetic resin used for the resin portion 70 is higher than 0.2 [W/m·K].

Examples of the electrically insulating synthetic resin having thermal conductivity of higher than 0.2 [W/m·K] include "XMT2001", "2547T", "4001TS", and "C5091TS" of Reny (registered trademark) available from Mitsubishi Engineering-Plastics Corporation. The thermal conductivities of these materials at 30° C. measured by using a temperature wave analysis method (ISO 22007-3) are 0.5 [W/(m·K)] or more and 1.1 [W/(m·K)] or less.

Furthermore, examples of the electrically insulating synthetic resin having thermal conductivity of higher than 0.2 [W/m·K] include "TGN510" and "TGN515U" of NOVA-DURAN (registered trademark) manufactured by Mitsubishi Engineering-Plastics Corporation. The thermal conductivities of these materials at 23° C. measured by using a hot disk method (ISO 22007-2) are 0.4 [W/(m·K)] or more and 1.8 [W/(m·K)] or less.

The thermal conductivity of the resin portion 70 at 25° C. measured by using a laser flash method is 0.5 [W/(m·K)] or more, preferably 1 [W/(m·K)]. Although the upper limit of the thermal conductivity of the resin portion 70 is not particularly limited, the thermal conductivity of the resin portion 70 at 25° C. measured by using the laser flash method is 10 [W/(m·K)] or less, preferably 5 [W/(m·K)] or less.

Examples of a synthetic resin having the thermal conductivity of 1 [W/(m·K)] or more and 5 [W/(m·K)] or less measured by using the laser flash method include "PA6-based insulation type", "PA10-based insulation type", and "PA66-based insulation type" of Xecot (registered trademark) of Unitika Ltd. The thermal conductivity of these synthetic resins is 2 [W/(m·K)] or more and 5 [W/(m·K)] or less in the planar direction, and 1 [W/(m·K)] or more and 1.5 [W/(m·K)] or less in the thickness direction.

The resin portion 70 may be made of a nylon resin containing a thermally conductive filler having insulation performance. The resin portion 70 may be made of a poly phenylene sulfide (PPS) resin containing a thermally conductive filler having insulation performance. Examples of the thermally conductive filler having insulation performance include an aluminum nitride filler and an aluminum oxide filler. The content of the thermally conductive filler with respect to the nylon resin or the polyphenylene sulfide resin may be determined so that the thermal conductivity of the synthetic resin used for the resin portion 70 is 1 [W/(m·K)] or more and 5 [W/(m·K)] or less.

As described above, according to the present embodiment, the coils 33 are covered with the resin portion having high thermal conductivity and electrical insulation. In the present embodiment, the synthetic resin forming the resin portion 70 has higher thermal conductivity than the nylon resin. Since the thermal conductivity of the synthetic resin forming the resin portion 70 is higher than the thermal conductivity of the nylon resin, the heat of the coils 33 is efficiently dissipated via the resin portion 70. Further, since the coils 33 are covered with the resin portion 70, the coils 33 is protected by the resin portion 70. For example, contact between the coils 33 and moisture or foreign matters is suppressed by the resin portion 70.

The thermal conductivity of the resin portion 70 measured by using the laser flash method is preferably 1 [W/(m·K)] or more. Since the thermal conductivity of the resin portion 70 is 1 [W/(m·K)] or more, the resin portion 70 can efficiently take away the heat of the coils 33. The upper limit value of the thermal conductivity of the resin portion 70 measured by using the laser flash method is not particularly limited, and it may be 5 [W/(m·K)] or less.

Fifth Embodiment

A fifth embodiment will be described. In the following description, the same or equivalent components as those of the above-described embodiments are denoted by the same reference numerals, and the description thereof is simplified or omitted.

Figure 22:
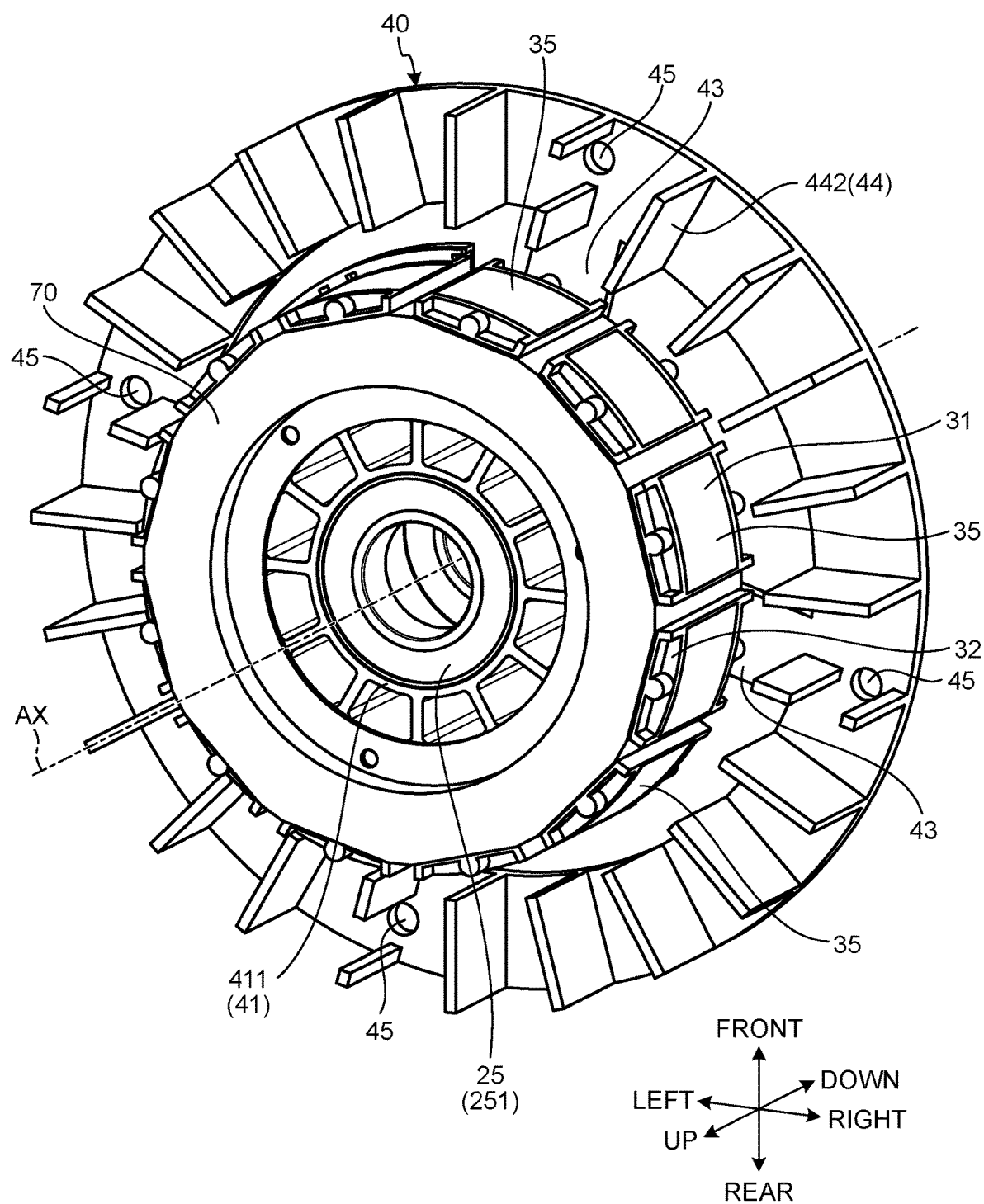
FIG. 22 is a perspective view illustrating a stator and a stator base according to a fifth embodiment.
Figure 23:
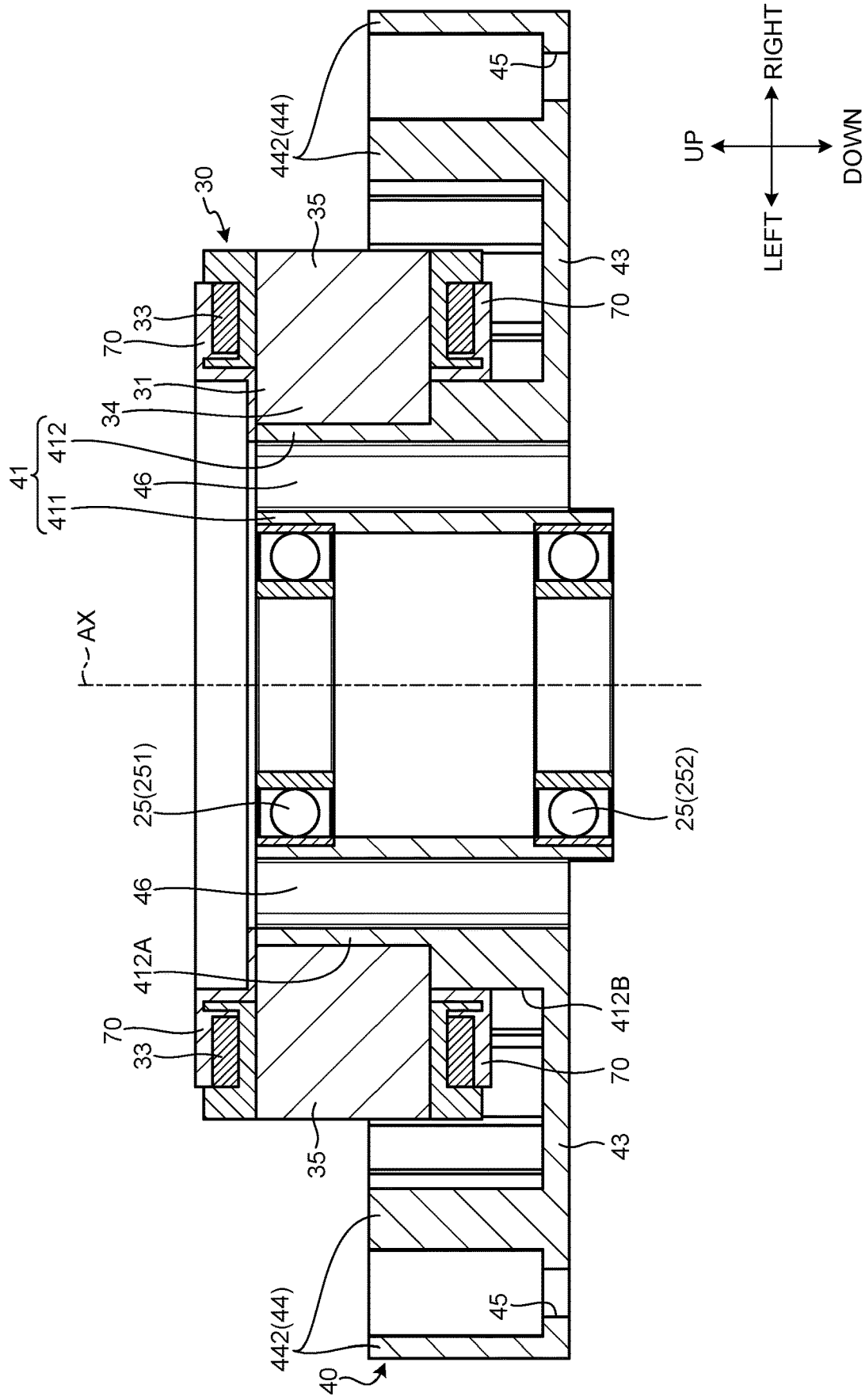
FIG. 23 is a longitudinal sectional view illustrating the stator and the stator base according to the fifth embodiment.

FIG. 22 is a perspective view illustrating a stator 30 and a stator base 40 according to the present embodiment. FIG. 23 is a longitudinal sectional view illustrating the stator 30 and the stator base 40 according to the present embodiment.

As in the above-described fourth embodiment, the stator 30 includes the resin portion 70 that covers the coils 33. In the present embodiment, the resin portion 70 is connected to each of the stator base 40 and the stator core 31. The resin portion 70 is in contact with a part of the outer surface of the large diameter portion 412B of the outer pipe portion 412. The resin portion 70 is in contact with the upper end surface of the small diameter portion 412A of the outer pipe portion 412. The resin portion 70 is in contact with a part of the end surface of the stator core 31 facing in the axial direction.

As described above, according to the present embodiment, the resin portion 70 is connected to each of the stator base 40 and the stator core 31. The heat of the coils 33 is efficiently transferred to each of the stator base 40 and the stator core 31 via the resin portion 70. The heat of the coils 33 is efficiently dissipated from the stator base 40 and the stator core 31.

Sixth Embodiment

A sixth embodiment will be described. In the following description, the same or equivalent components as those of the above-described embodiments are denoted by the same reference numerals, and the description thereof is simplified or omitted.

Figure 24:
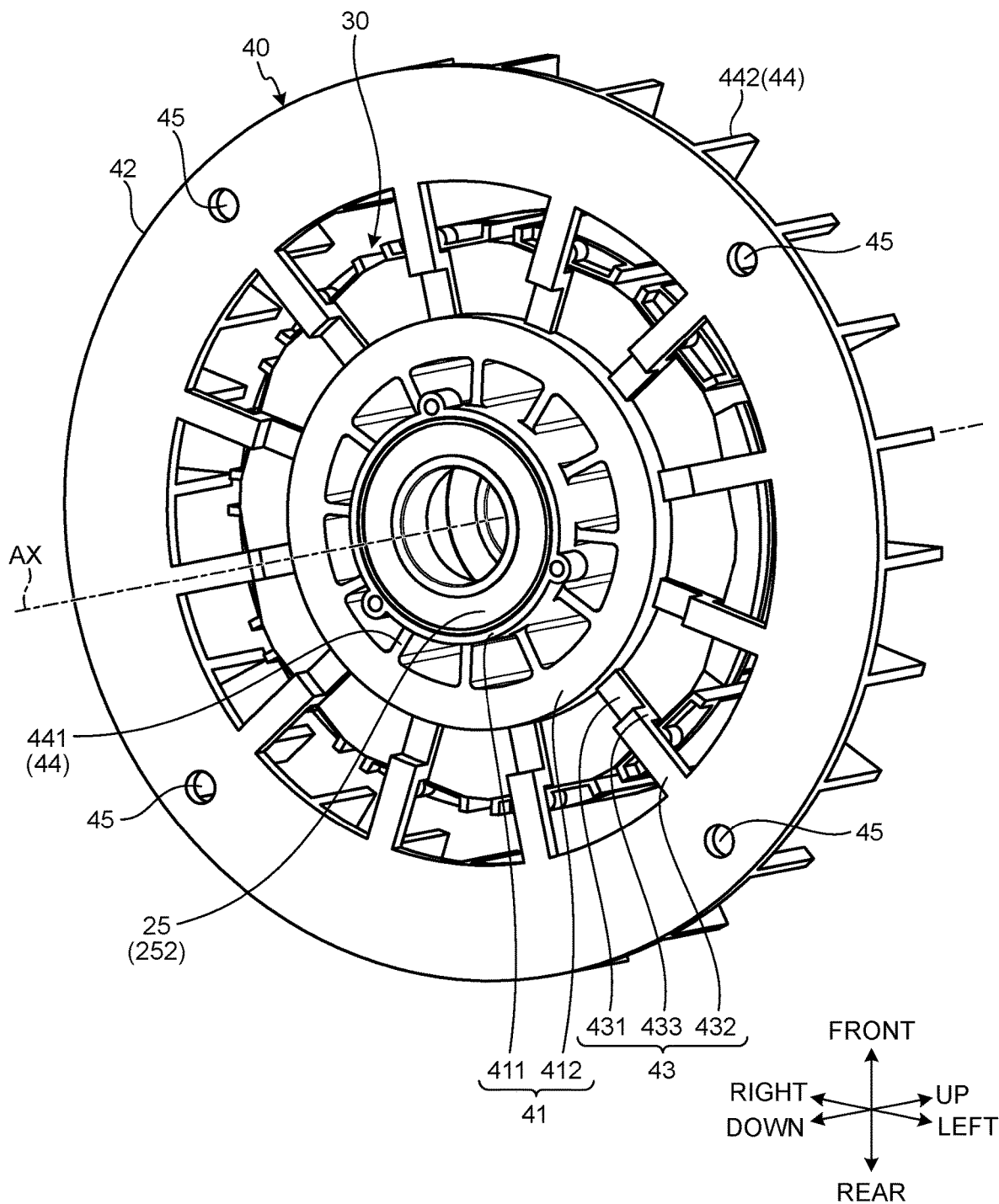
FIG. 24 is a perspective view illustrating a stator and a stator base according to a sixth embodiment.
Figure 25:
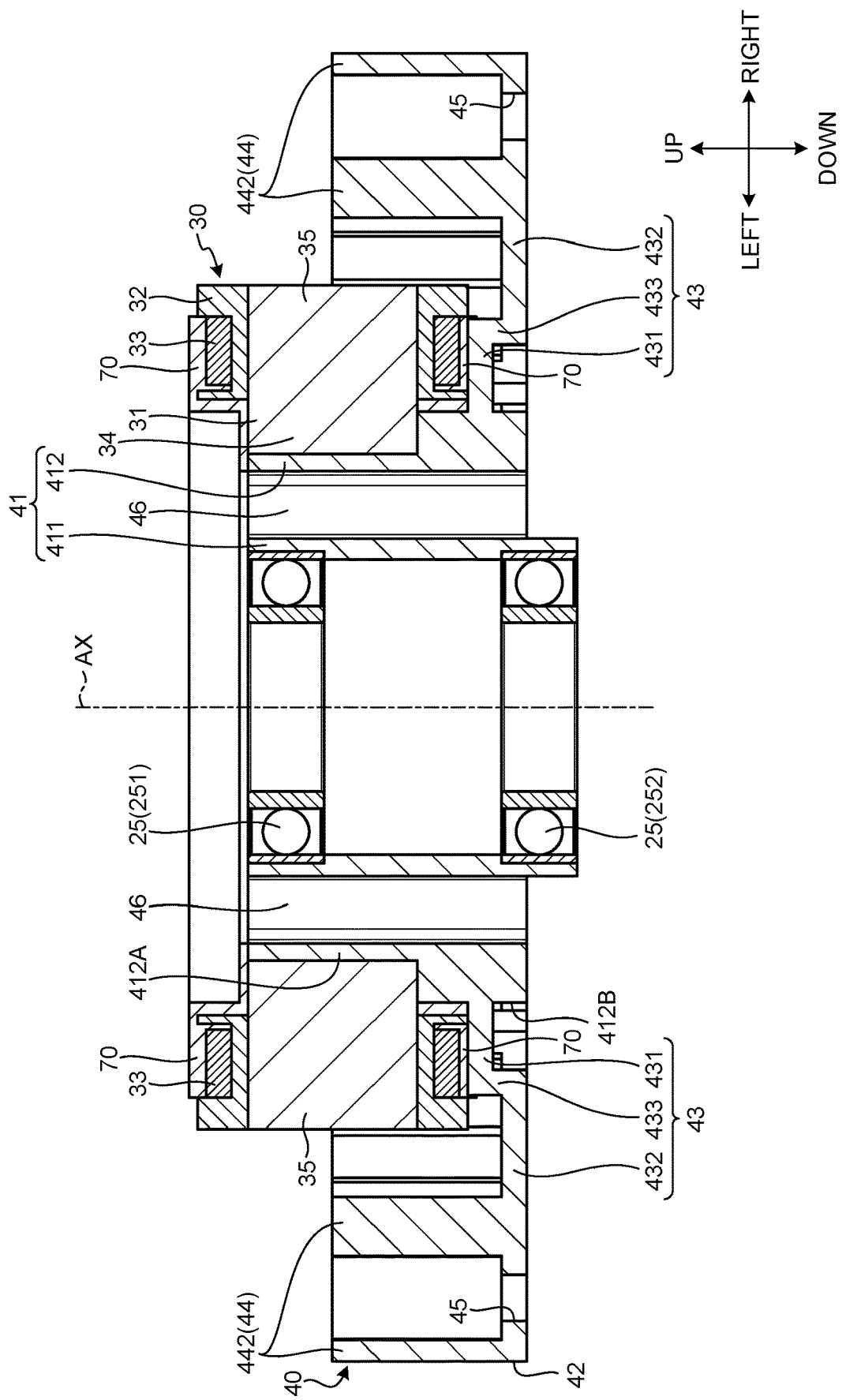
FIG. 25 is a longitudinal sectional view illustrating the stator and the stator base according to the sixth embodiment.

FIG. 24 is a perspective view illustrating a stator 30 and a stator base 40 according to the present embodiment. FIG. 25 is a longitudinal sectional view illustrating the stator 30 and the stator base 40 according to the present embodiment.

As in the above-described fourth and fifth embodiments, the stator 30 includes the resin portion 70 that covers the coils 33.

As in the second embodiment described above, each of the connection rib portions 43 of the stator base 40 includes the inner rib portion 431, the outer rib portion 432, and the bent portion 433 disposed between the inner rib portion 431 and the outer rib portion 432. The outer rib portion 432 is disposed radially outside the inner rib portion 431. The inner rib portion 431 is disposed on the upper side with respect to the outer rib portion 432. That is, a distance between the inner rib portion 431 and the corresponding coil 33 is shorter than a distance between the outer rib portion 432 and the corresponding coil 33 in the axial direction.

The resin portion 70 is connected to the connection rib portions 43 of the stator base 40. The resin portion 70 is connected to the inner rib portions 431.

As described above, according to the present embodiment, the resin portion 70 is connected to the connection rib portions 43 of the stator base 40. The heat of the coils 33 is efficiently transferred to the connection rib portions 43 and the foot portion 42 via the resin portion 70. The heat of the coils 33 is efficiently dissipated from the connection rib portions 43 and the foot portion 42.

The resin portion 70 is disposed between the coils 33 and the inner rib portions 431 in the axial direction. Therefore, the thickness of the resin portion is suppressed from becoming excessively large. The thickness of the resin portion 70 refers to the dimension of the resin portion 70 in the axial direction.

Seventh Embodiment

A seventh embodiment will be described. In the following description, the same or equivalent components as those of the above-described embodiments are denoted by the same reference numerals, and the description thereof is simplified or omitted.

Figure 26:
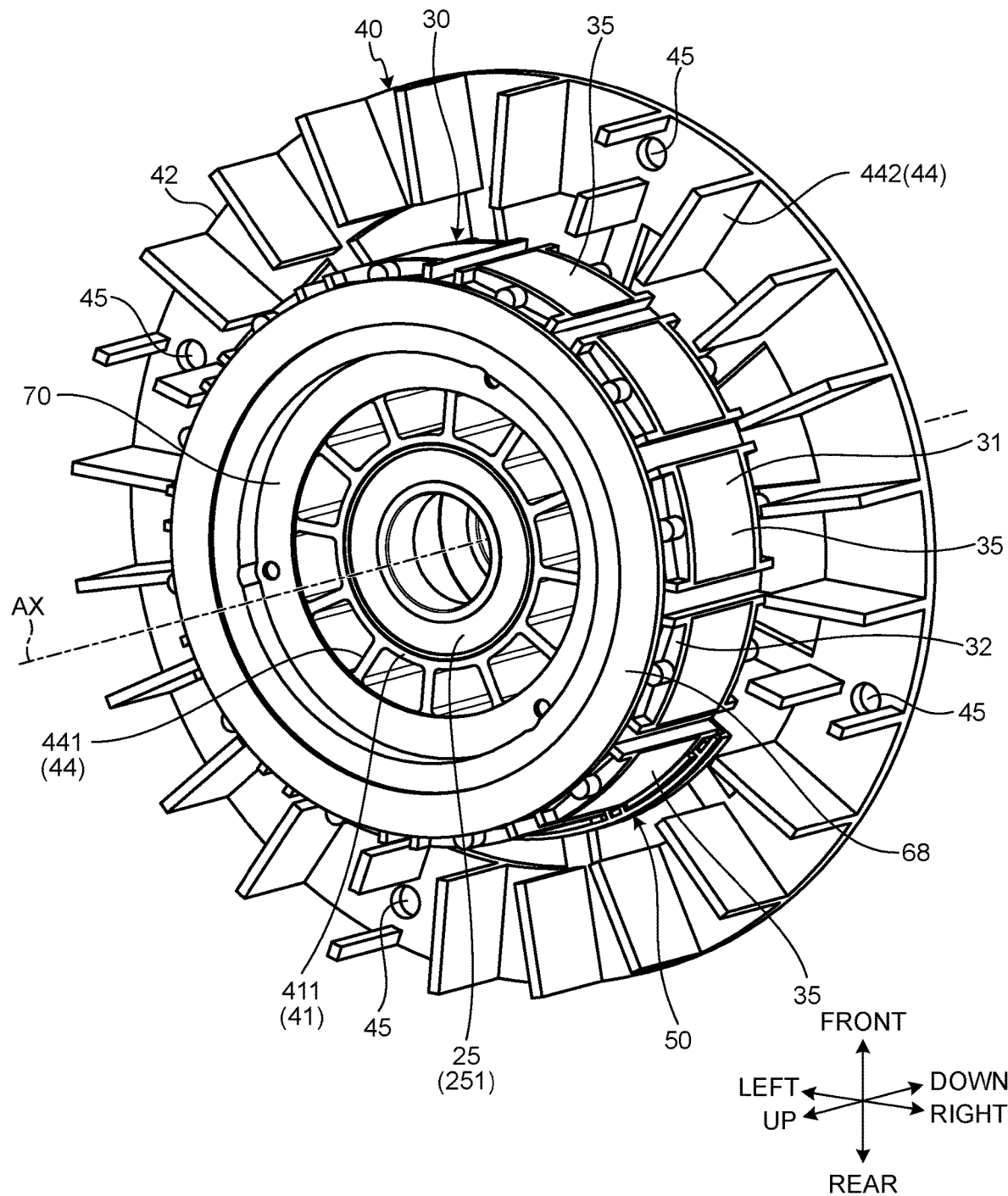
FIG. 26 is a perspective view illustrating a stator and a stator base according to a seventh embodiment.
Figure 27:
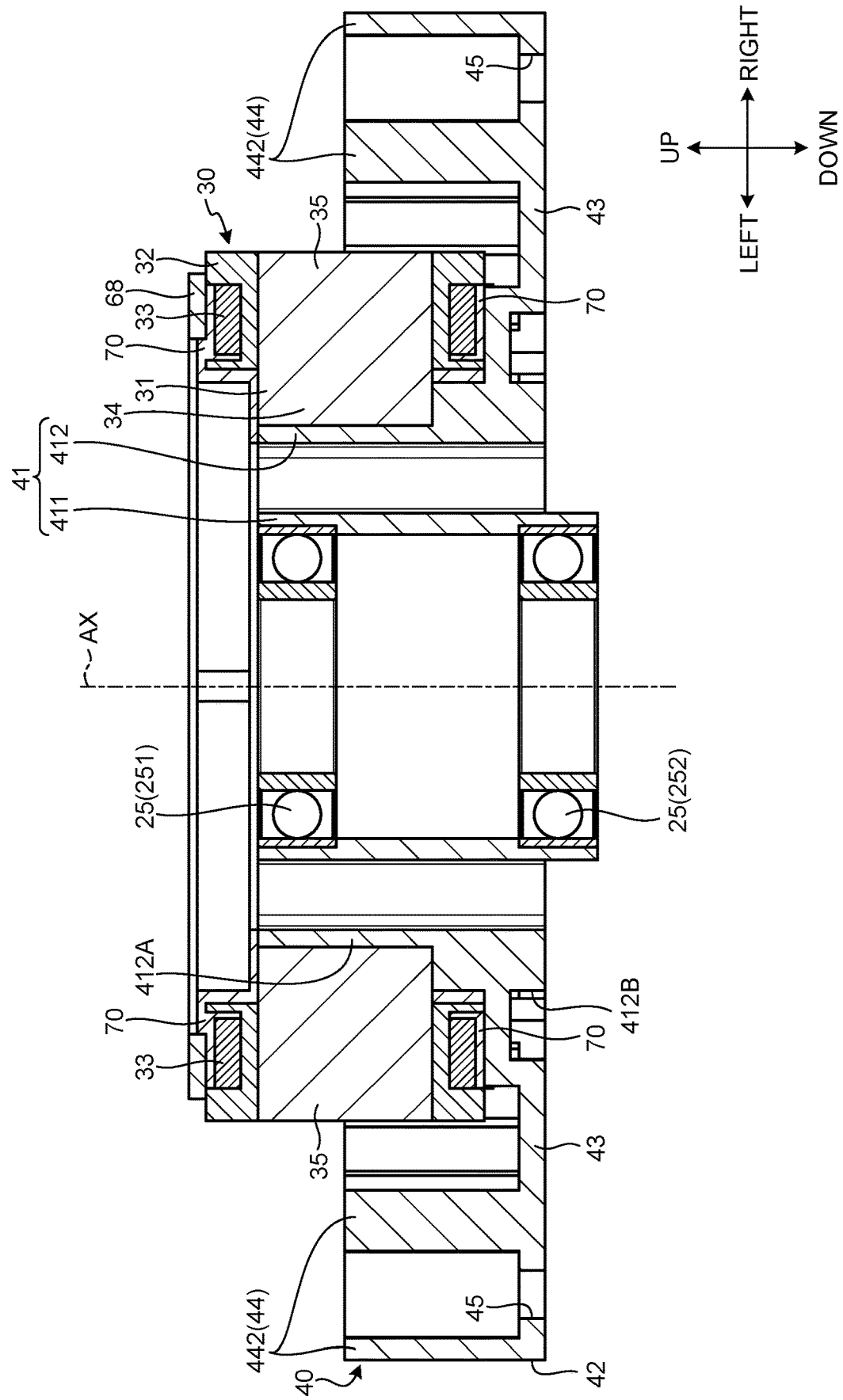
FIG. 27 is a longitudinal sectional view illustrating the stator and the stator base according to the seventh embodiment.

FIG. 26 is a perspective view illustrating a stator 30 and a stator base 40 according to the present embodiment. FIG. 27 is a longitudinal sectional view illustrating the stator 30 and the stator base 40 according to the present embodiment.

As in the above-described fourth to sixth embodiments, the stator 30 includes the resin portion 70 that covers the coils 33.

In the present embodiment, the stator 30 includes a heat dissipation member 68 (second heat dissipation member) supported by the insulator 32. The heat dissipation member 68 may not be supported by the insulator 32.

The heat dissipation member 68 has an annular shape. The heat dissipation member 68 has a plate shape. In the present embodiment, the heat dissipation member 68 is supported by the upper end surface of the insulator 32. A part of the lower surface of the heat dissipation member 68 is fixed to the upper end surface of the insulator 32. A part of the lower surface of the heat dissipation member 68 faces the upper end surfaces of the coils 33.

The heat dissipation member 68 is made of metal. The thermal conductivity of the heat dissipation member 68 is higher than the thermal conductivity of the stator core 31. The thermal conductivity of the heat dissipation member 68 is higher than the thermal conductivity of the insulator 32. In the present embodiment, the heat dissipation member 68 is made of aluminum.

The resin portion 70 is connected to the heat dissipation member 68. At least a part of the resin portion 70 is disposed between the upper end surfaces of the coils 33 and the lower surface of the heat dissipation member 68. The resin portion 70 is in contact with the coils 33 and the heat dissipation member 68. Further, the resin portion 70 covers at least a part of the insulator 32. The resin portion 70 is in contact with at least a part of the insulator 32.

As described above, according to the present embodiment, the heat dissipation member 68 is supported by the insulator. At least a part of the heat dissipation member 68 faces the coils 33. The resin portion 70 that covers the coils 33 is connected to the heat dissipation member 68. The heat of the coils 33 is efficiently transferred to the heat dissipation member 68 via the resin portion 70. The heat of the coils 33 is efficiently dissipated from the heat dissipation member 68.

Eighth Embodiment

An eighth embodiment will be described. In the following description, the same or equivalent components as those of the above-described embodiments are denoted by the same reference numerals, and the description thereof is simplified or omitted.

Figure 28:
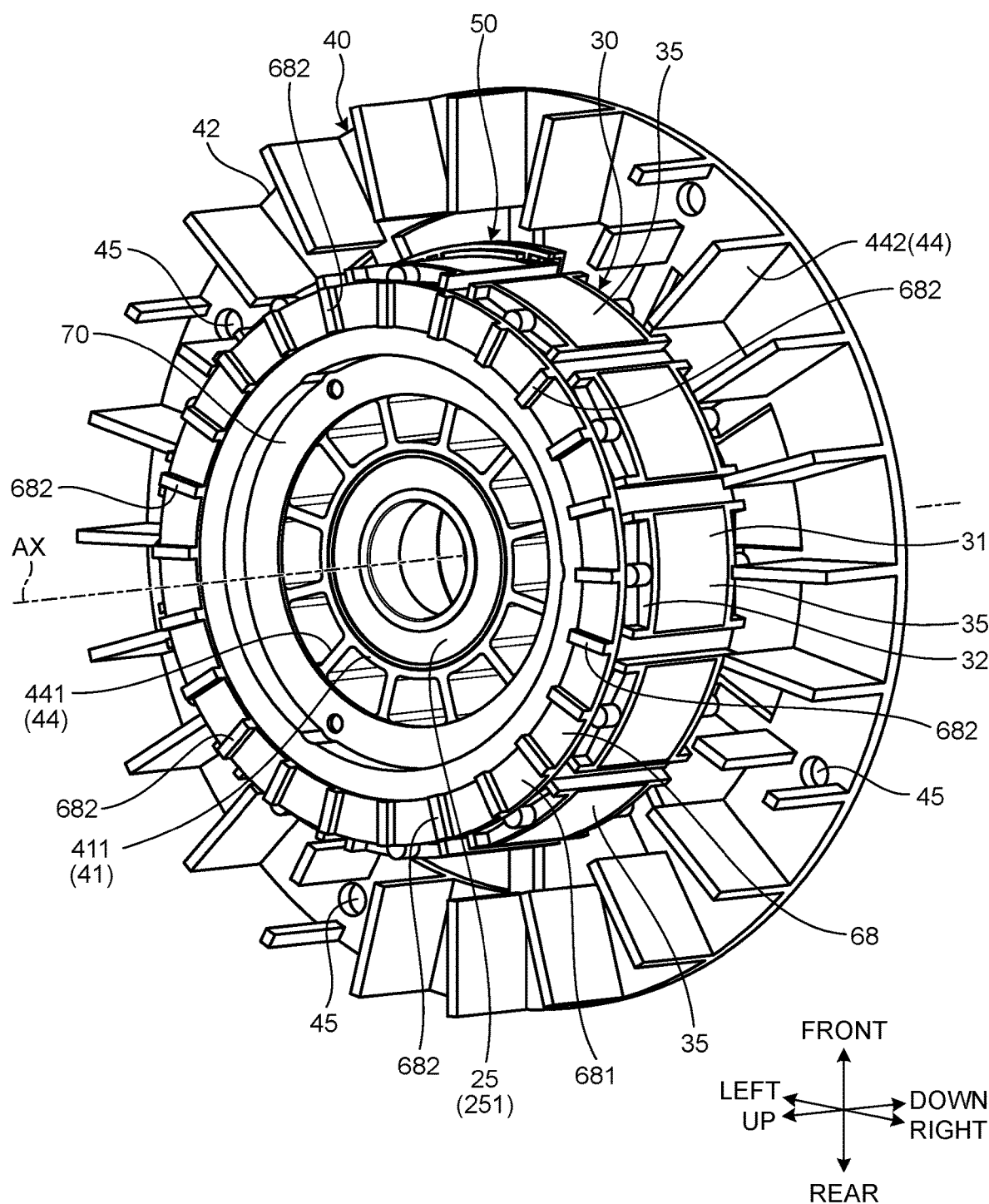
FIG. 28 is a perspective view illustrating a stator and a stator base according to an eighth embodiment.

FIG. 28 is a perspective view illustrating a stator 30 and a stator base 40 according to the present embodiment.

As in the above-described fourth to seventh embodiments, the stator 30 includes the resin portion 70 that covers the coils 33. As in the above-described seventh embodiment, the stator 30 includes the heat dissipation member 68 supported by the insulator 32.

In the present embodiment, the heat dissipation member 68 includes a ring-shaped plate portion 681 connected to each of the insulator 32 and the resin portion and heat dissipation fin portions 682 provided on the plate portion 681. The heat dissipation fin portions 682 extend upward from the upper surface of the plate portion 681. The heat dissipation fin portions 682 are provided with a gap interposed therebetween in the circumferential direction.

As described above, according to the present embodiment, the heat dissipation member 68 is provided with the heat dissipation fin portions 682. The heat of the coils 33 is efficiently transferred to the heat dissipation member 68 via the resin portion 70. The heat of the coils 33 is efficiently dissipated from the heat dissipation member 68 having the heat dissipation fin portions 682.

Ninth Embodiment

A ninth embodiment will be described. In the following description, the same or equivalent components as those of the above-described embodiments are denoted by the same reference numerals, and the description thereof is simplified or omitted.

Figure 29:
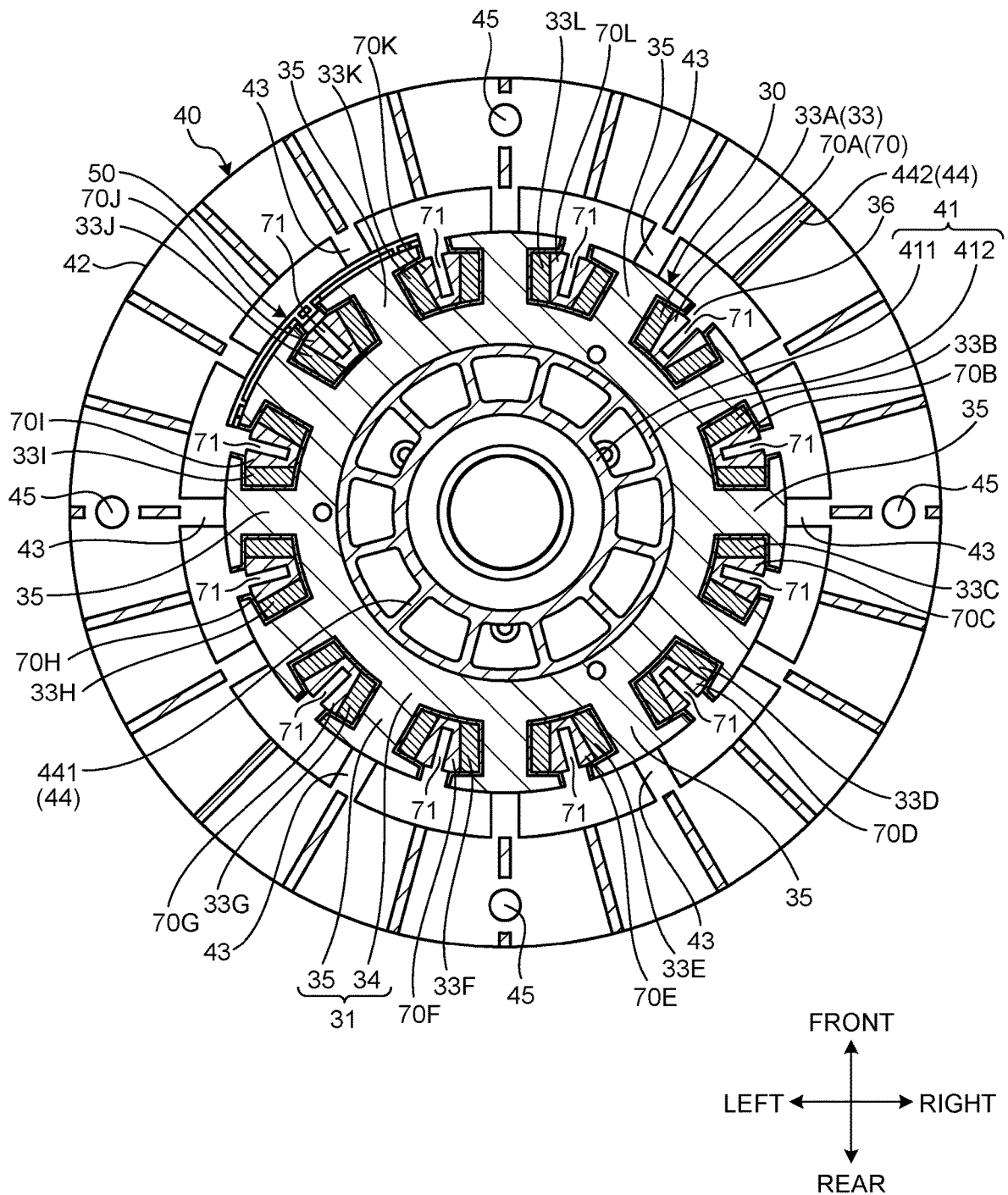
FIG. 29 is a transverse cross-sectional view illustrating a stator and a stator base according to a ninth embodiment.

FIG. 29 is a transverse cross-sectional view illustrating a stator 30 and a stator base 40 according to the present embodiment.

As in the above-described fourth to eighth embodiments, the stator 30 includes the resin portion 70 that covers the coils 33. As in the first to eighth embodiments described above, the stator 30 includes 12 coils 33. The coils 33 includes a first coil 33A to a twelfth coil 33L.

The resin portion 70 includes a first resin portion 70A that covers the first coil 33A and a second resin portion 70B that covers the second coil 33B adjacent to the first coil 33A. In addition, the resin portion 70 includes a third resin portion 70C to a twelfth resin portion 70L that cover the third coil 33C to the twelfth coil 33L, respectively.

A gap 71 is provided between the first resin portion 70A and the second resin portion 70B. The gap 71 is provided inside a slot 36. The gap 71 is formed along the shape of the slot 36.

Similarly, the gap 71 between the second resin portion 70B and the third resin portion 70C is formed. The same applies to the fourth resin portion 70D to the twelfth resin portion 70L.

As described above, in the present embodiment, the resin portion 70 is disposed in a part of each of the slots 36. Air can flow through the gaps 71 of the resin portion 70. The air flowing through the gaps 71 takes away the heat transferred from the coils 33 to the resin portion 70. Therefore, the heat of the coils 33 is efficiently dissipated.

Tenth Embodiment

A tenth embodiment will be described. In the following description, the same or equivalent components as those of the above-described embodiments are denoted by the same reference numerals, and the description thereof is simplified or omitted.

Figure 30:
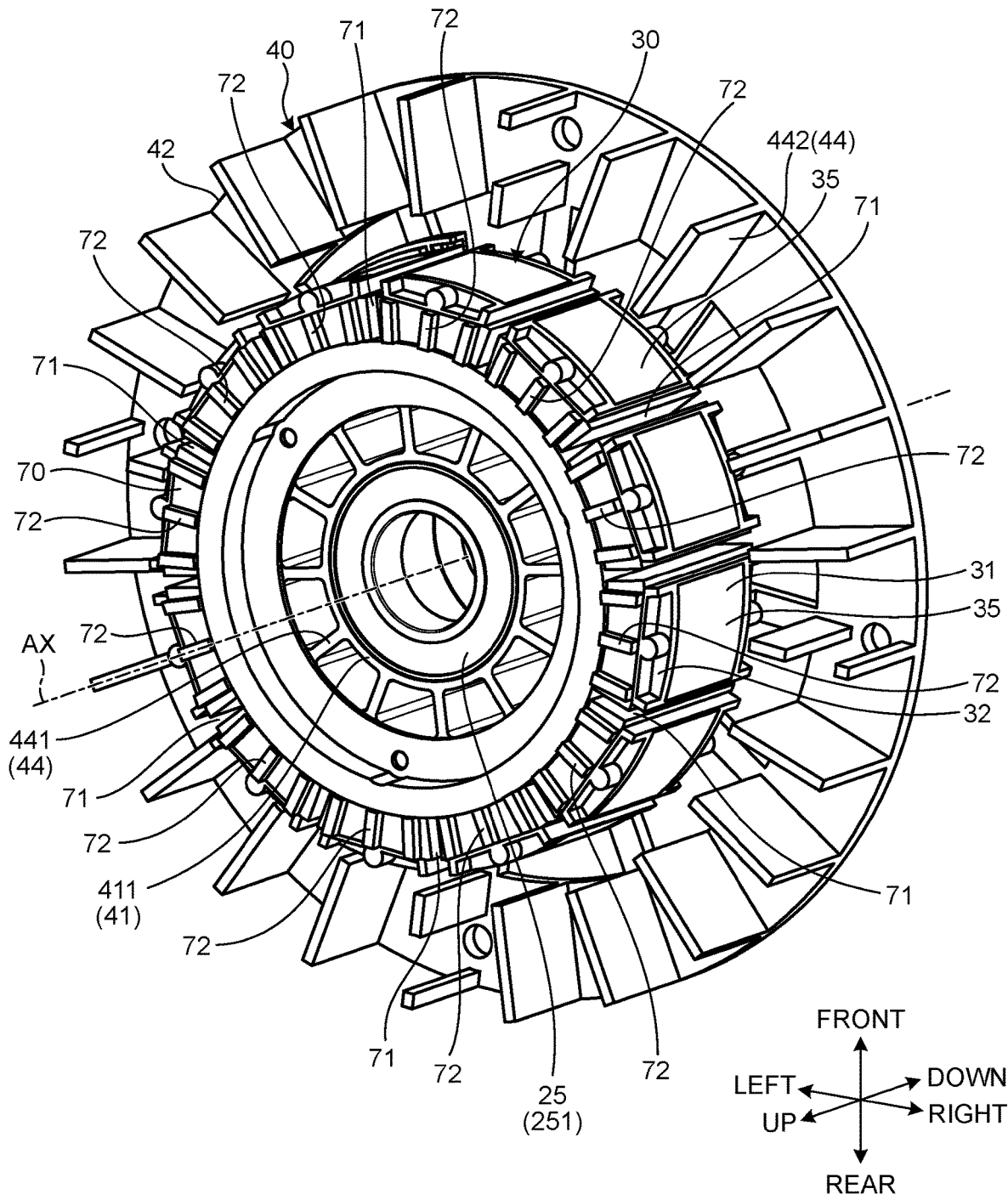
FIG. 30 is a perspective view illustrating a stator and a stator base according to a tenth embodiment.

FIG. 30 is a perspective view illustrating a stator 30 and a stator base 40 according to the present embodiment.

As in the above-described fourth to ninth embodiments, the stator 30 includes the resin portion 70 that covers the coils 33. In the present embodiment, the resin portion 70 has heat dissipation fin portions 72 disposed on the upper surface of the resin portion 70. The heat dissipation fin portions 72 extend upward from the upper surface of the resin portion 70. The heat dissipation fin portions 72 are provided with a gap interposed therebetween in the circumferential direction.

As described above, in the present embodiment, the heat dissipation fin portions 72 are provided on the resin portion 70. The heat of the coils 33 transferred to the resin portion 70 is efficiently dissipated from the heat dissipation fin portions 72.

Eleventh Embodiment

An eleventh embodiment will be described. In the following description, the same or equivalent components as those of the above-described embodiments are denoted by the same reference numerals, and the description thereof is simplified or omitted.

Figure 31:
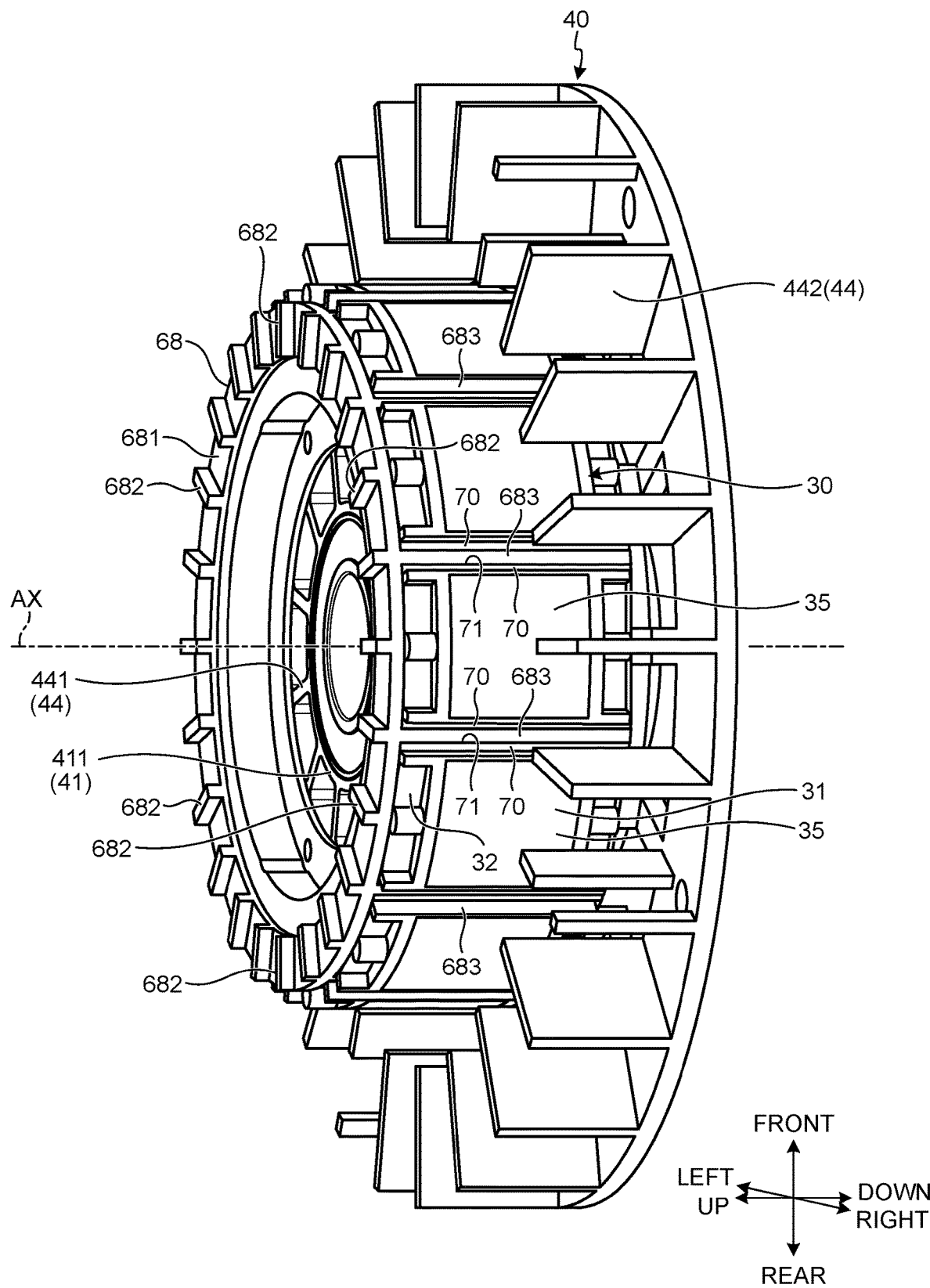
FIG. 31 is a perspective view illustrating a stator and a stator base according to an eleventh embodiment.
Figure 32:
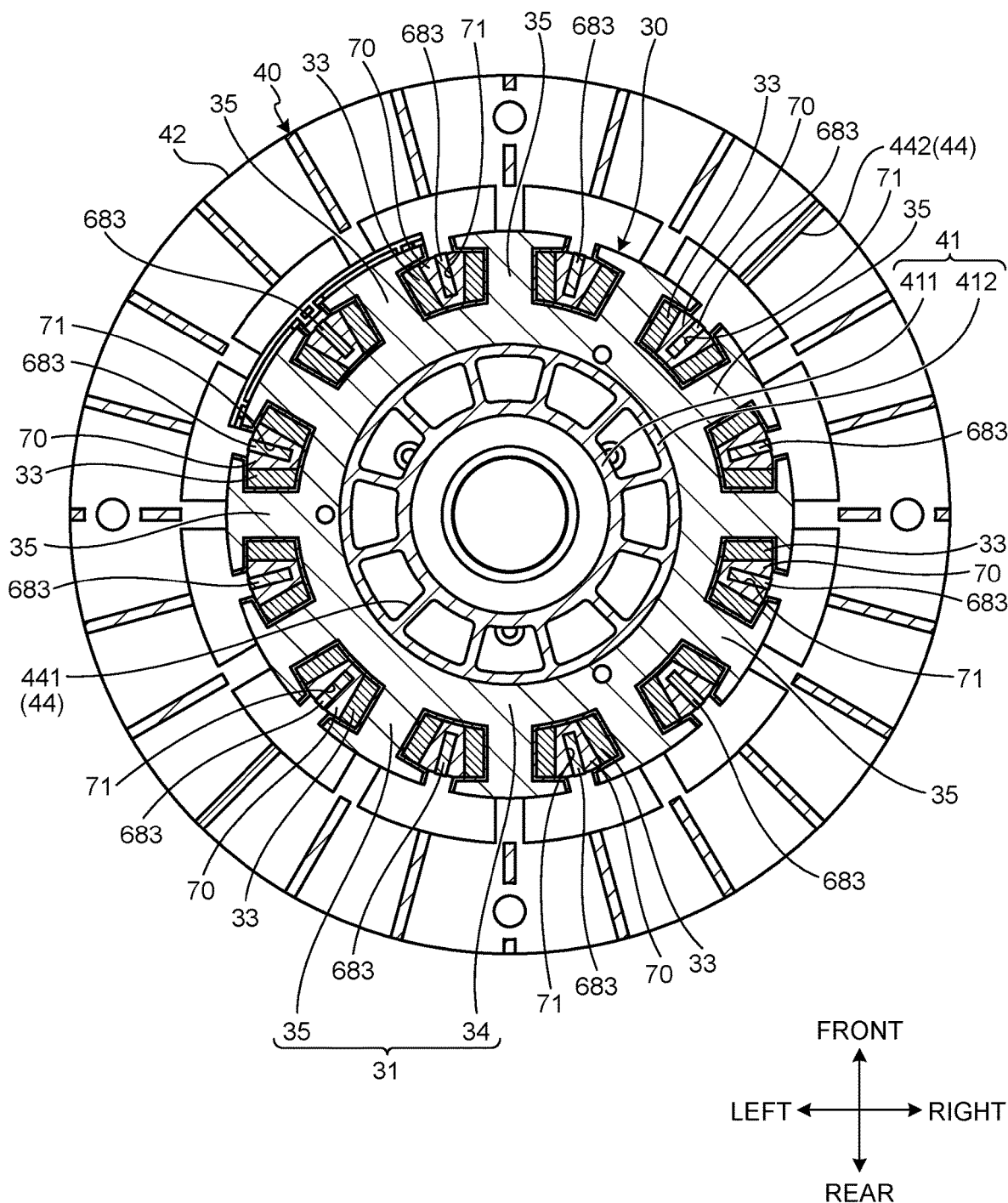
FIG. 32 is a transverse cross-sectional view illustrating the stator and the stator base according to the eleventh embodiment.

FIG. 31 is a perspective view illustrating a stator 30 and a stator base 40 according to the present embodiment. FIG. 32 is a transverse cross-sectional view illustrating the stator 30 and the stator base 40 according to the present embodiment.

As in the above-described fourth to tenth embodiments, the stator 30 includes the resin portion 70 that covers the coils 33. As in the ninth embodiment and the tenth embodiment described above, the resin portion 70 has the gaps 71. As in the seventh embodiment and the eighth embodiment described above, the stator 30 includes the heat dissipation member 68 (second heat dissipation member) supported by the insulator 32.

In the present embodiment, the heat dissipation member 68 includes: the ring-shaped plate portion 681 supported by the insulator 32; the heat dissipation fin portions 682 provided on the plate portion 681; and a columnar rib portions 683 respectively disposed in the gaps 71 of the resin portion 70.

The plate portion 681 is connected to the insulator 32 and the resin portion 70.

The heat dissipation fin portions 682 extend upward from the upper surface of the plate portion 681. The heat dissipation fin portions 682 are provided with a gap interposed therebetween in the circumferential direction.

The columnar rib portions 683 extend downward from the lower surface of the plate portion 681. The columnar rib portions 683 are in contact with the resin portion 70 in a state of being disposed in the respective gaps 71.

As described above, in the present embodiment, the columnar rib portions 683 of the heat dissipation member 68 are disposed in the respective gaps 71 of the resin portion 70. The heat of the coils 33 is transferred to the columnar rib portions 683 via the resin portion 70. The heat of the coils 33 transferred to the columnar rib portions 683 is transferred to the plate portion 681 and the heat dissipation fin portions 682. The heat of the coils 33 is transferred to the plate portion 681 and the heat dissipation fin portions 682 through the columnar rib portions 683. The heat of the coils 33 is efficiently dissipated from the plate portion 681 and the heat dissipation fin portions 682.

Twelfth Embodiment

A twelfth embodiment will be described. In the following description, the same or equivalent components as those of the above-described embodiments are denoted by the same reference numerals, and the description thereof is simplified or omitted.

Figure 33:
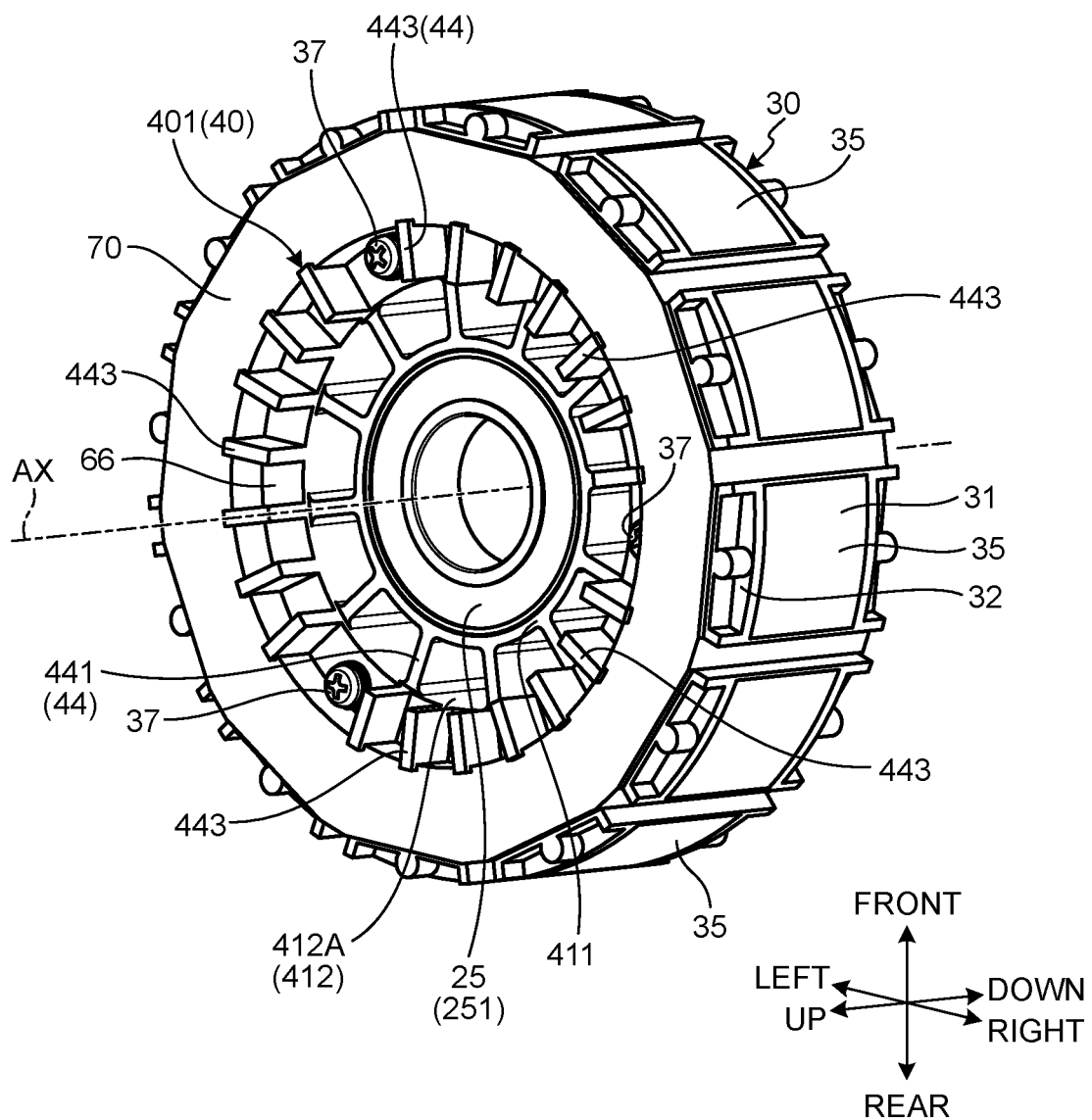
FIG. 33 is a perspective view illustrating a part of a stator and a stator base according to a twelfth embodiment.
Figure 34:
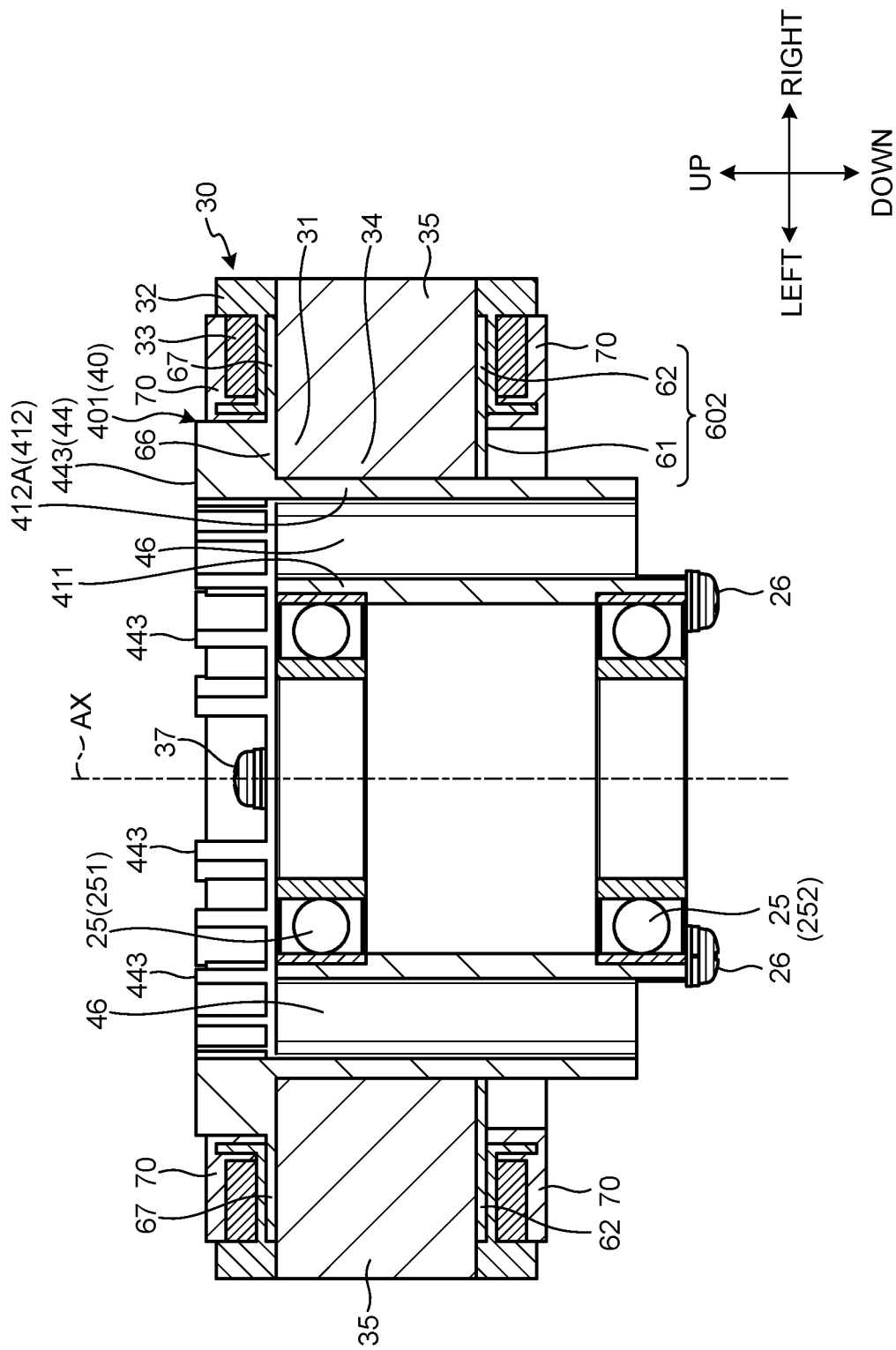
FIG. 34 is a longitudinal sectional view illustrating the part of the stator and the stator base according to the twelfth embodiment.

FIG. 33 is a perspective view illustrating a part of a stator 30 and a stator base 40 according to the present embodiment. FIG. 34 is a longitudinal sectional view illustrating a part of the stator 30 and the stator base 40 according to the present embodiment. The stator base 40 according to the present embodiment includes the first stator base 401 and the second stator base 402 described in the above-described third embodiment. Each of FIGS. 33 and 34 corresponds to a view in which the second stator base 402 is omitted.

As in the above-described fourth to eleventh embodiments, the stator 30 includes the resin portion 70 that covers the coils 33. The first stator base 401 is disposed inside the stator core 31.

The first stator base 401 includes the ring portion 66, the radial portions 67, and the intermediate heat dissipation fins 443. The ring portion 66 faces the upper end surface of the stator yoke 34. The radial portions 67 protrude in the radial direction from the ring portion 66. The radial portions 67 respectively face the upper end surfaces of the teeth 35. The intermediate heat dissipation fins 443 are provided on the upper surface of the ring portion 66.

The resin portion 70 is connected to at least a part of the first stator base 401. The upper surface of the resin portion 70 is disposed so as to surround the upper surface of the ring portion 66. At least a part of the resin portion 70 is in contact with the ring portion 66.

The lower heat dissipation member 602 is disposed on the lower end surface of the stator core 31. The lower heat dissipation member 602 includes the ring portion 61 and the radial portions 62. The ring portion 61 faces the lower end surface of the stator yoke 34. The radial portions 62 respectively face the lower end surfaces of the teeth 35. The resin portion 70 is in contact with at least a part of the lower heat dissipation member 602.

As described above, according to the present embodiment, the heat of the coils 33 is transferred to the first stator base 401 via the resin portion 70. The heat of the coils 33 is efficiently dissipated from the first stator base 401. In addition, the heat of the coils 33 is transferred to the lower heat dissipation member 602 via the resin portion 70. The heat of the coils 33 is efficiently dissipated from the lower heat dissipation member 602.

The first stator base 401 is separable from the second stator base 402. Therefore, in a state where the first stator base 401 is separated from the second stator base 402, the process of molding the synthetic resin to the coils 33 is smoothly performed.

Thirteenth Embodiment

A thirteenth embodiment will be described. In the following description, the same or equivalent components as those of the above-described embodiments are denoted by the same reference numerals, and the description thereof is simplified or omitted.

Figure 35:
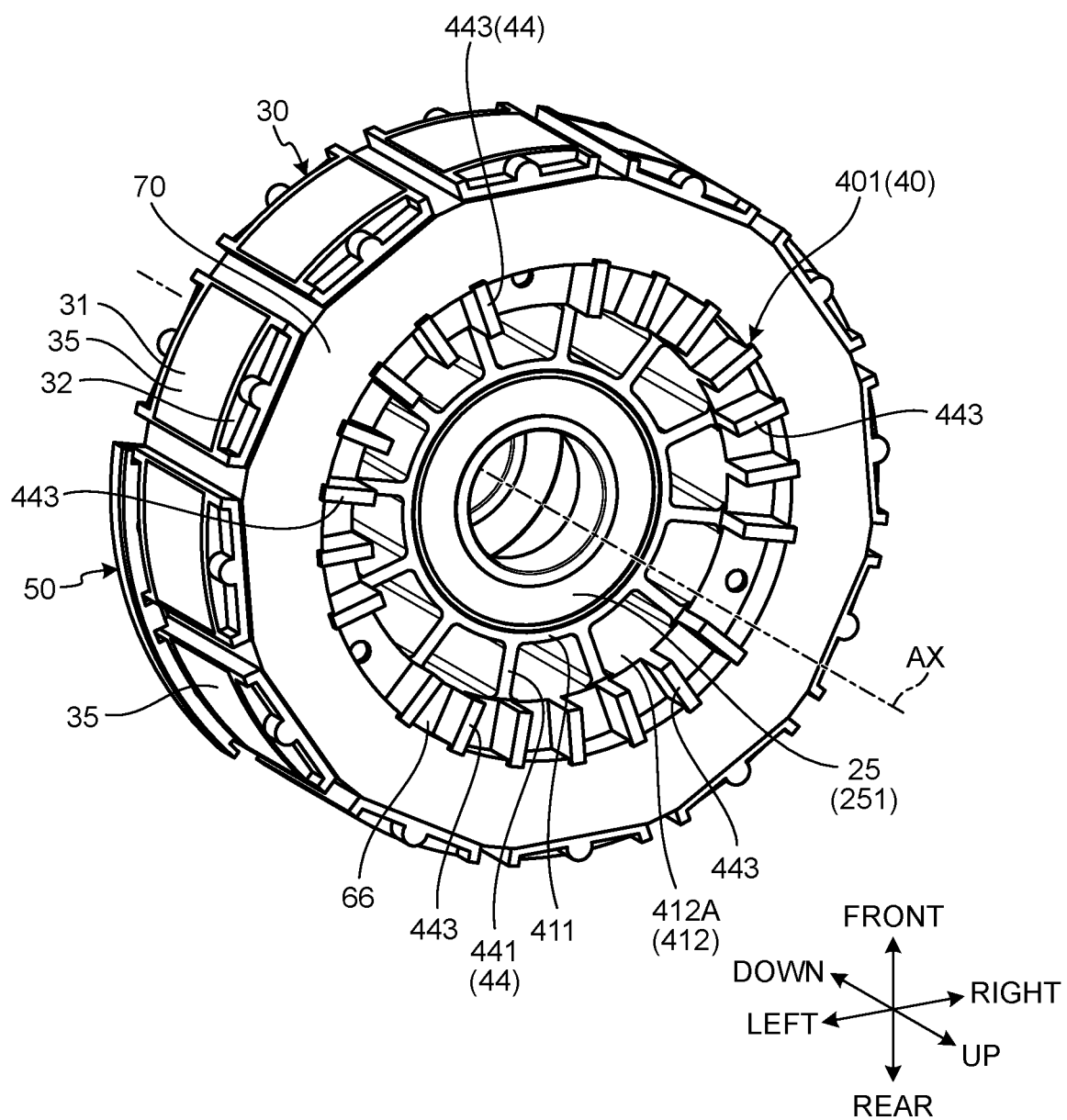
FIG. 35 is a perspective view illustrating a stator and a stator base according to a thirteenth embodiment.
Figure 36:
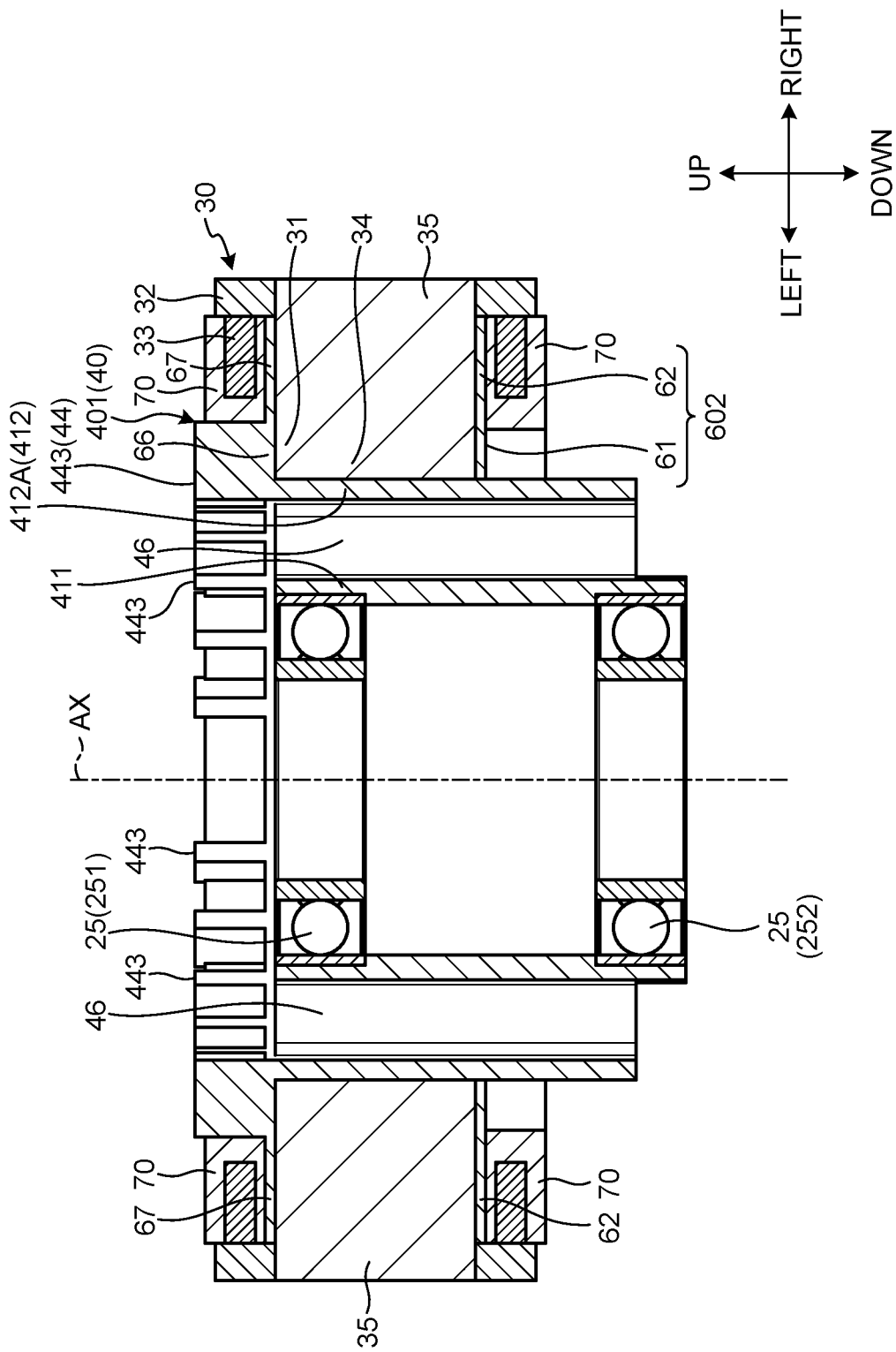
FIG. 36 is a longitudinal sectional view illustrating the stator and the stator base according to the thirteenth embodiment.
Figure 37:
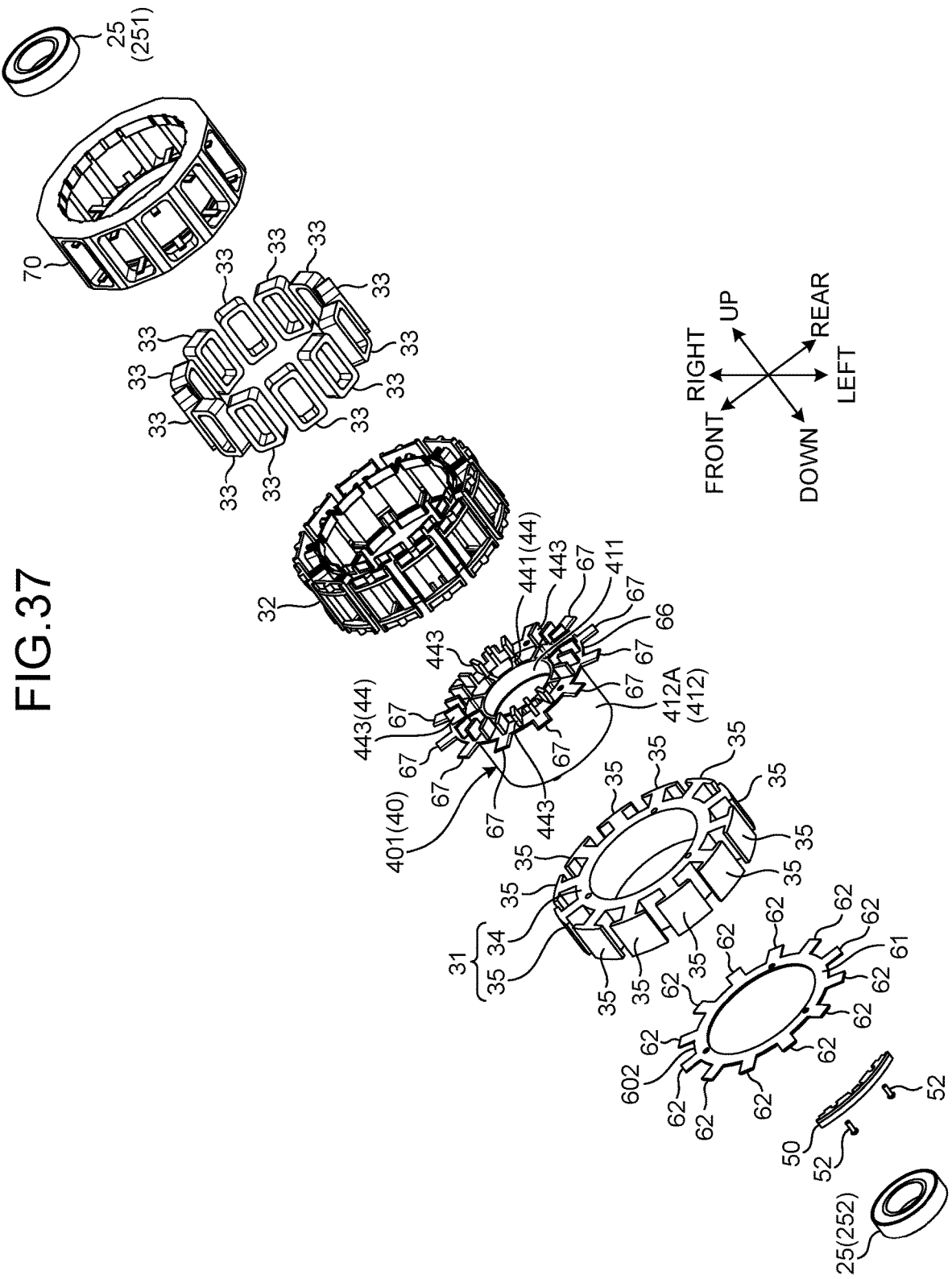
FIG. 37 is an exploded perspective view illustrating the stator and the stator base according to the thirteenth embodiment.

FIG. 35 is a perspective view illustrating a stator 30 and a stator base 40 according to the present embodiment. FIG. 36 is a longitudinal sectional view illustrating the stator 30 and the stator base 40 according to the present embodiment. FIG. 37 is an exploded perspective view illustrating the stator 30 and the stator base 40 according to the present embodiment.

As in the third embodiment and the twelfth embodiment described above, the stator base 40 according to the present embodiment includes the first stator base 401 and the second stator base 402. Each of FIGS. 35, 36, and 37 corresponds to a view in which the second stator base 402 is omitted.

As in the above-described fourth to twelfth embodiments, the stator 30 includes the resin portion 70 that covers the coils 33. The first stator base 401 is disposed inside the stator core 31. The first stator base 401 includes the ring portion 66 facing the upper end surface of the stator yoke 34 and the radial portions 67 respectively facing the upper end surfaces of the teeth 35.

As in the above-described embodiment, at least a part of the surface of the stator core 31 is covered with the insulator 32. The sensor substrate 50 is fixed to the insulator 32 by sensor screws 52.

Figure 38:
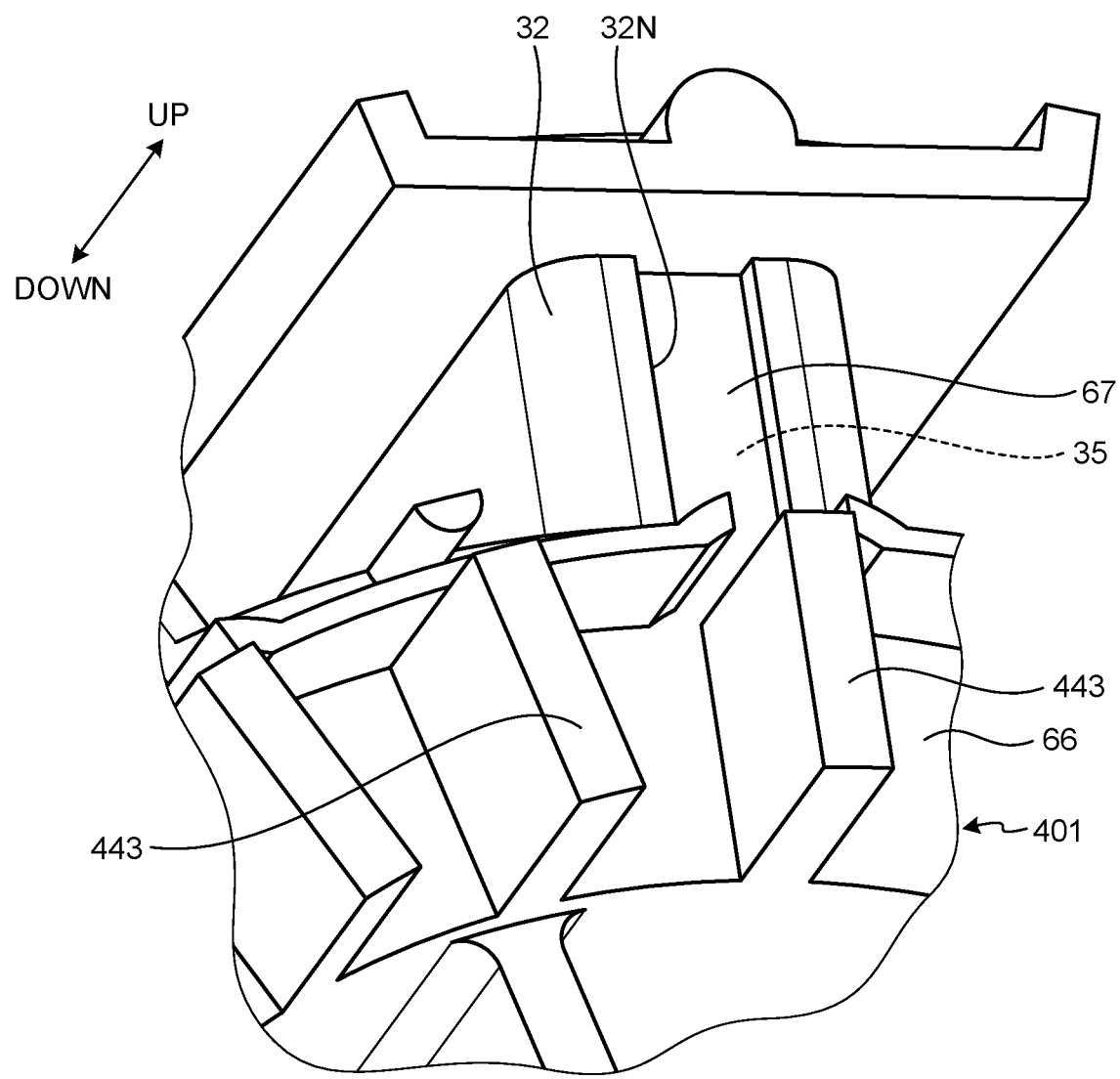
FIG. 38 is a perspective view illustrating a part of a first stator base and an insulator according to the thirteenth embodiment.

FIG. 38 is a perspective view illustrating a part of the first stator base 401 and the insulator 32 according to the present embodiment. As illustrated in FIG. 38, notches 32N are provided in a part of the insulator 32. The lower surface of each of the radial portions 67 faces the upper end surface of the corresponding tooth 35. The notch 32N and at least a part of the corresponding radial portion 67 overlap each other. At least a part of the upper surface of each of the radial portions 67 is not covered with the insulator 32.

Figure 39:
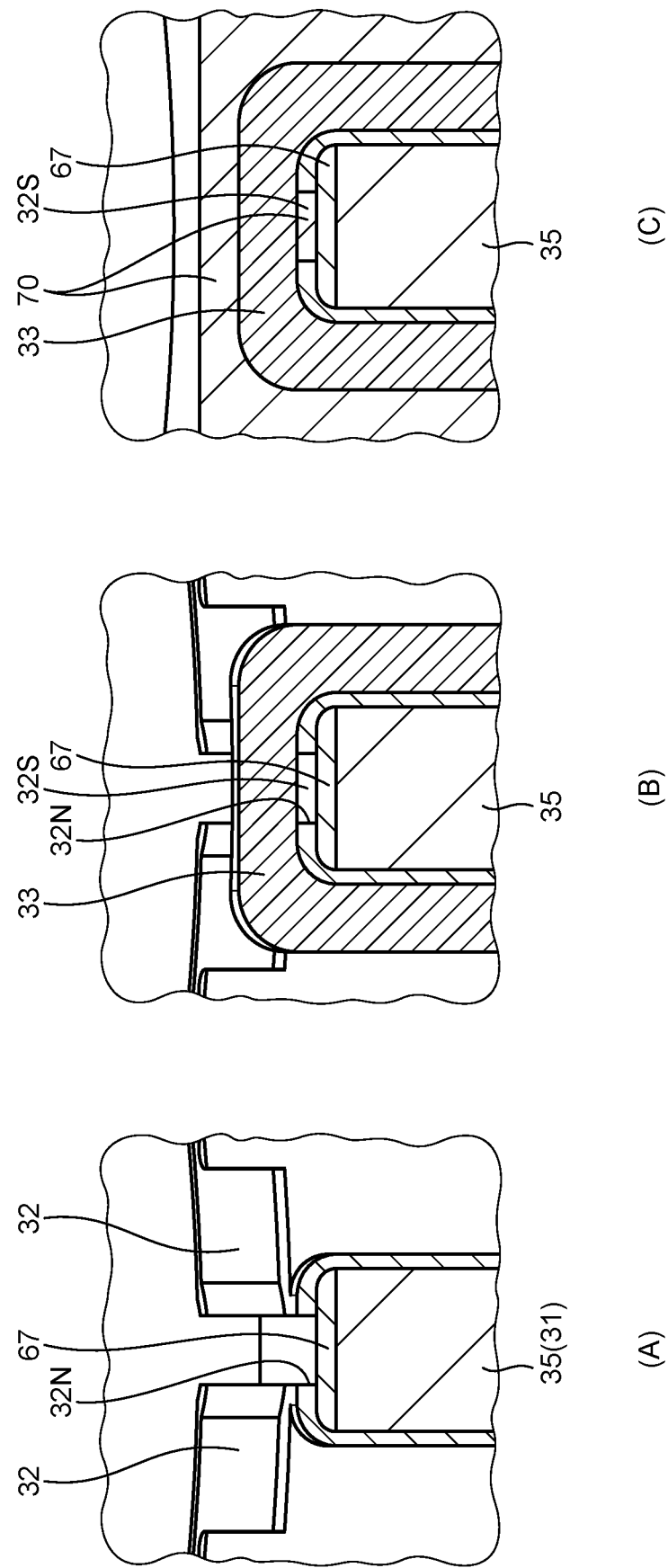
FIG. 39 is a view illustrating a method of manufacturing the stator according to the thirteenth embodiment.

FIG. 39 is a view illustrating a method of manufacturing the stator 30 according to the present embodiment. In a state where the first stator base 401 is disposed inside the stator core 31 and the radial portions 67 respectively face the upper end surfaces of the teeth 35, the first stator base 401 and the stator core 31 are disposed inside a mold for insert molding. After the first stator base 401 and the stator core 31 are disposed inside the mold, a synthetic resin for forming the insulator 32 is injected into the mold. The synthetic resin injected into the mold covers at least a part of the surface of the first stator base 401 and at least a part of the surface of the stator core 31. The first stator base 401 is fixed to the stator core 31 by the synthetic resin injected into the mold. The insulator 32 is formed by injecting the synthetic resin into the mold.

In the present embodiment, as illustrated in (A) of FIG. 39, a synthetic resin is injected into the mold so that the notches 32N are formed in the insulator 32. At least a part of the upper surface of each of the radial portions 67 is not covered with the insulator 32.

Next, as illustrated in (B) of FIG. 39, the coils 33 are respectively wound on the teeth 35 via the insulator 32 by a coil winding machine (not illustrated). At least a part of each of the coils 33 is in contact with the insulator 32. In the present embodiment, since the notches 32N are formed in the insulator 32, spaces 32S are formed by the respective coils 33, the respective radial portions 67, and the insulator 32.

Next, as illustrated in (C) of FIG. 39, a synthetic resin is molded so as to cover the coils 33, and the resin portion 70 is formed. At least a part of the resin portion 70 is disposed in the spaces 32S. The resin portion 70 is disposed between the coils 33 and the teeth 35. In the present embodiment, the resin portion 70 is disposed between the coils 33 and the radial portions 67 which are in contact with the respective teeth 35. The resin portion 70 disposed in the spaces 32S is in contact with the coils 33, the radial portions 67, and the insulator 32.

As described above, according to the present embodiment, the notches 32N are formed in the insulator 32. The resin portion 70 is disposed in the spaces 32S formed by the notches 32N. The resin portion 70 is disposed between the coils 33 and the teeth 35. The heat of the coils 33 is transferred to the first stator base 401 via the resin portion 70 disposed in the spaces 32S. The heat of the coils 33 is efficiently dissipated from the first stator base 401.

In the present embodiment, at least a part of the lower surface of each of the radial portions 62 of the lower heat dissipation member 602 is also not covered with the insulator 32. Spaces are also formed by the coils 33, the radial portions 62, and the insulator 32. The resin portion 70 is also disposed in the spaces formed by the coils 33, the radial portions 62, and the insulator 32. The resin portion 70 disposed in the spaces formed by the coils 33, the radial portions 62, and the insulator 32 is in contact with the coils 33, the radial portions 62, and the insulator 32. The heat of the coils 33 is transferred to the lower heat dissipation member 602 via the resin portion 70 disposed in the space formed by the coils 33, the radial portions 62, and the insulator 32. The heat of the coils 33 is efficiently dissipated from the lower heat dissipation member 602.

Fourteenth Embodiment

A fourteenth embodiment will be described. In the following description, the same or equivalent components as those of the above-described embodiments are denoted by the same reference numerals, and the description thereof is simplified or omitted.

Figure 40:
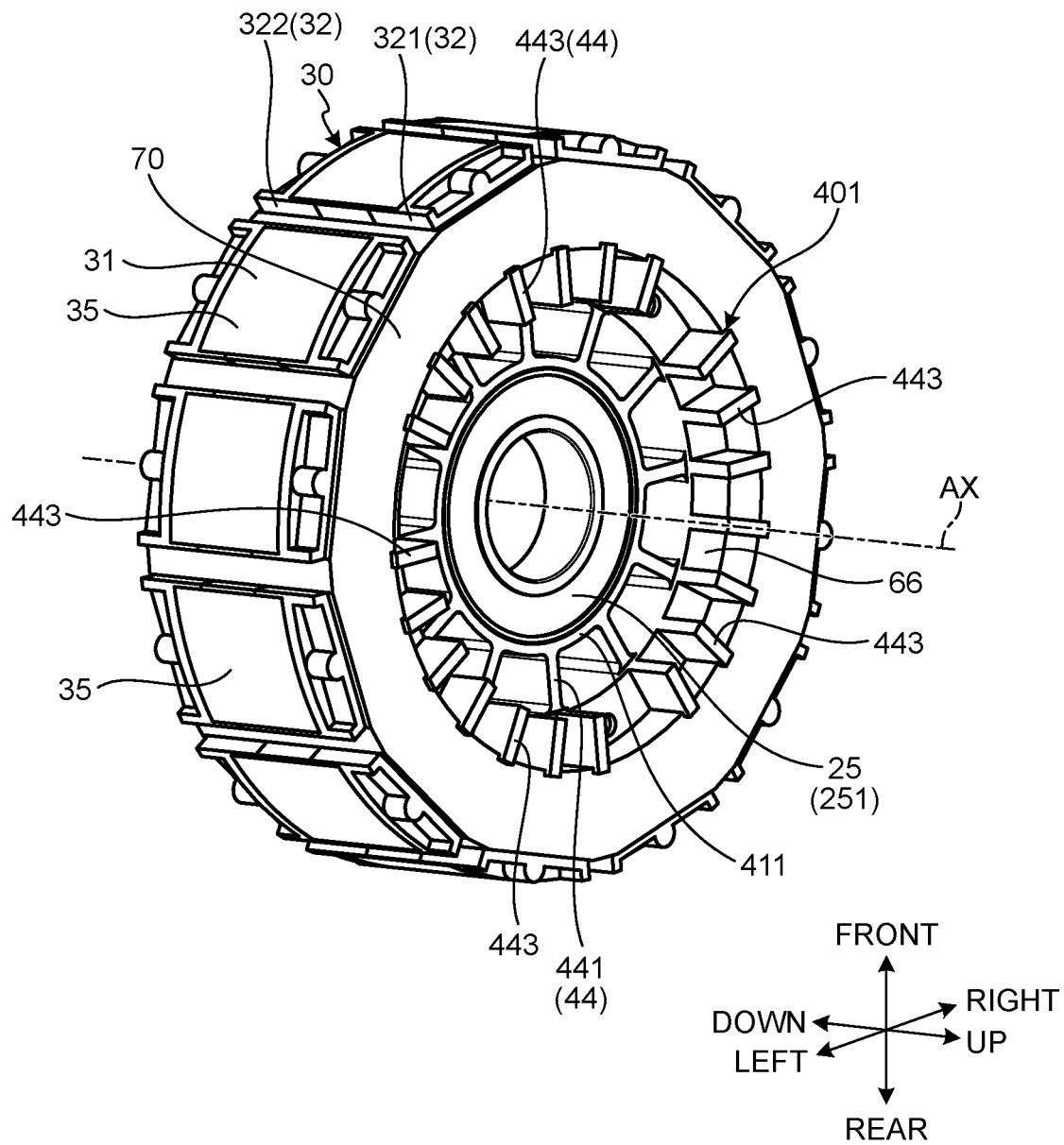
FIG. 40 is a perspective view illustrating a stator and a stator base according to a fourteenth embodiment.
Figure 41:
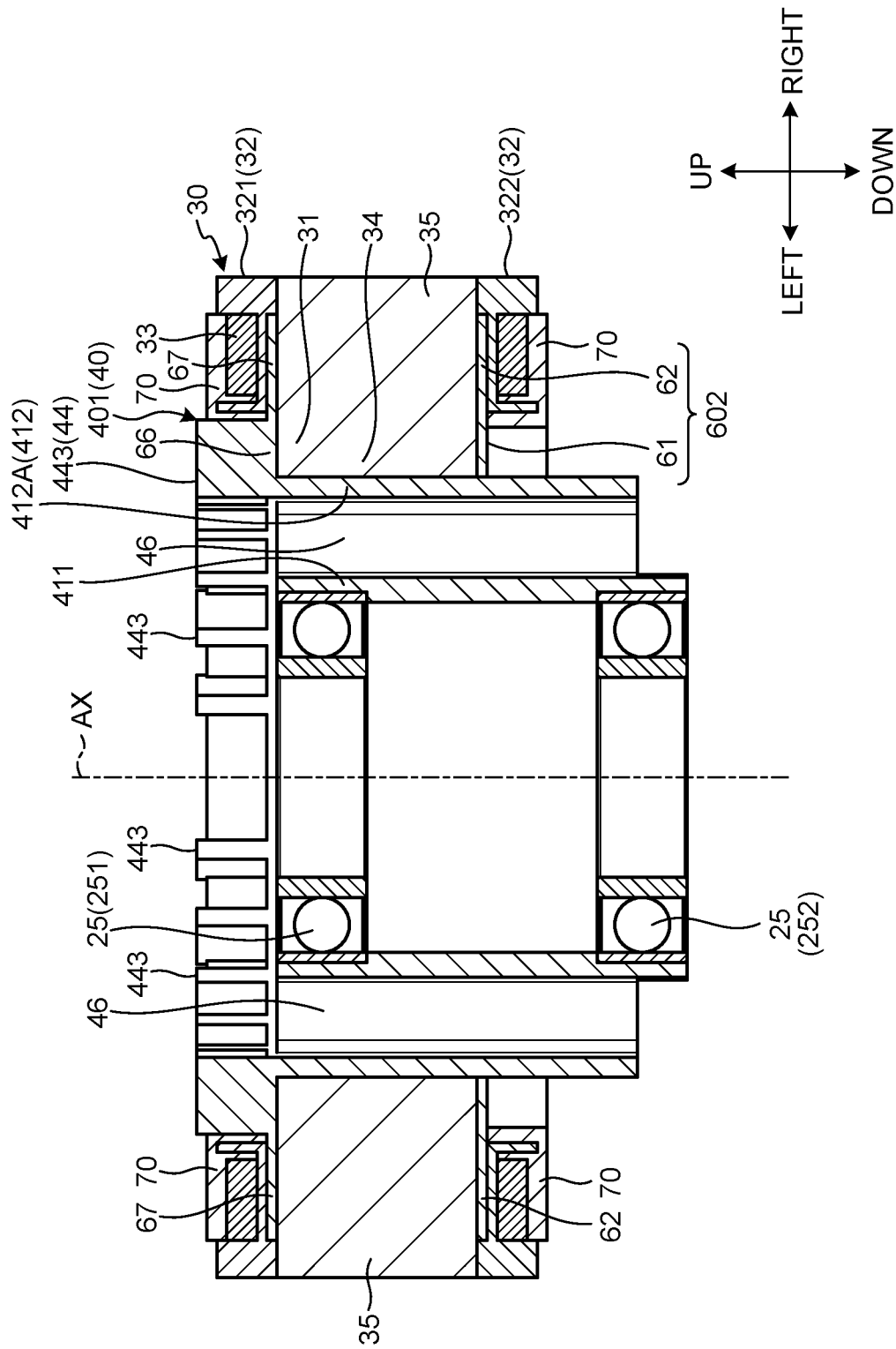
FIG. 41 is a longitudinal sectional view illustrating the stator and the stator base according to the fourteenth embodiment.
Figure 42:
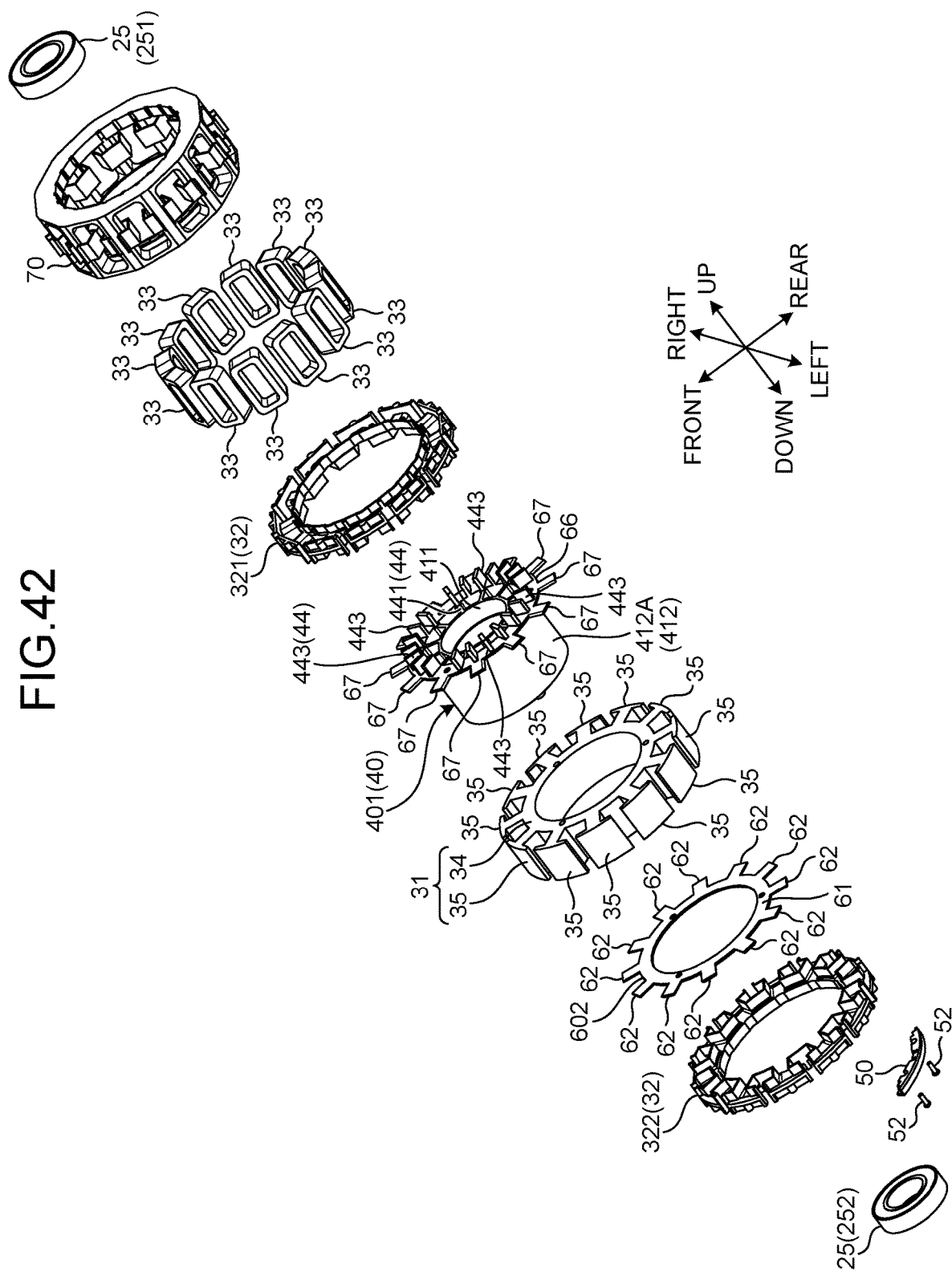
FIG. 42 is an exploded perspective view illustrating the stator and the stator base according to the fourteenth embodiment.

FIG. 40 is a perspective view illustrating a stator 30 and a stator base 40 according to the present embodiment. FIG. 41 is a longitudinal sectional view illustrating the stator 30 and the stator base 40 according to the present embodiment. FIG. 42 is an exploded perspective view illustrating the stator 30 and the stator base 40 according to the present embodiment.

As in the third embodiment, the twelfth embodiment, and the thirteenth embodiment described above, the stator base 40 according to the present embodiment includes the first stator base 401 and the second stator base 402. Each of FIGS. 40, 41, and 42 corresponds to a view in which the second stator base 402 is omitted.

As in the above-described fourth to thirteenth embodiments, the stator 30 includes the resin portion 70 that covers the coils 33. The first stator base 401 is disposed inside the stator core 31.

In the present embodiment, the insulator 32 includes an upper insulator 321 (first insulator) fixed to the upper portion of the stator core 31 and a lower insulator 322 (second insulator) fixed to the lower portion of the stator core 31. The upper insulator 321 is mounted on the stator core 31 from the upper side of the stator core 31. The lower insulator 322 is mounted on the stator core 31 from the lower side of the stator core 31.

Figure 43:
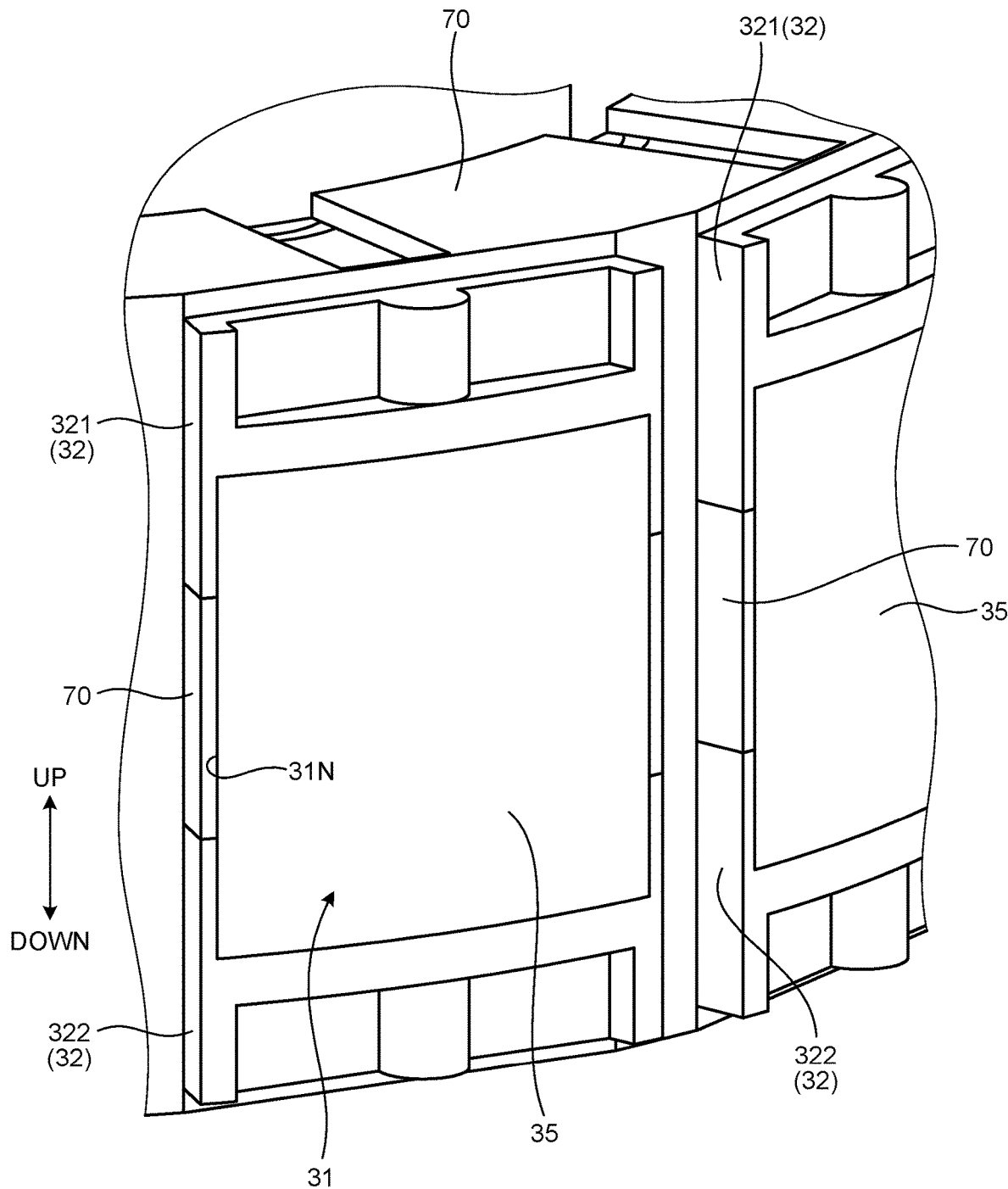
FIG. 43 is a perspective view illustrating a part of a stator core and an insulator according to the fourteenth embodiment.

FIG. 43 is a perspective view illustrating a part of the stator core 31 and the insulator 32 according to the present embodiment. In the present embodiment, at least a part of the resin portion 70 is disposed between the upper insulator 321 and the lower insulator 322. In the present embodiment, regions 31N that are not covered with the insulator 32 are formed on the surface of the stator core 31. The regions 31N are provided between the upper insulator 321 and the lower insulator 322 in the axial direction. The region 31N is provided on a part of the surface of the corresponding tooth 35. The resin portion 70 is disposed so as to cover the regions 31N on the surface of the stator core 31. The resin portion 70 is in contact with the regions 31N of the stator core 31. The coils 33 are in contact with the resin portion 70 disposed in the regions 31N. The resin portion 70 is disposed between the coils 33 and the teeth 35.

As described above, according to the present embodiment, the regions 31N that are not covered with the insulator 32 are formed on the surface of the stator core 31. The resin portion 70 is disposed in the region 31N. The resin portion 70 is disposed between the coils 33 and the teeth 35. The heat of the coils 33 is transferred to the stator core 31 via the resin portion 70 disposed in the regions 31N on the surfaces of the teeth 35. The heat of the coils 33 transferred to the stator core 31 is transferred to each of the first stator base 401 and the lower heat dissipation member 602. The heat of the coils 33 is efficiently dissipated from the first stator base 401 and the lower heat dissipation member 602.

With respect to the resin portion 70 according to the above-described embodiment, the thermal conductivity that does not indicate a measurement method is thermal conductivity measured by at least one of the laser flash method, the temperature wave analysis method (ISO 22007-3), and the hot disk method (ISO 22007-2).

OTHER EMBODIMENTS

In the above-described embodiments, the electric work machine 1 is a lawn mower which is a kind of gardening tool. The gardening tool is not limited to the lawn mower. Examples of the gardening tool include a hedge-trimmer, a chain saw, a mower, and a blower. Further, the electric work machine 1 may be an electric tool. Examples of the electric tool include a driver drill, a vibration driver drill, an angle drill, an impact driver, a grinder, a hammer, a hammer drill, a circular saw, and a reciprocating saw.

In the above-described embodiments, a battery pack mounted on a battery mounting unit is used as a power source of an electric work machine. As the power source of the electric work machine, a commercial power source (AC power source) may be used.

REFERENCE SIGNS LIST

1 ELECTRIC WORK MACHINE
2 HOUSING
3 WHEEL
4 MOTOR
5 CUTTING BLADE
6 CUTTING BOX
7 HANDLE
8 BATTERY MOUNTING UNIT
9 BATTERY PACK
10 ROTOR
11 ROTOR CUP
12 MAGNET
13 ROTOR YOKE
14 ROTOR PLATE
15 RADIAL RIB
16 SHAFT OPENING
17 SCREW OPENING
20 ROTOR SHAFT
21 SHAFT END SURFACE
22 SHAFT PROTRUSION
23 ROTOR SCREW
24 SCREW HOLE
25 BEARING
26 BEARING FIXING SCREW
30 STATOR
31 STATOR CORE
31N REGION
32 INSULATOR
32N NOTCH

32S SPACE
33 COIL
34 STATOR YOKE
35 TOOTH
36 SLOT
37 STATOR SCREW
38 SCREW OPENING
40 STATOR BASE
41 PIPE PORTION
411 INNER PIPE PORTION
412 OUTER PIPE PORTION
412A SMALL DIAMETER PORTION
412B LARGE DIAMETER PORTION
42 FOOT PORTION
43 CONNECTION RIB PORTION
44 HEAT DISSIPATION FIN (FIRST HEAT DISSIPATION FIN)
45 SCREW OPENING
46 VENTILATION PASSAGE
47 SCREW HOLE
47C SCREW HOLE
48 SCREW BOSS
50 SENSOR SUBSTRATE
52 SENSOR SCREW
60 HEAT DISSIPATION MEMBER (FIRST HEAT DISSIPATION MEMBER)
61 RING PORTION
62 RADIAL PORTION
63 HEAT DISSIPATION FIN (SECOND HEAT DISSIPATION FIN)
64 SCREW OPENING
64C SCREW OPENING
65 SCREW OPENING
66 RING PORTION
67 RADIAL PORTION
68 HEAT DISSIPATION MEMBER (SECOND HEAT DISSIPATION MEMBER)
70 RESIN PORTION
71 GAP
72 HEAT DISSIPATION FIN PORTION
251 UPPER BEARING
252 LOWER BEARING
321 UPPER INSULATOR (FIRST INSULATOR)
322 LOWER INSULATOR (SECOND INSULATOR)
401 FIRST STATOR BASE
402 SECOND STATOR BASE
431 INNER RIB PORTION
432 OUTER RIB PORTION
433 BENT PORTION
441 INNER HEAT DISSIPATION FIN
442 OUTER HEAT DISSIPATION FIN
443 INTERMEDIATE HEAT DISSIPATION FIN
601 UPPER HEAT DISSIPATION MEMBER
602 LOWER HEAT DISSIPATION MEMBER
681 PLATE PORTION
682 HEAT DISSIPATION FIN PORTION
683 COLUMNAR RIB PORTION
AX ROTATION AXIS

The invention claimed is:

1. An electric work machine comprising:
a stator including a stator core, an insulator fixed to the stator core, and coils mounted on the insulator;
a rotor at least a part of which is disposed on an outer circumferential side of the stator, the rotor including a magnet;
a stator base including a first heat dissipation fin and supported by the stator core; and
an output unit driven by the rotor, wherein
the first heat dissipation fin is disposed inside the stator core in a radial direction.

2. The electric work machine according to claim 1, comprising
a rotor shaft fixed to the rotor, wherein
the stator base includes a pipe portion at least a part of which is disposed inside the stator core and supports the rotor shaft via a bearing, and
the first heat dissipation fin is provided in the pipe portion.

3. The electric work machine according to claim 2, wherein
the pipe portion includes an inner pipe portion configured to support the rotor shaft via the bearing, and an outer pipe portion disposed on an outer circumferential side of the inner pipe portion and fixed to the stator core, and
the first heat dissipation fin is provided between the inner pipe portion and the outer pipe portion.

4. The electric work machine according to claim 2, wherein
the stator base includes:
a foot portion disposed outside the stator core and fixed to a fixing target, the foot portion including a screw opening; and
a connection rib portion configured to connect the pipe portion to the foot portion, and
the first heat dissipation fin is provided on the foot portion.

5. The electric work machine according to claim 1, wherein
the stator base includes a first stator base disposed inside the stator core and a second stator base disposed outside the stator core, and
the second stator base is fixed to a fixing target.

6. The electric work machine according to claim 1, wherein
the stator core includes:
a cylindrical stator yoke; and
teeth which protrude radially outward from the stator yoke and on which the coils are respectively wound via the insulator,
the stator base includes:
a ring portion that faces an end surface of the stator yoke; and
radial portions protruding from the ring portion outward in a radial direction of a rotation axis of the rotor and respectively facing end surfaces of the teeth, and
at least a part of each of the radial portions is covered with the insulator.

7. The electric work machine according to claim 1, further comprising
a first heat dissipation member made of metal and configured to face an end surface of the stator core.

8. An electric work machine comprising:
a stator including a stator core, an insulator fixed to the stator core, and coils mounted on the insulator;
a rotor at least a part of which is disposed on an outer circumferential side of the stator, the rotor including a magnet;
a stator base configured to support the stator core;
a first heat dissipation member made of metal and having a plate shape, the first heat dissipation member being in direct contact with an end surface of the stator core; and
an output unit driven by the rotor.

9. The electric work machine according to claim 8, wherein thermal conductivity of the first heat dissipation member is higher than thermal conductivity of the stator core.

10. The electric work machine according to claim 8, wherein
the stator core includes:
a cylindrical stator yoke; and
teeth which protrude radially outward from the stator yoke and on which the coils are respectively wound via the insulator, and
the first heat dissipation member includes:
a ring portion disposed to be in direct contact with an entire region of an end surface of the stator yoke; and
radial portions protruding from the ring portion outward in a radial direction of a rotation axis of the rotor and disposed to be respectively in direct contact with end surfaces of the teeth.

11. The electric work machine according to claim 10, wherein
at least a part of each of the radial portions is covered with the insulator.

12. The electric work machine according to claim 10, wherein
the first heat dissipation member includes a second heat dissipation fin provided in the ring portion.

13. The electric work machine according to claim 8, further comprising
a resin portion configured to cover the coils, wherein
thermal conductivity of the resin portion measured by a laser flash method is 1 W/(m·K) or more and 5 W/(m·K) or less.

14. The electric work machine according to claim 13, wherein
the resin portion is connected to each of the stator base and the stator core.

15. An electric work machine comprising:
a stator including a stator core, an insulator fixed to the stator core, and coils mounted on the insulator;
a rotor at least a part of which is disposed on an outer circumferential side of the stator, the rotor including a magnet;
a stator base configured to support the stator core;
a first heat dissipation member made of metal and configured to face an end surface of the stator core; and
an output unit driven by the rotor;
a resin portion configured to cover the coils, and
a second heat dissipation member supported by the insulator, wherein
thermal conductivity of the resin portion measured by a laser flash method is 1 W/(m·K) or more and 5 W/(m·K) or less, and
the resin portion is connected to the second heat dissipation member.

16. The electric work machine according to claim 15, wherein
the second heat dissipation member includes:
a ring-shaped plate portion connected to each of the insulator and the resin portion; and
heat dissipation fin portions provided on the plate portion.

17. The electric work machine according to claim 15, wherein
the resin portion includes a first resin portion configured to cover a first coil of the coils and a second resin portion configured to cover a second coil of the coils adjacent to the first coil, and
a gap is provided between the first resin portion and the second resin portion.

18. The electric work machine according to claim 17, wherein
the second heat dissipation member includes a columnar rib portion disposed in the gap.

19. The electric work machine according to claim 13, wherein
the stator core includes:
a cylindrical stator yoke; and
teeth which protrude radially outward from the stator yoke and on which the coils are respectively wound via the insulator,
the insulator includes:
a first insulator fixed to a first portion of the stator core; and
a second insulator fixed to a second portion of the stator core, and at least a part of the resin portion is disposed between the first insulator and the second insulator.

20. The electric work machine according to claim 8, wherein
the first heat dissipation member includes:
an upper heat dissipation member which is in contact with an upper end surface of the stator core; and
a lower heat dissipation member which is in contact with a lower end surface of the stator core.

* * * * *